(12) United States Patent
Katano et al.

(10) Patent No.: US 8,469,170 B2
(45) Date of Patent: Jun. 25, 2013

(54) CLUTCH MECHANISM AND CLUTCH SYSTEM HAVING THE SAME

(75) Inventors: Yoshiharu Katano, Anjo (JP); Yousuke Yamagami, Obu (JP); Motohiko Ueda, Okazaki (JP); Yuichiro Okuda, Toyoake (JP); Yasuhiro Takeuchi, Nagoya (JP); Haruo Kamiya, Chiryu (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 389 days.

(21) Appl. No.: 12/900,639

(22) Filed: Oct. 8, 2010

(65) Prior Publication Data

US 2011/0083935 A1 Apr. 14, 2011

(30) Foreign Application Priority Data

Oct. 12, 2009 (JP) .................................. 2009-235821

(51) Int. Cl.
*F16D 27/01* (2006.01)
*F16D 27/112* (2006.01)

(52) U.S. Cl.
USPC .................... 192/84.31; 192/84.961; 335/237

(58) Field of Classification Search
USPC ............................................ 192/84.31, 84.3
See application file for complete search history.

(56) References Cited

U.S. PATENT DOCUMENTS

| 5,097,240 A | * | 3/1992 | Nakanishi et al. | 335/296 |
| 2009/0314600 A1 | * | 12/2009 | Kato et al. | 192/84.31 |
| 2009/0321213 A1 | * | 12/2009 | Geiger | 192/84.31 |

FOREIGN PATENT DOCUMENTS

| JP | A-61-206827 | 9/1986 |
| JP | 01302707 A | * | 12/1989 |

OTHER PUBLICATIONS

Office Action issued Oct. 9, 2012 in corresponding CN Patent Application No. 201010509034.5 (and English translation).

* cited by examiner

*Primary Examiner* — Richard M. Lorence
*Assistant Examiner* — Lillian Nguyen
(74) *Attorney, Agent, or Firm* — Posz Law Group, PLC

(57) ABSTRACT

When a pulley and an armature are coupled with each other, first and second permanent magnets place the movable member at a location where a magnetic resistance of an attracting magnetic circuit, which generates an attracting magnetic force to couple between the pulley and the armature, is reduced. In contrast, when the pulley and the armature are decoupled from each other, the movable member is placed at a location where the magnetic resistance of the attracting magnetic circuit is increased, and a magnetic resistance of a non-attracting magnetic circuit is reduced. Thereby, a coupled state or a decoupled state of the pulley and the armature can be maintained without an erroneous operation.

24 Claims, 28 Drawing Sheets

CURRENT FLOW DIRECTION

⊗ : FROM FRONT SIDE TO BACK
    SIDE OF PLANE OF DRAWING

⊙ : FROM BACK SIDE TO FRONT
    SIDE OF PLANE OF DRAWING

CURRENT FLOW DIRECTION

⊗ : FROM FRONT SIDE TO BACK
    SIDE OF PLANE OF DRAWING

⊙ : FROM BACK SIDE TO FRONT
    SIDE OF PLANE OF DRAWING

CURRENT FLOW DIRECTION

⊗ : FROM FRONT SIDE TO BACK SIDE OF PLANE OF DRAWING

CURRENT FLOW DIRECTION

⊙ : FROM BACK SIDE TO FRONT SIDE OF PLANE OF DRAWING

CURRENT FLOW DIRECTION

⊗ : FROM FRONT SIDE TO BACK SIDE OF PLANE OF DRAWING

⊙ : FROM BACK SIDE TO FRONT SIDE OF PLANE OF DRAWING

CURRENT FLOW DIRECTION

⊗ : FROM FRONT SIDE TO BACK SIDE OF PLANE OF DRAWING

⊙ : FROM BACK SIDE TO FRONT SIDE OF PLANE OF DRAWING

CURRENT FLOW DIRECTION

⊗ : FROM FRONT SIDE TO BACK
    SIDE OF PLANE OF DRAWING

CURRENT FLOW DIRECTION

⊙ : FROM BACK SIDE TO FRONT
    SIDE OF PLANE OF DRAWING

CURRENT FLOW DIRECTION
⊗ : FROM FRONT SIDE TO BACK
    SIDE OF PLANE OF DRAWING

CURRENT FLOW DIRECTION
⊙ : FROM BACK SIDE TO FRONT
    SIDE OF PLANE OF DRAWING

CURRENT FLOW DIRECTION
⊗ : FROM FRONT SIDE TO BACK
      SIDE OF PLANE OF DRAWING

CURRENT FLOW DIRECTION
⊙ : FROM BACK SIDE TO FRONT
      SIDE OF PLANE OF DRAWING

CLUTCH MECHANISM AND CLUTCH SYSTEM HAVING THE SAME

CROSS REFERENCE TO RELATED APPLICATION

This application is based on and incorporates herein by reference Japanese Patent Application No. 2009-235821 filed on Oct. 12, 2009.

BACKGROUND OF THE INVENTION

1. Field of the Invention

The present invention relates to a clutch mechanism, which enables or disables conduction of a drive force therethrough, and a clutch system having the same.

2. Description of Related Art

An electromagnetic clutch mechanism, which enables or disables conduction of a rotational drive force from a driving-side rotator to a driven-side rotator through energization or deenergization of an electromagnet is known. In this type of the electromagnetic clutch, the electromagnet is energized to couple between the driving-side rotator and the driven-side rotator to conduct the rotational drive force from the driving-side rotator to the driven-side rotator. When the electromagnet is deenergized, the driving-side rotator and the driven-side rotator are decoupled from each other to disable the conduction of the rotational drive force from the driving-side rotator to the driven-side rotator.

However, in this type of electromagnetic clutch, at the time of coupling between the driving-side rotator and the driven-side rotator to conduct the rotational drive force, the electromagnet must be always energized throughout the period of the coupling between the driving-side rotator and the driven-side rotator (i.e., as long as the driving-side rotator and the driven-side rotator are being coupled with each other), thereby resulting in an increased electric power consumption (energy consumption) at the time of conducting the rotational drive force.

Japanese Examined Patent Publication No. H02-002007B teaches a clutch mechanism of a self-retaining type, in which a permanent magnet is used to eliminate a need for energizing the electromagnet at the time other than the time of coupling between the driving-side rotator and the driven-side rotator or the time of decoupling between the driving-side rotator and the driven-side rotator to reduce the electric power consumption.

Specifically, in the clutch mechanism of the self-retaining type, a rotor and an armature, which serve as the driving-side rotator and the driven-side rotator, respectively, are provided, and the permanent magnet is placed radially inward of the rotor. In a decoupled state of the rotor and the armature, in which the rotor and the armature are decoupled from each other, a gap (air gap) of a predetermined size (predetermined distance) is formed between the rotor and the armature by a leaf spring, which generates a repulsive force against the magnetic force (attracting force) that attracts the armature.

The air gap forms a magnetic resistance of the magnetic circuit, in which the attracting force is generated with the permanent magnet. When the gap, which has the size (distance) equal to or larger than the predetermined size (predetermined distance), is formed, the attracting force of the permanent magnet becomes smaller than the repulsive force of the leaf spring. Therefore, the rotor and the armature are maintained in the decoupled state, in which the rotor and the armature are decoupled from each other.

At the time of coupling between the rotor and the armature, the electromagnetic force is generated with the electromagnet to assist the attracting force of the permanent magnet, so that a sum of the attracting force of the permanent magnet and the attracting force of the electromagnet becomes larger than the repulsive force of the leaf spring. In this way, when the rotor and the armature are coupled with each other, the magnetic resistance is reduced. Therefore, the coupled state of the rotor and the armature is maintained even though the electromagnet is placed in the deenergized state.

At the time of decoupling between the rotor and the armature, the electromagnetic force is generated with the electromagnet to cancel the magnetic force of the permanent magnet. Thereby, the attracting force of the permanent magnet becomes smaller than the repulsive force of the leaf spring. In this way, when the rotor and the armature are decoupled from each other, the magnetic resistance is increased by the gap. Therefore, even when the electromagnet is placed in the deenergized state, the rotor and the armature are kept held in the decoupled state.

However, in the clutch mechanism of the self-retaining type recited in Japanese Examined Patent Publication No. H02-002007B, the magnetic resistance, which is generated with the air gap between the driving-side rotator (rotor) and the driven-side rotator (armature), is used to maintain the decoupled state of the driving-side rotator and the driven-side rotator. Therefore, in a case where the gap, which has the predetermined size (distance) or lager, cannot be maintained, the driving-side rotator and the driven-side rotator are coupled with each other even though the attracting force of the permanent magnet is not assisted with the electromagnet.

Furthermore, once the driving-side rotator and the driven-side rotator are coupled with each other, the coupled state of the driving-side rotator and the driven-side rotator is maintained by the attracting force of the permanent magnet. Therefore, the unnecessary conduction of the drive force, i.e., the erroneous operation of the clutch mechanism occurs.

For example, when the clutch mechanism of the self retaining type, which is recited in Japanese Examined Patent Publication No. H02-002007B, is applied to the refrigeration cycle system of the vehicle air conditioning system to enable or disable the conduction of the drive force to the compressor, the size of the gap may possibly be reduced by the vibration of the engine or of the vehicle body. When the driving-side rotator on the engine side and the driven-side rotator on the compressor side are coupled with each other due to the reduction in the size of the gap between the driving-side rotator and the driven-side rotator, the unnecessary conduction of the drive force from the engine to the compressor occurs.

SUMMARY OF THE INVENTION

The present invention addresses the above disadvantages. According to the present invention, there is provided a clutch mechanism including a driving-side rotator, a driven-side rotator, a permanent magnet, a movable member and a movable member displacing means. The driving-side rotator is adapted to be rotated about a rotational axis thereof by a rotational drive force conducted from a drive source. The driven-side rotator is coupleable with the driving-side rotator to receive the rotational drive force from the driving-side rotator. The permanent magnet is adapted to generate an attracting magnetic force to couple between the driving-side rotator and the driven-side rotator. The movable member is made of a magnetic material and is displaceable to increase or decrease a magnetic resistance of an attracting magnetic circuit, which is adapted to generate the attracting magnetic force through the permanent magnet. The movable member displacing means is for displacing the movable member. The attracting magnetic circuit includes both of at least a part of the driving-side rotator and at least a part of the driven-side rotator. At time of coupling between the driving-side rotator and the driven-side rotator, the movable member displacing means displaces the movable member to a location, at which the magnetic resistance of the attracting magnetic circuit is reduced in comparison to time of decoupling between the driving-side rotator and the driven-side rotator from each other. At the time of decoupling between the driving-side rotator and the driven-side rotator, the movable member displacing means displaces the movable member to a location, at which the magnetic resistance of the attracting magnetic circuit is increased in comparison to the time of coupling between the driving-side rotator and the driven-side rotator, and a magnetic resistance of a non-attracting magnetic circuit, which is different from the attracting magnetic circuit, is reduced in comparison to the time of coupling between the driving-side rotator and the driven-side rotator.

The movable member displacing means may include a first electromagnet and a second electromagnet. The first electromagnet generates an electromagnetic force upon receiving an electric power. The second electromagnet is located on an axial side of the first electromagnet that is opposite from the driven-side rotator in the direction of the rotational axis. The second electromagnet generates an electromagnetic force upon receiving an electric power.

According to the present invention, there is also provided a clutch system including the above clutch mechanism and a control means. The control means is for controlling an electric current, which is supplied to the first electromagnet and the second electromagnet. The control means supplies the electric current to the first electromagnet and the second electromagnet in a predetermined flow direction at the time of coupling between the driving-side rotator and the driven-side rotator, and the control means supplies the electric current to the first electromagnet and the second electromagnet in an opposite flow direction, which is opposite from the predetermined flow direction, at the time of decoupling between the driving-side rotator and the driven-side rotator.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
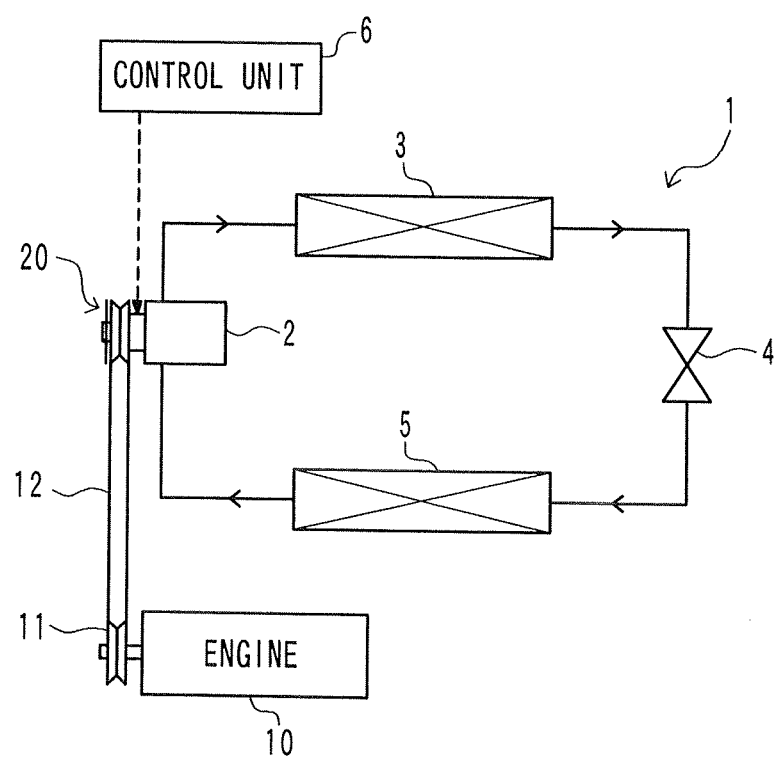
FIG. 1 is a schematic diagram showing a refrigeration cycle system having a clutch mechanism according to a first embodiment of the present invention.

A first embodiment of the present invention will be described with reference to FIGS. 1 to 4D. FIG. 1 is a schematic diagram showing a refrigeration cycle system 1 for a vehicle air conditioning system, in which a clutch system having a clutch mechanism 20 of the present embodiment is applied. The refrigeration cycle system 1 includes a compressor 2, a radiator 3, an expansion valve 4 and an evaporator 5, which are connected one after another to circulate refrigerant therethrough. The compressor 2 draws the refrigerant and compresses the drawn refrigerant. The radiator 3 receives the compressed refrigerant, which is discharged from the compressor 2, and cools the refrigerant. The expansion valve 4 depressurizes and expands the refrigerant, which is discharged from the radiator 3. The evaporator 5 evaporates the refrigerant, which is depressurized at the expansion valve 4, and thereby absorbs heat from the refrigerant.

The compressor 2 receives a rotational drive force from an engine 10, which is a drive source that generates and outputs a drive force for driving the vehicle, so that a compression mechanism of the compressor 2 is rotated to draw and compress the refrigerant. The compression mechanism may be a fixed displacement compressor mechanism or a variable displacement compressor mechanism. In the case of the fixed displacement compressor mechanism, the refrigerant displacement is fixed. In the case of the variable displacement compressor mechanism, the refrigerant displacement is variable according to a control signal supplied from an outside of the variable displacement compressor mechanism.

The rotational drive force of the engine 10 is conducted to the compressor 2 through an engine side pulley 11, the clutch mechanism 20 and a V-belt 12. The engine side pulley 11 is connected to a rotational drive shaft of the engine 10. The clutch mechanism 20 is connected to the compressor 2 and has a pulley integrated therein. The V-belt 12 is placed around the engine side pulley 11 and the clutch mechanism 20 (more specifically, a pulley 30 described below in detail).

The clutch mechanism 20 includes the pulley 30 and an armature 40. The pulley 30 serves as a driving-side rotator, which is rotated by the rotational drive force conducted from the engine 10. The armature 40 serves as a driven-side rotator, which is connected to a rotatable shaft 2a of the compressor 2 to rotate integrally therewith. When the pulley 30 is coupled with, i.e., is connected to the armature 40, the conduction of the rotational drive force from the engine 10 to the compressor 2 is enabled. In contrast, when the pulley 30 is decoupled from, i.e., is disconnected from the armature 40, the conduction of the rotational drive force from the engine 10 to the compressor 2 is disabled.

That is, when the pulley 30 and the armature 40 are coupled with each other in the clutch mechanism 20, the rotational drive force of the engine 10 is conducted to the compressor 2 to drive the refrigeration cycle system 1. In contrast, when the pulley 30 and the armature 40 are decoupled from each other in the clutch mechanism 20, the rotational drive force of the engine 10 is not conducted to the compressor 2, and thereby the refrigeration cycle system 1 is not operated. The operation of the clutch mechanism 20 is controlled by a control signal, which is outputted from an air conditioning control unit 6 that controls the various constituent devices of the refrigeration cycle system 1. Thereby, the air conditioning control unit 6 also serves as the control unit (control means) of the clutch system to control the operation of the clutch mechanism 20. Alternatively, the air conditioning control unit 6 may constitute part of the clutch mechanism 20 in some cases.

Figure 2:
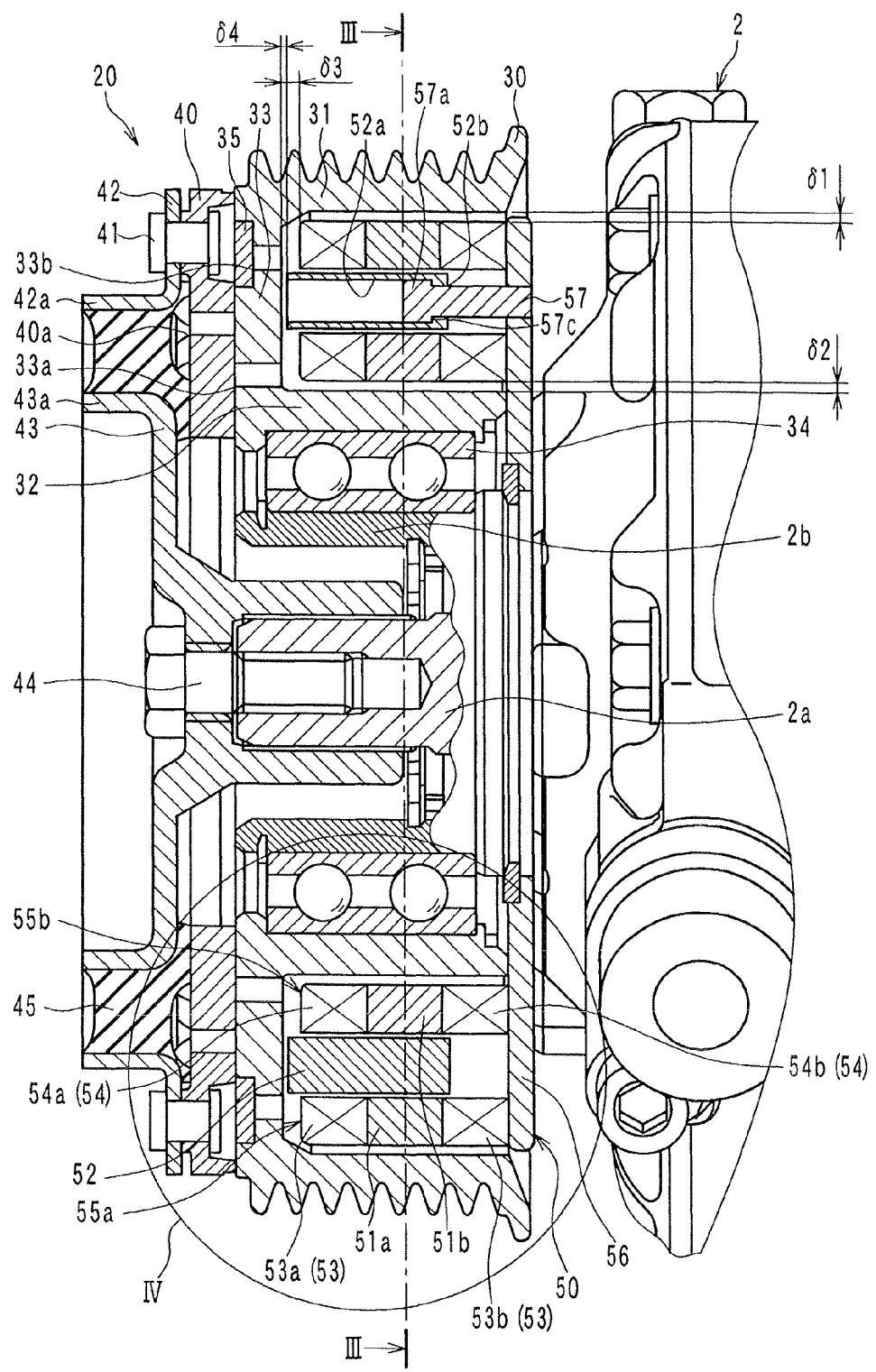
FIG. 2 is an axial cross-sectional view of the clutch mechanism according to the first embodiment.
Figure 3:
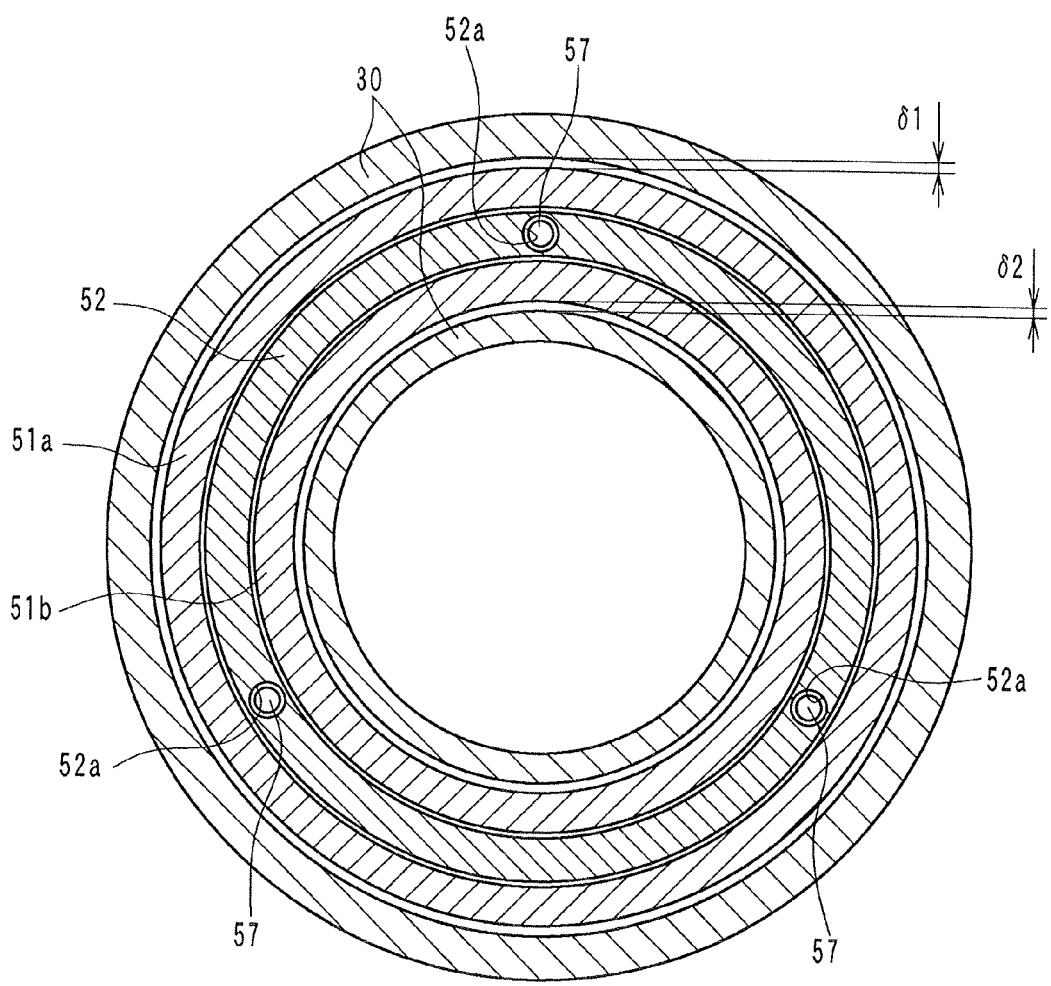
FIG. 3 is a cross sectional view taken along line III-III in FIG. 2.

Now, detail of the structure of the clutch mechanism 20 will be described with reference to FIGS. 2 and 3. FIG. 2 shows a cross-sectional view of the clutch mechanism 20, and FIG. 3 is view taken along line III-III in FIG. 2. In FIG. 2, the pulley 30 and the armature 40 are coupled with each other. Furthermore, in the drawings of the subsequent embodiments described below, components, which are similar to the components shown in FIG. 2, will be indicated by the same reference numerals.

As shown in FIGS. 2 and 3, the clutch mechanism 20 includes the pulley 30, the armature 40 and a stator 50. The pulley 30 serves as the driving-side rotator. The armature 40 serves as the driven-side rotator. The stator 50 includes a plurality (two in this instance) of permanent magnets 51a, 51b, which generate an attracting magnetic force for coupling between the pulley 30 and the armature 40.

The pulley 30 includes an outer cylindrical portion 31, an inner cylindrical portion 32 and an end surface portion 33. The outer cylindrical portion 31 is coaxial with the rotatable shaft 2a of the compressor 2. The inner cylindrical portion 32 is placed radially inward of the outer cylindrical portion 31 and is coaxial with the rotatable shaft 2a of the compressor 2. The end surface portion 33 extends in a radial direction, which is perpendicular to the rotational axis, such that the end surface portion 33 radially connects one end part of the outer cylindrical portion 31 and one end part of the inner cylindrical portion 32, both of which are located at one axial side (left side in FIG. 2) of the pulley 30. The end surface portion 33 includes a circular through hole, which axially penetrates through a wall of a center part of the end surface portion 33.

That is, the pulley 30 is configured to have the double cylindrical structure, which includes the outer and inner cylindrical portions 31, 32. As shown in FIG. 2, a longitudinal cross section (axial cross section) of the pulley 30 has a generally U-shape and is symmetrical about the rotational axis. A hollow cylindrical space (annular space) is defined by an inner peripheral surface of the outer cylindrical portion 31, an outer peripheral surface of the inner cylindrical portion 32 and an inner surface (right end surface in FIG. 2) of the end surface portion 33. Furthermore, as shown in FIG. 3, which is the view taken along line in FIG. 2, a lateral cross-sectional surface of the pulley 30 has a double circular form.

The outer cylindrical portion 31, the inner cylindrical portion 32 and the end surface portion 33 are integrally formed from a magnetic material (e.g., iron) and constitute a portion of an attracting magnetic circuit MCa and a portion of a non-attracting magnetic circuit MCb. V-shaped grooves (poly-V-groove) are formed at an outer peripheral part of the outer cylindrical portion 31 to receive the V-belt 12. An outer race of a ball bearing 34 is fixed to an inner peripheral part of the inner cylindrical portion 32.

The ball bearing 34 rotatably supports the pulley 30 relative to a housing, which forms an outer shell of the compressor 2. An inner race of the ball bearing 34 is fixed to a housing boss 2b, which is formed in the housing of the compressor 2. The housing boss 2b is configured into a cylindrical form, which is coaxial with the rotatable shaft 2a of the compressor 2.

A plurality of arcuate slit holes 33a and a plurality of arcuate slit holes 33b are formed in the end surface portion 33 such that each of the slit holes 33a is placed radially inward of a corresponding one of the plurality of slit holes 33b in a view taken in the axial direction (the direction of the rotational axis). The slit holes 33a, 33b axially penetrate through the wall of the end surface portion 33, i.e., extend through between one surface and an opposite surface of the end surface portion 33 in the direction of the rotational axis. An outer surface (left end surface in FIG. 2) of the end surface portion 33 forms a friction surface, which contacts the armature 40 when the pulley 30 is coupled with the armature 40.

Therefore, in the present embodiment, a friction member 35, which increases a coefficient of friction of the end surface portion 33, is placed on a portion of the surface of the end surface portion 33. The friction member 35 is made of a non-magnetic material. Specifically, in the present embodiment, this non-magnetic material may be a material formed by mixing alumina into resin and solidifying the same. Alternatively, the non-magnetic material may be a sintered material of metal powder (e.g., aluminum powder).

The armature 40 is made of a magnetic material (e.g., iron) and constitutes a part of the attracting magnetic circuit MCa. More specifically, the armature 40 is a circular disk member that extends in the radial direction, which is perpendicular to the rotational axis, and has a through hole that axially penetrates through the center part of the circular disk member. A rotational center of the armature 40 is placed coaxial with the rotational axis.

Similar to the end surface portion 33 of the pulley 30, the armature 40 has a plurality of arcuate slit holes 40a, each of which is arcuate in the view taken in the axial direction. Each of the slit holes 40a is radially placed between the corresponding one of the radially inner side slit holes 33a and the corresponding one of the radially outer side slit holes 33b formed in the end surface portion 33. Specifically, the slit holes 40a are placed at the radial location, which is on the radially outer side of the radially inner side slit holes 33a and is on the radially inner side of the radially outer side slit holes 33b.

Furthermore, a planar surface (right end surface in FIG. 2) of the one end part of the armature 40 is axially opposed to the end surface portion 33 of the pulley 30. This radially extending planar surface of the armature 40 forms a friction surface, which contacts the pulley 30 when the pulley 30 is coupled with the armature 40. Furthermore, an outer hub 42, which is configured into a generally circular disk form, is connected to another radially extending planar surface of the armature 40, which is opposite from the pulley 30, through rivets 41.

The outer hub 42 and an inner hub 43 described later form a connecting member, which connects between the armature 40 and the rotatable shaft 2a of the compressor 2. The outer hub 42 includes a cylindrical portion 42a, which extends in the axial direction, and the inner hub 43 includes a cylindrical portion 43a, which extends in the axial direction. Rubber (rubber element) 45, which is configured into a cylindrical form, is fixed to, i.e., is bonded to an inner peripheral surface of the cylindrical portion 42a of the outer hub 42 and also to an outer peripheral surface of the cylindrical portion 43a of the inner hub 43 by vulcanization. This rubber 45 may be made of, for example, ethylene-propylene terpolymer (EPDM).

Furthermore, the inner hub 43 is fixed to a threaded screw hole of the rotatable shaft 2a of the compressor 2 by a bolt 44, which is threadably fitted into the threaded screw hole of the rotatable shaft 2a. The fixation between the inner hub 43 and the rotatable shaft 2a of the compressor 2 may be alternatively implemented by using a fixing means, such as a spline (serration) or a key groove.

In this way, when the pulley 30 and the armature 40 are coupled with each other upon connecting the armature 40, the outer hub 42, the rubber 45, the inner hub 43 and the rotatable shaft 2a of the compressor 2, the armature 40, the outer hub 42, the rubber 45, the inner hub 43 and the rotatable shaft 2a of the compressor 2 are rotated together with the pulley 30.

Furthermore, the rubber 45 exerts a resilient force relative to the outer hub 42 in a direction away from the pulley 30. In the decoupled state of the pulley 30 and the armature 40, in which the pulley 30 and the armature 40 are decoupled from each other by the resilient force of the rubber 45, a gap δ of a predetermined size (see FIGS. 4B and 4C) is formed between the planar surface of the one end part of the armature 40, which is connected to the outer hub 42, and the outer surface of the end surface portion 33 of the pulley 30.

The stator 50 includes the permanent magnets 51a, 51b, a movable member 52, first and second electromagnets 53, 54 and a stator plate 56. The permanent magnets 51a, 51b generate the attracting magnetic force. The movable member 52 is displaceable, i.e., is movable to change, i.e., to increase or decrease a magnetic resistance of the attracting magnetic circuit MCa, in which the permanent magnets 51a, 51b generate the attracting magnetic forces. The first and second electromagnets 53, 54 serve as a movable member displacing means for displacing the movable member 52. The stator plate 56 serves as a fixing member, to which the permanent magnets 51a, 51b and the first and second electromagnets 53, 54 are fixed.

In the present embodiment, the permanent magnets include the first permanent magnet 51a and the second permanent magnet 51b. Each of the first and second permanent magnets 51a, 51b is configured into a cylindrical body. The second permanent magnet 51b is coaxial with the rotatable shaft 2a of the compressor 2 and is placed radially inward of the first permanent magnet 51a. In other words, the first and second permanent magnets 51a, 51b are arranged as concentric rings, respectively, which are placed around the rotatable shaft 2a of the compressor 2 in a concentric manner with respect to the rotatable shaft 2a of the compressor 2 (thereby with respect to the rotational axis).

Furthermore, the first and second permanent magnets 51a, 51b are magnetized in the radial direction, which is perpendicular to the rotational axis, such that the circumferential surface of the first permanent magnet 51a and the opposed circumferential surface of the second permanent magnet 51b, which are opposed to each other in the radial direction, have the same magnet polarity. Specifically, as indicated in FIGS. 4A to 4D, the outer circumferential surface of the first permanent magnet 51a has the S-pole, and the inner circumferential surface of the first permanent magnet 51a has the N-pole. Furthermore, the outer circumferential surface of the second permanent magnet 51b has the N-pole, and the inner circumferential surface of the second permanent magnet 51b has the S-pole. These N- and S-poles are thereby directed in the direction perpendicular to the rotational axis. Also, the first and second permanent magnets 51a, 51b may be, for example, neodymium or samarium-cobalt.

The first electromagnet 53 is divided into a first coil portion 53a and a second coil portion 53b, between which the first permanent magnet 51a is clamped in the axial direction of the first permanent magnet 51a. The first coil portion 53a and the second coil portion 53b are formed by dividing a common coil wire, i.e., by placing one part of the common coil at one axial side to form the first coil portion 53a and another part of the common coil at the other axial side to form the second coil portion 54 while maintain the electrical connection therebetween. Therefore, when one of the first and second coil portions 53a, 53b is energized, the other one of the first and second coil portions 53a, 53b is also energized.

The first coil portion 53a is placed on one axial side of the first permanent magnet 51a where the end surface portion 33 of the pulley 30 is located. The second coil portion 53b is placed on the other axial side of the first permanent magnet 51a, which is opposite from the end surface portion 33 of the pulley 30, i.e., on the other axial side of the first permanent magnet 51a where the stator plate 56 is located. Therefore, the first electromagnet 53 is configured into an annular body (ring body) that extends around the rotatable shaft 2a of the compressor 2.

The first coil portion 53a, the first permanent magnet 51a and the second coil portion 53b are fixed integrally by, for example, a bonding agent (adhesive) to form a first structural body 55a, which is configured into a cylindrical body. Alternatively, the first coil portion 53a, the first permanent magnet 51a and the second coil portion 53b may be resin-molded integrally to form the first structural body 55a. Here, it should be understood that the first and second coil portions 53a, 53b may possibly be referred to as first and second electromagnets (or first and second electromagnet portions), respectively, of the first structural body 55a in some cases.

The basic structure of the second electromagnet 54 is substantially the same as that of the first electromagnet 53. Therefore, the second electromagnet 54 is divided into a third coil portion 54a and a fourth coil portion 54b. Furthermore, the second permanent magnet 51b is clamped between the third coil portion 54a and the fourth coil portion 54b in the axial direction of the second permanent magnet 51b.

Specifically, the third coil portion 54a is placed on one axial side of the second permanent magnet 51b where the end surface portion 33 of the pulley 30 is located. Furthermore, the fourth coil portion 54b is placed on the other axial side of the second permanent magnet 51b, which is opposite from the end surface portion 33 of the pulley 30. Similar to the first permanent magnet 51a and the first electromagnet 53, the second permanent magnet 51b and the second electromagnet 54 form a second structural body 55b, which is configured into a cylindrical body. Here, it should be understood that the third and fourth coil portions 54a, 54b may possibly be referred to as first and second electromagnets (or first and second electromagnet portions or first and second coil portions), respectively, of the second structural body 55b in some cases.

The movable member 52 is a cylindrical member (body), i.e., a ring member made of a magnetic material (e.g., iron) and is coaxial with the rotatable shaft 2a of the compressor 2. The movable member 52 is placed radially inward of the first structural body 55a and radially outward of the second structural body 55b. The movable member 52 is displaceable in the axial direction while being placed coaxial with the rotatable shaft 2a of the compressor 2. Therefore, the displaceable direction of the movable member 52 coincides with direction of the rotational axis of the rotatable shaft 2a of the compressor 2.

Furthermore, the movable member 52 is placed between the radially inner side slit hole 33a and the radially outer side slit hole 33b in the view taken in the axial direction. An outer circumferential surface (outer peripheral surface) and an inner circumferential surface (inner peripheral surface) of the movable member 52 are surface treated to reduce the friction caused by the displacement of the movable member 52 and to reduce the slide resistance at the time of displacing the movable member 52. This surface treatment may be, for example, metal plating (e.g., chrome plating, galvanization) or chromate treatment.

The entire axial length of the movable member 52 in the axial direction of the rotatable shaft 2a is shorter than the entire axial length of the first structural body 55a in the axial direction of the rotatable shaft 2a and is also shorter than the entire axial length of the second structural body 55b in the axial direction of the rotatable shaft 2a. In this way, when the movable member 52 is moved toward the one axial side where the end surface portion 33 of the pulley 30 is located, an air gap is formed to increase a magnetic resistance of the magnetic circuit that is formed by the first and second permanent magnets 51a, 51b on the other axial side, which is opposite from the end surface portion 33 of the pulley 30.

In contrast, when the movable member 52 is moved toward the other axial side, which is opposite from the end surface portion 33 of the pulley 30, an air gap is formed to increase a magnetic resistance of the magnetic circuit that is formed by the first and second permanent magnets 51a, 51b on the one axial side where the end surface portion 33 of the pulley 30 is located.

The stator plate 56 is the fixing member, to which the first structural body 55a and the second structural body 55b are fixed by a joining means, such as a bonding agent (adhesive). Furthermore, the stator plate 56 is made of a magnetic material (e.g., iron) and forms a part of the non-attracting magnetic circuit MCb. More specifically, the stator plate 56 is a circular disk member that extends in the radial direction, which is perpendicular to the rotational axis, and has a through hole that axially penetrates through the center part of the circular disk member.

Furthermore, the stator plate 56 is fixed to the housing of the compressor 2 by a fixing means, such as a snap ring. When the stator plate 56 is viewed in the axial direction, the stator plate 56 has a circular disk form, which has an outer diameter that is substantially the same as an diameter of the opening (right end opening in FIG. 2) of the hollow cylindrical space of the pulley 30, which is defined by the inner peripheral surface of the outer cylindrical portion 31, the outer peripheral surface of the inner cylindrical portion 32 and the inner surface of the end surface portion 33.

When the stator plate 56 is placed to close the opening of the hollow cylindrical space of the pulley 30, the first and second structural bodies 55a, 55b and the movable member 52 are placed in the hollow cylindrical space of the pulley 30. Specifically, the first and second permanent magnets 51a, 51b, the movable member 52 and the first and second electromagnets 53, 54 are placed on the radially inner side of the outer cylindrical portion 31 and on the radially outer side of the inner cylindrical portion 32.

At this time, the radial gap δ1 is formed between the outer peripheral surface of the first structural body 55a and the inner peripheral surface of the outer cylindrical portion 31 in the radial direction. Furthermore, the radial gap δ2 is formed between the inner peripheral surface of the second structural body 55b and the outer peripheral surface of the inner cylindrical portion 32 in the radial direction. In addition, the axial gap δ3 is formed between the end parts of the first and second structural bodies 55a, 55b and the end surface portion 33 in the axial direction. Thereby, even when the pulley 30 is rotated, it is possible to limit the contacting of the pulley 30 to the first and second structural bodies 55a, 55b.

Furthermore, as shown in FIGS. 2 and 3, a plurality (three in this embodiment) of pins 57, each of which is configured into a generally cylindrical column form, is fixed to the stator plate 56 by a fixing means, such as press-fitting or swaging. Each pin 57 is made of a non-magnetic material (e.g., aluminum). Furthermore, a distal end part (left end part in FIG. 2) of each pin 57, which is located on the one axial side where the end surface portion 33 of the pulley 30 is located, has an enlarged diameter part (large diameter part) 57a, which has an outer diameter larger than an outer diameter of a proximal end part of the pin 57, which is fixed to the stator plate 56.

The movable member 52 has a plurality of pin receiving holes 52a, each of which receives a corresponding one of the pins 57. An engaging hole 52b, which has an inner diameter smaller than the outer diameter of the enlarged diameter part 57a, is formed at a stator plate 56 side end part of each pin receiving hole 52a. In this way, even when the movable member 52 is displaced toward the end surface portion 33, the enlarged diameter part 57a engages a peripheral edge part of the opening of the engaging hole 52b to limit further displacement of the movable member 52. Thereby, a displaceable range of the movable member 52 is limited.

Therefore, even when the movable member 52 is displaced toward the end surface portion 33 of the pulley 30, an axial gap δ4 is left between the movable member 52 and the end surface portion 33. Thereby, at the time of rotating the pulley 30, it is possible to limit the contacting of the pulley 30 to the movable member 52. As a result, the rotation of the movable member 52 about the rotational axis can be limited. That is, the enlarged diameter part 57a of the pin 57 and the engaging hole 52b of the pin receiving hole 52a serve as a displaceable range limiting means, and the enlarged diameter part 57a of the pin 57 serves as the contact portion.

Furthermore, one of the enlarged diameter part 57a and the engaging hole 52b has a shock absorbing member 57c, such as a resilient member or elastomer (e.g., rubber) or resin at the contact location (contact surface), at which the enlarged diameter part 57a contacts the engaging hole 52b at the time of displacing the movable member 52 toward the end surface portion 33 of the pulley 30. In this way, the shock absorbing member 57c is placed between the enlarged diameter part 57a and the engaging hole 52b to limit or reduce the impact and the impact sound (operational sound) at the time of contacting the enlarged diameter part 57a against the engaging hole 57b (more specifically, the peripheral area around the opening of the engaging hole 57b).

Figure 4A:
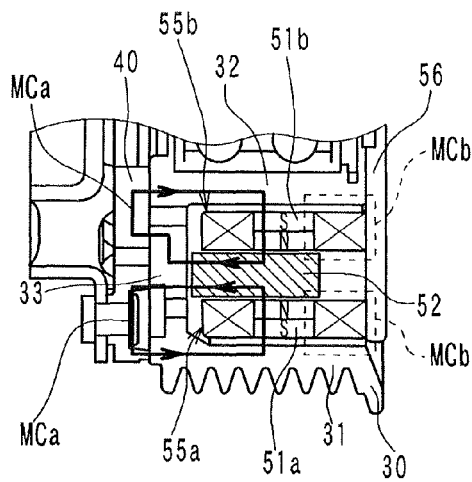
FIG. 4A is a schematic diagram, indicating an area of a circle IV in FIG. 2 and showing a coupled state of a pulley and a armature, in which the pulley and the armature are coupled with each other.
Figure 4D:
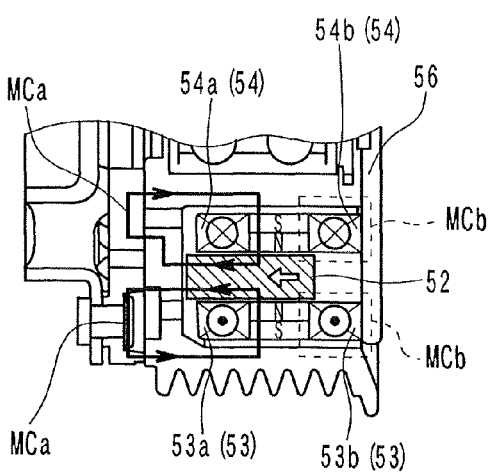
FIG. 4D is a schematic diagram similar to FIG. 4A, showing a coupling process for coupling between the pulley and the armature, which have been held in the decoupled state shown in FIG. 4C.
Figure 4B:
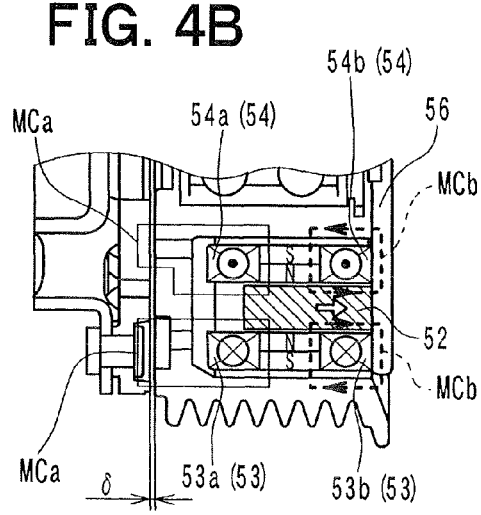
FIG. 4B is a schematic diagram similar to FIG. 4A, showing a decoupling process for decoupling between the pulley and the armature, which have been held in the coupled state shown in FIG. 4A.
Figure 4C:
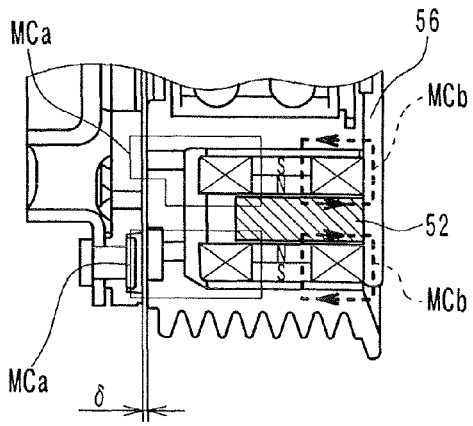
FIG. 4C is a schematic diagram similar to FIG. 4A, showing a decoupled state of the pulley and the armature, in which the pulley and the armature are decoupled from each other after the decoupling process shown in FIG. 4B.

Next, with reference to FIGS. 4A to 4D, the operation of the clutch mechanism 20 of the present embodiment will be described. FIGS. 4A to 4D are schematic diagrams indicating an area of FIG. 2, which is indicated by a circle IV in FIG. 2. Specifically, FIG. 4A is a schematic diagram for describing a coupled state of the pulley 30 and the armature 40, in which the pulley 30 and the armature 40 are coupled with each other. FIG. 4B is a schematic diagram for describing a decoupling process for decoupling between the pulley 30 and the armature 40, which have been held in the coupled state (i.e., the state of FIG. 4A). FIG. 4C is a schematic diagram showing a decoupled state of the pulley 30 and the armature 40, in which the pulley 30 and the armature 40 are decoupled from each other through the decoupling process of FIG. 4B. FIG. 4D is a schematic diagram for describing a coupling process for coupling between the pulley 30 and the armature 40, which have been held in the decoupled state (i.e., the state of FIG. 4C). Furthermore, in FIGS. 4A to 4D, the hatchings of the components other than the movable member 52 are omitted for the sake of easy understanding.

First of all, as shown in FIG. 4A, in the coupled state of the pulley 30 and the armature 40, the movable member 52 is placed at the end surface portion 33 side (i.e., at the one axial side). According to the present embodiment, at this time, as discussed above, due to the presence of the slit holes 33a, 33b at the end surface portion 33 of the pulley 30 and the slit holes 40a of the armature 40, the magnetic resistances of the magnetic circuits indicated by the bold sold lines in FIG. 4A are reduced, and thereby the magnetic force, which is generated at these magnetic circuits, is increased.

Specifically, in comparison to the decoupled state of the pulley 30 and the armature 40, in which the movable member 52 is placed at the other axial side where the stator plate 56 is located, the magnetic resistance is reduced in the magnetic circuit, which is formed with the first permanent magnet 51a and conducts the magnetic flux through the movable member 52, the end surface portion 33, the armature 40 and the outer cylindrical portion 31 in this order. The magnetic resistance is also reduced in the other magnetic circuit, which is located radially inward of the above magnetic circuit and is formed with the second permanent magnet 51b and conducts the magnetic flux through the movable member 52, the end surface portion 33, the armature 40 and the inner cylindrical portion 32 in this order. Thereby, the magnetic force, which is generated by these magnetic circuits, is increased.

Furthermore, the magnetic force, which is generated by the magnetic circuits indicated by the bold solid lines in FIG. 4A, acts as the attracting magnetic force, which couples between the pulley 30 and the armature 40. Therefore, the magnetic circuits, which are indicated by the bold solid lines in FIG. 4A, serve as the attracting magnetic circuits MCa of the present embodiment. When the movable member 52 is displaced to the one axial side where the end surface portion 33 of the pulley 30 is located, the gap is formed between the movable member 52 and the stator plate 56 at the other axial side.

This gap increases the magnetic resistance in the magnetic circuit, which is indicated by the regular dotted line in FIG. 4A and is formed with the first permanent magnet 51a to conduct the magnetic flux through the movable member 52, the stator plate 56 and the outer cylindrical portion 31 in this order. Also, this gap increases the magnetic resistance in the magnetic circuit, which is indicated by the regular dotted line and is formed with the second permanent magnet 51b to conduct the magnetic flux through the movable member 52, the stator plate 56 and the inner cylindrical portion 32 in this order. Thereby, the magnetic force, which is generated by these magnetic circuits, is reduced.

Furthermore, the magnetic force, which is generated by the magnetic circuits indicated by the regular dotted lines in FIG. 4A, does not act as the attracting magnetic force, which couples between the pulley 30 and the armature 40. Therefore, the magnetic circuits, which are indicated by the regular dotted lines in FIG. 4A, serve as the non-attracting magnetic circuits MCb of the present embodiment.

Furthermore, when the movable member 52 is placed at the one axial side where the end surface portion 33 of the pulley 30 is located, the amount of magnetic flux generated at each of the attracting magnetic circuits MCa is increased. Therefore, the location of the movable member 52 is maintained at the one axial side where the end surface portion 33 of the pulley 30 is located.

Furthermore, in the present embodiment, the resilient force (repulsive force) of the rubber 45, which is exerted in the separating direction for separating the pulley 30 and the armature 40 away from each other (more specifically, in the direction of pulling the armature 40 away from the pulley 30 toward the left side in FIG. 2), is set as follows. That is, the resilient force (repulsive force) of the rubber 45 is smaller than the attracting magnetic force that is exerted in the coupled state of the pulley 30 and the armature 40, in which the movable member 52 is placed at the one axial side where the end surface portion 33 of the pulley 30 is located. Therefore, even though the electric power is not supplied to the first and second electromagnets 53, 54, the pulley 30 and the armature 40 are maintained in the coupled state thereof. Thereby, the rotational drive force is conducted from the engine 10 to the compressor 2.

Next, at the time of decoupling between the pulley 30 and the armature 40, which have been held in the coupled state thereof, the air conditioning control unit 6 supplies the electric power to the first and second electromagnets 53, 54 in a manner shown in FIG. 4B (see the flow directions of the electric currents through the coils of the first and second electromagnets 53, 54). Specifically, each of the first and second electromagnets 53, 54 generates the electromagnetic force, which reduces the amount of magnetic flux passing through the corresponding attracting magnetic circuit MCa and increases the amount of magnetic flux passing through the non-attracting magnetic circuit MCb.

In this way, the magnetic force, which is generated by the non-attracting magnetic circuits MCb indicated by the bold dotted lines in FIG. 4B, becomes larger than the attracting magnetic force, which is generated by the attracting magnetic circuits MCa indicated by the regular solid lines in FIG. 4B. Thereby, the movable member 52 is displaced toward the other axial side where the stator plate 56 is located. Upon this displacement of the movable member 52, the magnetic resistance of the non-attracting magnetic circuit MCb in this decoupled state of the pulley 30 and the armature 40 is reduced in comparison to the magnetic resistance of the non-attracting magnetic circuit MCb in the coupled state of the pulley 30 and the armature 40. Thereby, the location of the movable member 52 is maintained at the other axial side where the stator plate 56 is located.

Furthermore, when the movable member 52 is displaced to the other axial side where the stator plate 56 is located, the gap (air gap) is formed between the movable member 52 and the end surface portion 33 of the pulley 30. Due to the presence of this gap, the magnetic resistance of the attracting magnetic circuit MCa in this decoupled state of the pulley 30 and the armature 40 is increased in comparison to the magnetic resistance of the attracting magnetic circuit MCa in the coupled state of the pulley 30 and the armature 40. Thus, the repulsive force of the rubber 45 becomes larger than the attracting magnetic force, so that the pulley 30 and the armature 40 are decoupled from each other. Thereby, the rotational drive force is no longer conducted from the engine 10 to the compressor 2.

Next, as shown in FIG. 4C, in the decoupled state of the pulley 30 and the armature 40, in which the movable member 52 is placed at the other axial side where the stator plate 56 is located, the amount of magnetic flux of the non-attracting magnetic circuit MCb is increased in comparison to the amount of magnetic flux of the non-attracting magnetic circuit MCb in the coupled state of the pulley 30 and the armature 40, in which the movable member 52 is placed at the one axial side where the end surface portion 33 of the pulley 30 is located. Therefore, the movable member 52 is kept held at the other axial side where the stator plate 56 is located.

Furthermore, in the decoupled state of the pulley 30 and the armature 40, in which the movable member 52 is placed at the other axial side where the stator plate 56 is located, the attracting magnetic force is smaller than the repulsive force of the rubber 45. Therefore, even though the electric power is not supplied to the first and second electromagnets 53, 54, the decoupled state of the pulley 30 and the armature 40 is maintained. That is, the rotational drive force of the engine 10 is not conducted to the compressor 2.

Next, at the time of coupling between the pulley 30 and the armature 40, which have been held in the decoupled state thereof (the state of FIG. 4C), the air conditioning control unit 6 supplies the electric power to the first and second electromagnets 53, 54 in a manner shown in FIG. 4D (see the flow directions of the electric currents, which are opposite from those of FIG. 4B, through the coils of the first and second electromagnets 53, 54). Specifically, each of the first and second electromagnets 53, 54 generates the electromagnetic force, which increases the amount of magnetic flux passing through the corresponding attracting magnetic circuit MCa and decreases the amount of magnetic flux passing through the corresponding non-attracting magnetic circuit MCb.

In this way, the attracting magnetic force, which is generated by the attracting magnetic circuits MCa, becomes larger than the magnetic force, which is generated by the non-attracting magnetic circuits MCb. Thereby, the movable member 52 is displaced toward the one axial side where the end surface portion 33 of the pulley 30 is located.

Upon this displacement of the movable member 52, the magnetic resistance of the attracting magnetic circuit MCa is reduced in comparison to the magnetic resistance of the attracting magnetic circuit MCa in the decoupled state of the pulley 30 and the armature 40. Thereby, the amount of magnetic flux of the attracting magnetic circuit MCa is further increased. Thus, the attracting magnetic force becomes larger than the repulsive force of the rubber 45, so that the pulley 30 and the armature 40 are coupled with each other. As a result, the rotational drive force is conducted from the engine 10 to the compressor 2.

The clutch mechanism 20 of the present embodiment is operated in the above described manner and thereby provides the following advantages.

First of all, at the time of coupling between the pulley 30 and the armature 40, the first and second electromagnets 53, 54 respectively generate the electromagnetic force, which causes the increase in the amount of magnetic flux passing through each corresponding attracting magnetic circuit MCa and also causes the decrease in the amount of magnetic flux passing through each corresponding non-attracting magnetic circuit MCb. Therefore, the movable member 52 can be easily displaced to the location, at which the magnetic resistance of the attracting magnetic circuit MCa is reduced.

In this way, the amount of magnetic flux of the attracting magnetic circuit MCa is increased, and thereby the attracting magnetic force becomes larger than the resilient force (repulsive force) of the rubber 45. Thus, the pulley 30 and the armature 40 can be coupled with each other. Furthermore, when the amount of magnetic flux of the attracting magnetic circuit MCa is increased, the movable member 52 can be held at the location, at which the magnetic resistance of the attracting magnetic circuit MCa is reduced.

Specifically, once the first and second electromagnets 53, 54 exert the corresponding electromagnetic forces to displace the movable member 52 to the location, at which the magnetic resistance of each attracting magnetic circuit MCa is reduced, the coupled state of the pulley 30 and the armature 40 can be maintained without a need for consuming the energy (electric power) for maintaining the location of the movable member 52.

Next, at the time of decoupling between the pulley 30 and the armature 40, the first and second electromagnets 53, 54 respectively generate the corresponding electromagnetic force, which causes the decrease in the amount of magnetic flux passing through each corresponding attracting magnetic circuit MCa and also causes the increase in the amount of magnetic flux passing through each corresponding non-attracting magnetic circuit MCb. Therefore, the movable member 52 can be easily displaced to the location, at which the magnetic resistance of the attracting magnetic circuit MCa is increased.

In this way, the amount of magnetic flux of the attracting magnetic circuit MCa is reduced, and thereby the resilient force (repulsive force) of the rubber 45 becomes larger than the attracting magnetic force. Thus, the pulley 30 and the armature 40 can be decoupled from each other.

Furthermore, at this time, the first and second electromagnets 53, 54 exert the electromagnetic forces to displace the movable member 52 to the location, at which the magnetic resistance of the attracting magnetic circuit MCa is increased, and the magnetic resistance of the non-attracting magnetic circuit MCb is reduced. Therefore, the amount of magnetic flux of the non-attracting magnetic circuit MCb can be increased. As a result, the movable member 52 can be held at the location, at which the magnetic resistance of each non-attracting magnetic circuit MCb is reduced.

Specifically, once the first and second electromagnets 53, 54 exert the electromagnetic forces to displace the movable member 52 to the location, at which the magnetic resistance of each non-attracting magnetic circuit MCb is reduced, the decoupled state of the pulley 30 and the armature 40 can be maintained without a need for consuming the energy (electric power) for maintaining the location of the movable member 52.

In the decoupled state of the pulley 30 and the armature 40, the movable member 52 is held at the location, at which the magnetic resistance of the non-attracting magnetic circuit MCb is reduced. Therefore, even when the relative distance between the pulley 30 and the armature 40 is reduced due to application of an external force (e.g., a force of a vibration), the magnetic resistance of the attracting magnetic circuit MCa will be reduced only to a certain degree.

Therefore, the attracting magnetic force generated by the first and second permanent magnets 51a, 51b will not be increased to a level, which is larger than the resilient force (repulsive force) of the rubber 45 and causes the coupling between the pulley 30 and the armature 40. Thereby, it is possible to limit the erroneous operation of the clutch mechanism, which is constructed to enable limiting of the energy consumption at the time of conducting the drive force.

Furthermore, according to the present embodiment, the first and second structural bodies 55a, 55b and the movable member 52 are placed in the hollow cylindrical space of the pulley 30. Therefore, it is possible to reduce the entire size of the clutch mechanism 20.

Also, according to the present embodiment, due to the presence of the slit holes 33a, 33b of the end surface portion 33 of the pulley 30 and the slit holes 40a of the armature 40, it is possible to bypass the flow of the magnetic flux, which passes through the respective attracting magnetic circuit MCa. Therefore, the magnetic flux, which passes from the pulley 30 side to the armature 40 side, and the magnetic flux, which passes from the armature 40 side to the pulley 30 side, are increased to increase the attracting magnetic force.

Second Embodiment

In the first embodiment, the two electromagnets, i.e., the first and second electromagnets 53, 54 are used. In the present embodiment, the first electromagnet 53 is eliminated, and ring members 58, which are configured into the same shape as those of the coil portions 53a, 53b, respectively, of the first electromagnet 53 and are made of a non-magnetic material (e.g., aluminum), are used to form the first structural body 55a. The rest of the remaining construction is the same as that of the first embodiment.

Next, the operation of the clutch mechanism 20 of the present embodiment will be described with reference to FIGS. 5A to 5D. FIGS. 5A to 5D correspond to FIGS. 4A to 4D, respectively, of the first embodiment. Furthermore, in FIGS. 5A to 5D, the cross-sectional area of each ring member 58 is indicated with a mesh hatching for ease of understanding.

Figure 5A:
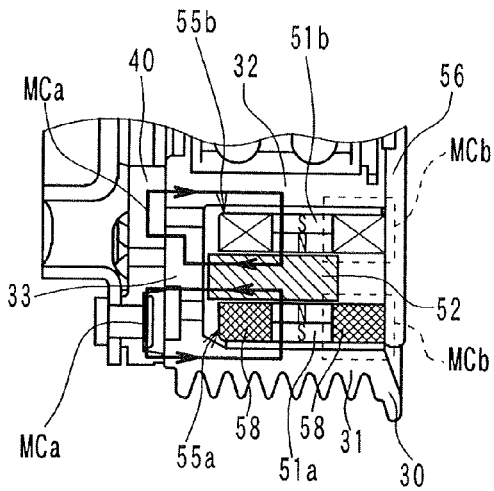
FIGS. 5A to 5D are schematic diagrams showing various operational states, respectively, of a clutch mechanism according to a second embodiment of the present invention, corresponding to FIGS. 4A to 4D, respectively.

As shown in FIG. 5A, in the coupled state of the pulley 30 and the armature 40, the movable member 52 is paced at the one axial side where the end surface portion 33 of the pulley 30 is located. Therefore, the amount of magnetic flux in each attracting magnetic circuit MCa in this coupled state of the pulley 30 and the armature 40, in which the movable member 52 is placed at the one axial side where the end surface portion 33 of the pulley 30 is located, is increased in comparison to the amount of magnetic flux in the other state where the movable member 52 is placed at the other axial side where the stator plate 56 is located. Therefore, the movable member 52 is held at the one axial side where the end surface portion 33 of the pulley 30 is located.

At this time, the attracting magnetic force is larger than the resilient force (repulsive force) of the rubber 45. Therefore, even though the electric power is not supplied to the second electromagnet 54, the coupled state of the pulley 30 and the armature 40 is maintained. Thereby, the rotational drive force is conducted from the engine 10 to the compressor 2.

Figure 5D:
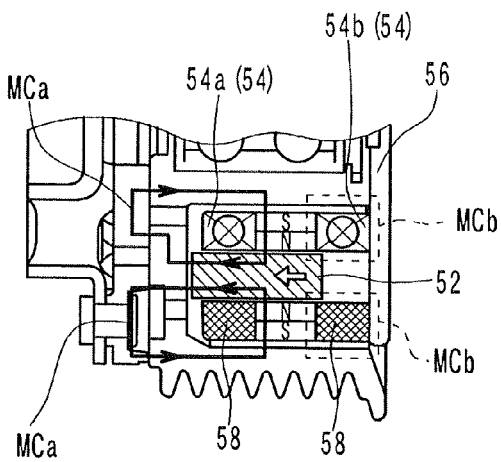
Figure 5B:
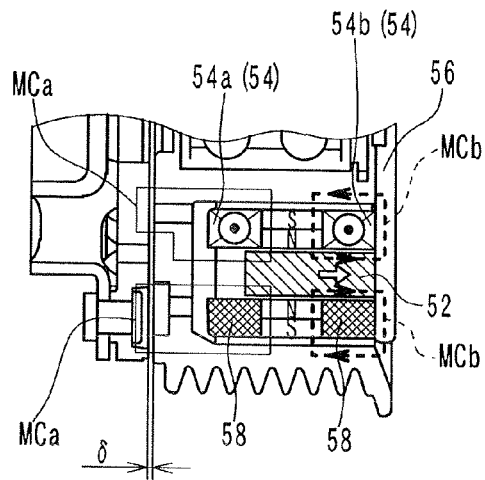

Next, at the time of decoupling between the pulley 30 and the armature 40, which have been held in the coupled state thereof, the air conditioning control unit 6 supplies the electric power to the second electromagnet 54 in a manner shown in FIG. 5B. In this way, the attracting magnetic force, which is generated by the non-attracting magnetic circuits MCb, becomes larger than the magnetic force, which is generated by the attracting magnetic circuits MCa. Thereby, the movable member 52 is displaced toward the other axial side where the stator plate 56 is located.

In response to this displacement, the amount of magnetic flux of each non-attracting magnetic circuit MCb is increased in comparison to the coupled state of the pulley 30 and the armature 40. Therefore, the movable member 52 is kept held at the other axial side where the stator plate 56 is located. Furthermore, the attracting magnetic force, which is generated by the attracting magnetic circuits MCa, is reduced, so that the repulsive force of the rubber 45 becomes larger than the attracting magnetic force. Therefore, the pulley 30 and the armature 40 are decoupled from each other. Thereby, the rotational drive force is no longer conducted from the engine 10 to the compressor 2.

Figure 5C:
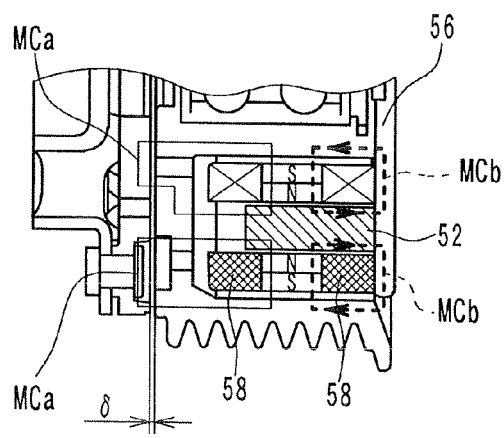

Next, as shown in FIG. 5C, in the decoupled state of the pulley 30 and the armature 40, in which the movable member 52 is placed at the other axial side where the stator plate 56 is located, the amount of magnetic flux of the non-attracting magnetic circuit MCb is increased in comparison to the amount of magnetic flux of the non-attracting magnetic circuit MCb in the coupled state of the pulley 30 and the armature 40, in which the movable member 52 is placed at the one axial side where the end surface portion 33 of the pulley 30 is located. Therefore, the movable member 52 is kept held at the other axial side where the stator plate 56 is located.

Furthermore, in the decoupled state of the pulley 30 and the armature 40, in which the movable member 52 is placed at the other axial side where the stator plate 56 is located, the attracting magnetic force is smaller than the repulsive force of the rubber 45. Therefore, even though the electric power is not supplied to the second electromagnet 54, the decoupled state of the pulley 30 and the armature 40 is maintained. That is, the rotational drive force of the engine 10 is not conducted to the compressor 2.

Next, at the time of coupling between the pulley 30 and the armature 40, which have been held in the decoupled state thereof, the air conditioning control unit 6 supplies the electric power to the second electromagnet 54 in a manner shown in FIG. 5D, like in the first embodiment. In this way, the attracting magnetic force, which is generated by the attracting magnetic circuits MCa, becomes larger than the magnetic force, which is generated by the non-attracting magnetic circuits MCb. Thereby, the movable member 52 is displaced toward the one axial side where the end surface portion 33 of the pulley 30 is located.

In response to this displacement, the amount of magnetic flux of each attracting magnetic circuit MCa is increased in comparison to the decoupled state of the pulley 30 and the armature 40. Thereby, the attracting magnetic force becomes larger than the repulsive force of the rubber 45, so that the pulley 30 and the armature 40 are coupled with each other. Thus, the rotational drive force is conducted from the engine 10 to the compressor 2.

Even when the movable member displacing means is made with the single electromagnet (specifically, the second electromagnet 54) as in the present embodiment, the same effect as that of the first embodiment can be implemented. Thereby, it is possible to limit the erroneous operation of the clutch mechanism, which is constructed to enable limiting of the energy consumption at the time of conducting the drive force, like in the first embodiment. Alternatively, the second electromagnet 54 of the first embodiment may be eliminated while providing the first electromagnet 53, and the ring members 58, which are configured into the same shape as those of the coil portions 54a, 54b of the second electromagnet 54 and are made of the non-magnetic material (e.g., aluminum), may be used to form the second structural body 55b.

Figure 6A:
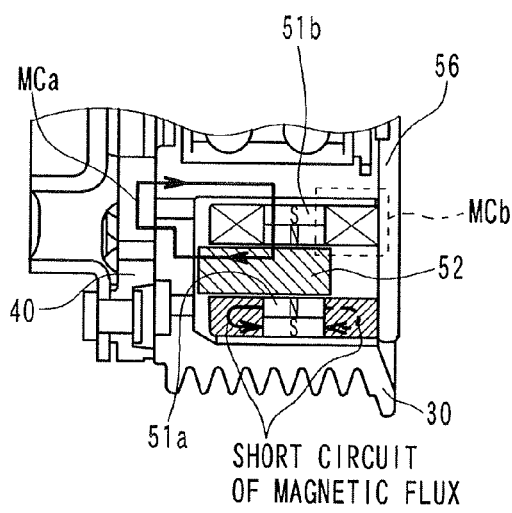
FIG. 6A is a schematic diagram showing a coupled state of a pulley and an armature in a comparative example.
Figure 6B:
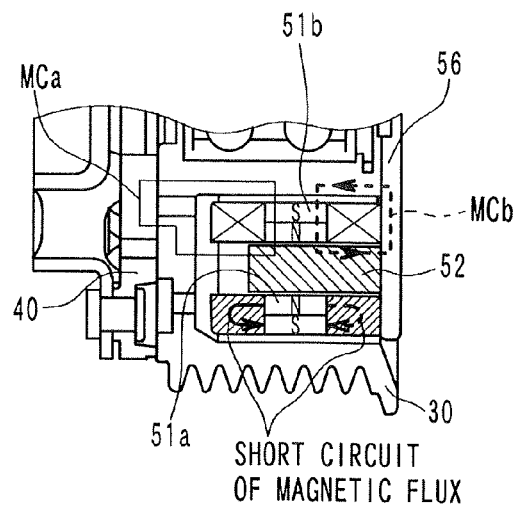
FIG. 6B is a schematic diagram showing a decoupled state of the pulley and the armature in the comparative example.

In the present embodiment, the ring members 58, which are made of the non-magnetic material, are used to form the first structural body 55a. Here, it is not desirable to use a ring member made of a magnetic material as the ring member 58. This reason is as follows. That is, as shown in FIGS. 6A and 6B, in a case where the magnetic material is placed at each of the one axial side and the other axial side of the first permanent magnet 51a, the short circuit of the magnetic circuit (magnetic flux) occurs.

This short circuit of the magnetic circuit reduces the amount of magnetic flux, which passes through the attracting magnetic circuit MCa, and also the amount of magnetic flux, which passes through the non-attracting magnetic circuit MCb.

Therefore, the effective use of magnetic flux of the first permanent magnet 51a is hindered. FIGS. 6A and 6B correspond to FIGS. 5A and 5C, respectively, and show the comparative example, in which the ring members made of the magnetic material are used as the ring members 58.

Therefore, in the case where the first structural body 55a cannot be formed with the ring members 58 made of the non-magnetic material at the time of eliminating the first electromagnet 53, it is desirable to leave a corresponding space, at which the ring member 58 is supposed to be placed, as an empty gap.

In the present embodiment, the first electromagnet 53, which is divided into the first and second coil portions 53a, 53b, is eliminated. Alternatively, one of the first and second coil portions 53a, 53b may be eliminated, and a ring member, which is made of a non-magnetic material and is similar to the ring member 58, may be used.

Furthermore, in the case where the ring member 58 cannot be placed, or in the case where it is possible to leave the corresponding space, at which the ring member 58 is supposed to be placed, as the empty gap, the corresponding space, at which the ring member 58 is supposed to be placed, may be left as the empty gap. This is also true for the case where the second electromagnet 54 is eliminated while providing the first electromagnet 53.

Figure 7A:
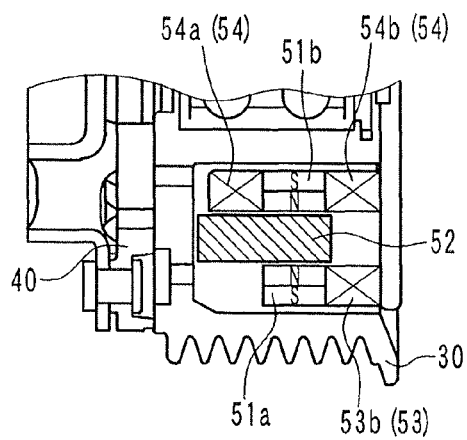
FIGS. 7A to 7F are schematic diagrams showing various modifications of the second embodiment.
Figure 7B:
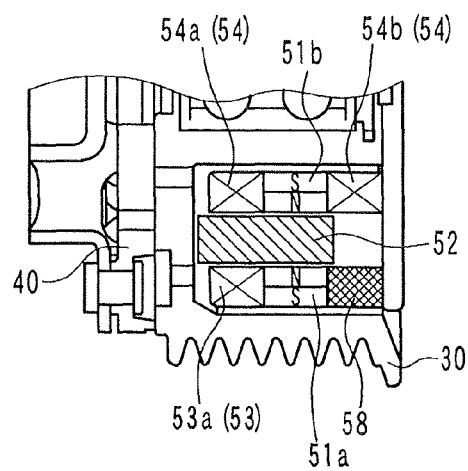
Figure 7C:
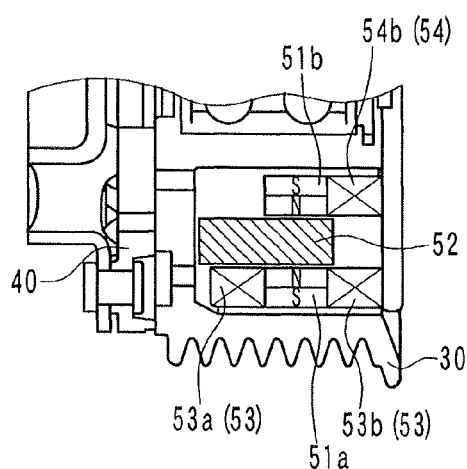
Figure 7D:
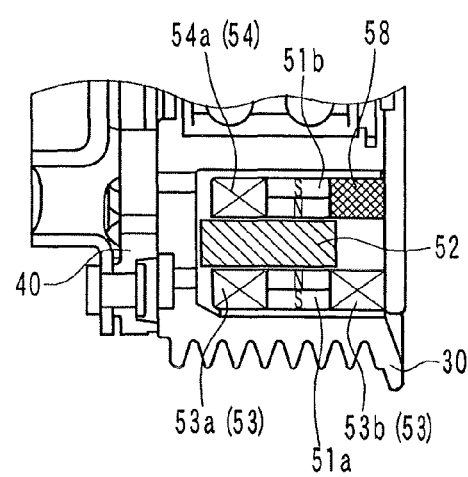

For example, as shown in FIG. 7A, the coil portion 53a of the first embodiment may be eliminated. Alternatively, as shown in FIG. 7B, the second coil portion 53b of the first embodiment may be eliminated, and the ring member 58 may be placed at the corresponding location where the second coil portion 53b is located in the first embodiment. Further alternatively, as shown in FIG. 7C, the third coil portion 54a of the first embodiment may be eliminated. Further alternatively, as shown in FIG. 7D, the fourth coil portion 54b of the first embodiment may be eliminated, and the ring member 58 may be placed at the corresponding location where the fourth coil portion 54b is located in the first embodiment.

Figure 7E:
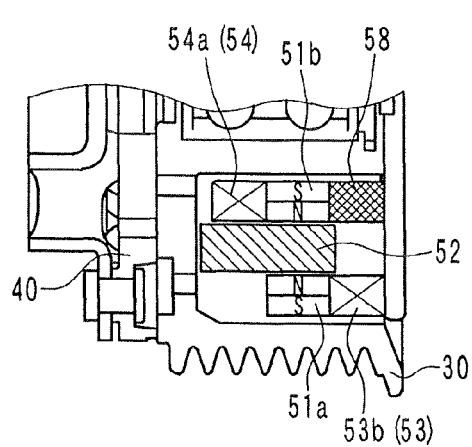
Figure 7F:
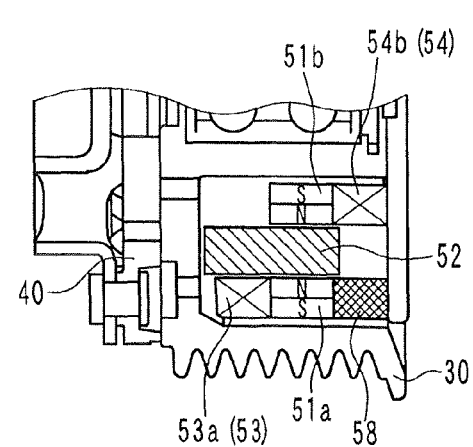

Further alternatively, as shown in FIG. 7E, the first and fourth coil portions 53a, 54b of the first embodiment may be eliminated, and the ring member 58 may be placed at the corresponding location where the fourth coil portion 54b is located in the first embodiment. Further alternatively, as shown in FIG. 7F, the second and third coil portions 53b, 54a of the first embodiment may be eliminated, and the ring member 58 may be placed at the corresponding location where the second coil portion 53b is located in the first embodiment.

Even with the modifications shown in FIGS. 7A to 7F, it is possible to limit the erroneous operation of the clutch mechanism, which is constructed to enable limiting of the energy consumption at the time of conducting the drive force, like in the first embodiment. FIGS. 7A to 7F correspond to FIG. 5A while eliminating the attracting magnetic circuits MCa and the non-attracting magnetic circuits MCb for the sake of clarity.

Third Embodiment

In the first embodiment, the two permanents magnets, i.e., the first and second permanent magnets 51a, 51b are used. In the present embodiment, the first permanent magnet 51a of the first embodiment is eliminated, and a ring member 59, which is configured into the same shape as that of the first permanent magnet 51a and is made of a non-magnetic material (e.g., aluminum), is used to form the first structural body 55a. The rest of the remaining construction is the same as that of the first embodiment.

Next, the operation of the clutch mechanism 20 of the present embodiment will be described with reference to FIGS. 8A to 8D. FIGS. 8A to 8D correspond to FIGS. 4A to 4D, respectively, of the first embodiment. Furthermore, in FIGS. 8A to 8D, the cross-sectional area of the ring member 59 is indicated with a mesh hatching for ease of understanding.

Figure 8A:
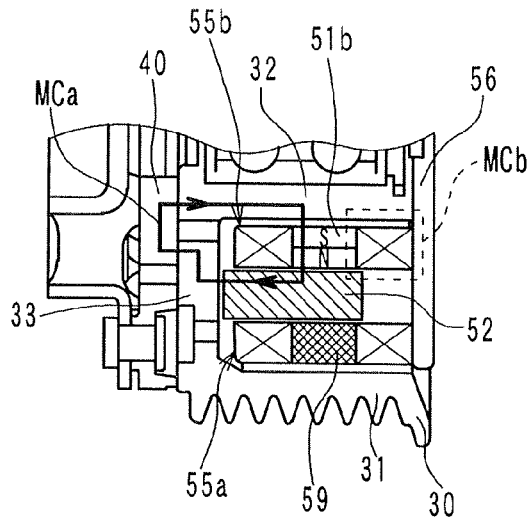
FIGS. 8A to 8D are schematic diagrams showing various operational states, respectively, of a clutch mechanism according to a third embodiment of the present invention, corresponding to FIGS. 4A to 4D, respectively.

As shown in FIG. 8A, in the coupled state of the pulley 30 and the armature 40, the movable member 52 is placed at the one axial side where the end surface portion 33 of the pulley 30 is located, like in the first embodiment. Therefore, the amount of magnetic flux of the attracting magnetic circuit MCa, which includes only the second permanent magnet 51b, in this coupled state of the pulley 30 and the armature 40 is increased in comparison to the decoupled state of the pulley 30 and the armature 40, in which the movable member 52 is placed at the other axial side where the stator plate 56 is located. Thereby, the movable member 52 is kept held at the one axial side where the end surface portion 33 of the pulley 30 is located.

At this time, the attracting magnetic force is larger than the resilient force (repulsive force) of the rubber 45. Therefore, even though the electric power is not supplied to the first and second electromagnets 53, 54, the coupled state of the pulley 30 and the armature 40 is maintained. Thereby, the rotational drive force is conducted from the engine 10 to the compressor 2.

Figure 8D:
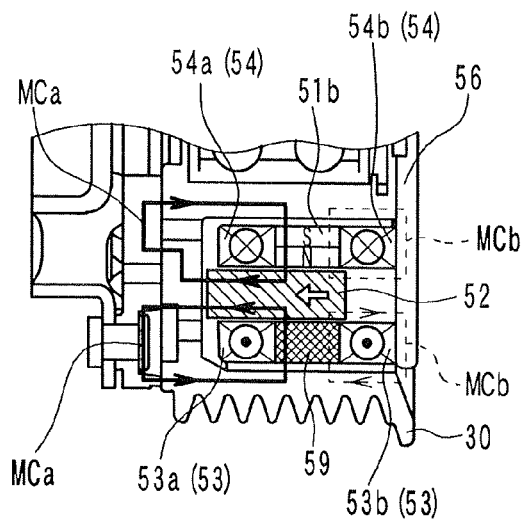
Figure 8B:
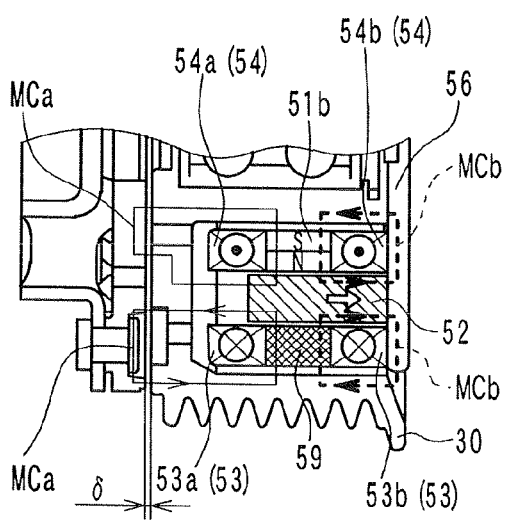

Next, at the time of decoupling between the pulley 30 and the armature 40, which have been held in the coupled state thereof, the air conditioning control unit 6 supplies the electric power to the first and second electromagnets 53, 54 in a manner shown in FIG. 8B. In this way, the attracting magnetic force, which is generated by the attracting magnetic circuits MCb, becomes larger than the magnetic force, which is generated by the non-attracting magnetic circuits MCa. Thereby, the movable member 52 is displaced toward the other axial side where the stator plate 56 is located.

In response to this displacement, the amount of magnetic flux of each non-attracting magnetic circuit MCb is increased in comparison to the coupled state of the pulley 30 and the armature 40. Therefore, the movable member 52 is kept held at the other axial side where the stator plate 56 is located. Furthermore, the attracting magnetic force, which is generated by the attracting magnetic circuits MCa, is reduced, so that the repulsive force of the rubber 45 becomes larger than the attracting magnetic force. Therefore, the pulley 30 and the armature 40 are decoupled from each other. Thereby, the rotational drive force is no longer conducted from the engine 10 to the compressor 2.

Figure 8C:
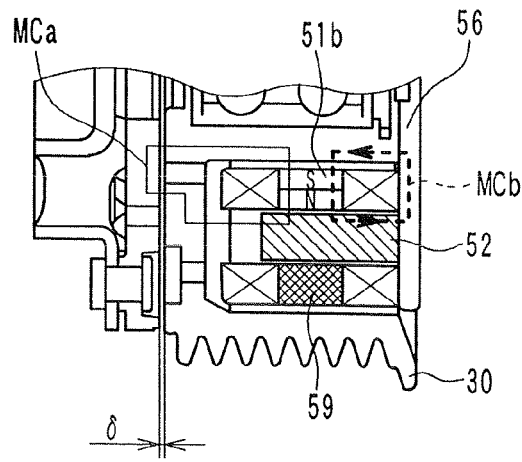

Next, as shown in FIG. 8C, in the decoupled state of the pulley 30 and the armature 40, in which the movable member 52 is placed at the other axial side where the stator plate 56 is located, the amount of magnetic flux of the non-attracting magnetic circuit MCb, which includes only the second permanent magnet 51b, is increased in comparison to the amount of magnetic flux of the non-attracting magnetic circuit MCb in the coupled state of the pulley 30 and the armature 40, in which the movable member 52 is placed at the one axial side where the end surface portion 33 of the pulley 30 is located. Therefore, the movable member 52 is kept held at the other axial side where the stator plate 56 is located.

Furthermore, in the decoupled state of the pulley 30 and the armature 40, in which the movable member 52 is placed at the other axial side where the stator plate 56 is located, the attracting magnetic force is smaller than the repulsive force of the rubber 45. Therefore, even though the electric power is not supplied to the first and second electromagnets 53, 54, the decoupled state of the pulley 30 and the armature 40 is maintained. That is, the rotational drive force of the engine 10 is not conducted to the compressor 2.

Next, at the time of coupling between the pulley 30 and the armature 40, which have been held in the decoupled state thereof, the air conditioning control unit 6 supplies the electric power to the first and second electromagnets 53, 54 in a manner shown in FIG. 8D, like in the first embodiment. In this way, the attracting magnetic force, which is generated by the attracting magnetic circuits MCa, becomes larger than the magnetic force, which is generated by the non-attracting magnetic circuits MCb. Thereby, the movable member 52 is displaced toward the one axial side where the end surface portion 33 of the pulley 30 is located.

In response to this displacement, the amount of magnetic flux of each attracting magnetic circuit MCa is increased in comparison to the decoupled state of the pulley 30 and the armature 40. Thereby, the attracting magnetic force becomes larger than the repulsive force of the rubber 45, so that the pulley 30 and the armature 40 are coupled with each other. Thus, the rotational drive force is conducted from the engine 10 to the compressor 2.

Even in the case of the present embodiment, in which the single permanent magnet (specifically, the second permanent magnet 51b) is used, the effect similar to that of the first embodiment can be implemented. Thereby, it is possible to limit the erroneous operation of the clutch mechanism, which is constructed to enable limiting of the energy consumption at the time of conducting the drive force, like in the first embodiment. Alternatively, the second permanent magnet 51b of the first embodiment may be eliminated while providing the first permanent magnet 51a, and a ring member (similar to the ring member 59 discussed above), which is configured into the same shape as that of the second permanent magnet 51b and is made of the non-magnetic material, may be used to form the second structural body 55b. Furthermore, a corresponding space, at which the ring member 59 is supposed to be placed, may be left as an empty gap.

Fourth Embodiment

In the first embodiment, the first structural body 55a, which includes the first permanent magnet 51a and the first electromagnet 53, and the second structural body 55b, which includes the second permanent magnet 51b and the second electromagnet 54, are described. In contrast, according to the present embodiment, the first structural body 55*a* of the first embodiment is entirely eliminated. The rest of the remaining construction is the same as that of the first embodiment.

Next, the operation of the clutch mechanism 20 of the present embodiment will be described with reference to FIGS. 9A to 9D. FIGS. 9A to 9D correspond to FIGS. 4A to 4D, respectively, of the first embodiment.

Figure 9A:
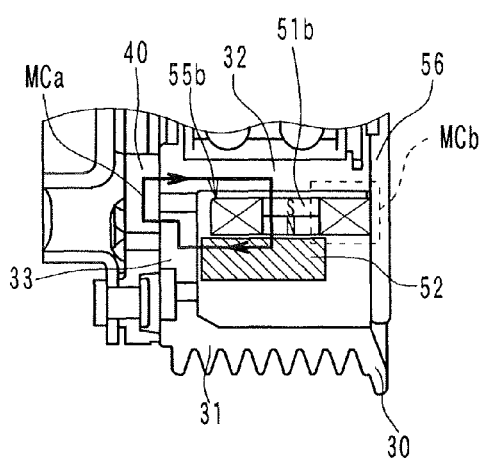
FIGS. 9A to 9D are schematic diagrams showing various operational states, respectively, of a clutch mechanism according to a fourth embodiment of the present invention, corresponding to FIGS. 4A to 4D, respectively.

As shown in FIG. 9A, in the coupled state of the pulley 30 and the armature 40, the movable member 52 is placed at the one axial side where the end surface portion 33 of the pulley 30 is located, like in the first embodiment. Therefore, the amount of magnetic flux of the attracting magnetic circuit MCa, which includes only the second permanent magnet 51*b*, in this coupled state of the pulley 30 and the armature 40 is increased in comparison to the decoupled state of the pulley 30 and the armature 40, in which the movable member 52 is placed at the other axial side where the stator plate 56 is located. Thereby, the movable member 52 is kept held at the one axial side where the end surface portion 33 of the pulley 30 is located.

At this time, the attracting magnetic force is larger than the resilient force (repulsive force) of the rubber 45. Therefore, even though the electric power is not supplied to the second electromagnet 54, the coupled state of the pulley 30 and the armature 40 is maintained. Thereby, the rotational drive force is conducted from the engine 10 to the compressor 2.

Figure 9D:
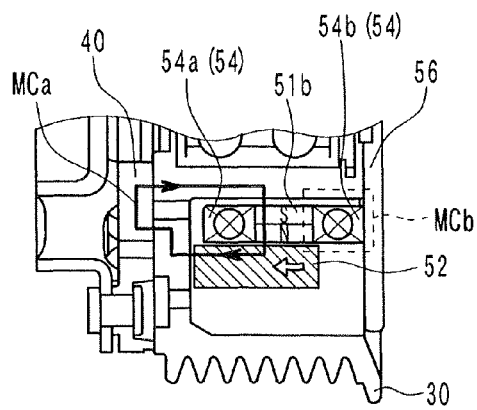
Figure 9B:
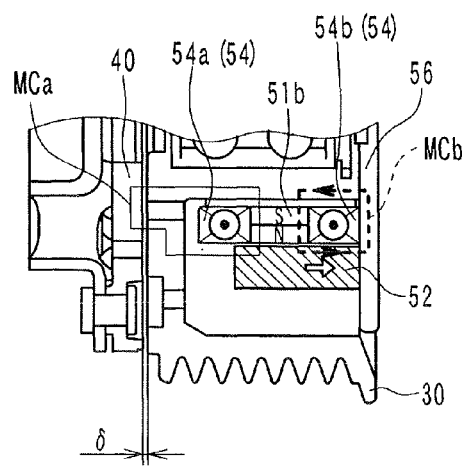

Next, at the time of decoupling between the pulley 30 and the armature 40, which have been held in the coupled state thereof, the air conditioning control unit 6 supplies the electric power to the second electromagnet 54 in a manner shown in FIG. 9B. In this way, the attracting magnetic force, which is generated by the non-attracting magnetic circuit MCb, becomes larger than the magnetic force, which is generated by the attracting magnetic circuit MCa. Thereby, the movable member 52 is displaced toward the other axial side where the stator plate 56 is located.

In response to this displacement, the amount of magnetic flux of the non-attracting magnetic circuit MCb is increased in comparison to the coupled state of the pulley 30 and the armature 40. Therefore, the movable member 52 is kept held at the other axial side where the stator plate 56 is located. Furthermore, the attracting magnetic force, which is generated by the attracting magnetic circuit MCa, is reduced, so that the repulsive force of the rubber 45 becomes larger than the attracting magnetic force. Therefore, the pulley 30 and the armature 40 are decoupled from each other. Thereby, the rotational drive force is no longer conducted from the engine 10 to the compressor 2.

Figure 9C:
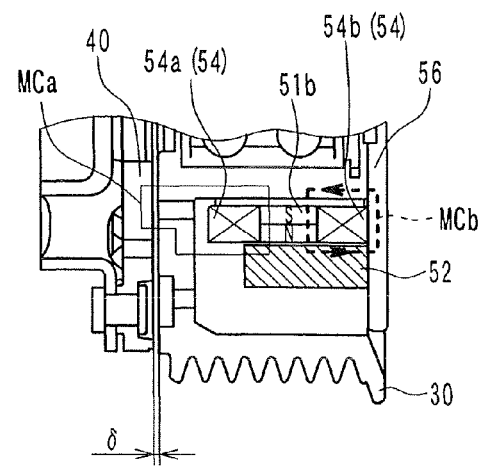

Next, as shown in FIG. 9C, in the decoupled state of the pulley 30 and the armature 40, in which the movable member 52 is placed at the other axial side where the stator plate 56 is located, the amount of magnetic flux of the non-attracting magnetic circuit MCb, which includes only the second permanent magnet 51*b*, is increased in comparison to the coupled state of the pulley 30 and the armature 40, in which the movable member 52 is placed at the one axial side where the end surface portion 33 of the pulley 30 is located. Therefore, the movable member 52 is kept held at the other axial side where the stator plate 56 is located.

Furthermore, in the decoupled state of the pulley 30 and the armature 40, in which the movable member 52 is placed at the other axial side where the stator plate 56 is located, the attracting magnetic force is smaller than the repulsive force of the rubber 45. Therefore, even though the electric power is not supplied to the second electromagnet 54, the decoupled state of the pulley 30 and the armature 40 is maintained. That is, the rotational drive force of the engine 10 is not conducted to the compressor 2.

Next, at the time of coupling between the pulley 30 and the armature 40, which have been held in the decoupled state thereof, the air conditioning control unit 6 supplies the electric power to the second electromagnet 54 in a manner shown in FIG. 9D, like in the first embodiment. In this way, the attracting magnetic force, which is generated by the attracting magnetic circuit MCa, becomes larger than the magnetic force, which is generated by the non-attracting magnetic circuit MCb. Thereby, the movable member 52 is displaced toward the one axial side where the end surface portion 33 of the pulley 30 is located.

In response to this displacement, the amount of magnetic flux of the attracting magnetic circuit MCa is increased in comparison to the decoupled state of the pulley 30 and the armature 40. Thereby, the attracting magnetic force becomes larger than the repulsive force of the rubber 45, so that the pulley 30 and the armature 40 are coupled with each other. Thereby, the rotational drive force is conducted from the engine 10 to the compressor 2.

Even when the first structural body 55*a* is entirely eliminated, it is possible to implement the same effect as that of the first embodiment. Furthermore, the non-magnetic material may be placed at the corresponding space where the first structural body 55*a* is supposed to be placed in the first embodiment. Also, it should be understood that the second structural body 55*b* may be entirely eliminated in place of the first structural body 55*a* while providing the first structural body 55*a*.

In the present embodiment, the first structural body 55*a* is entirely eliminated. However, as discussed in the first embodiment, the first structural body 55*a* includes the first permanent magnet 51*a* and the first electromagnet 53 (the first and second coil portions 53*a*, 53*b*). Therefore, one of the first permanent magnet 51*a*, the first coil portion 53*a* and the second coil portion 53*b* may be eliminated from the first structural body 55*a*. In such a case, a ring member, which is made of the non-magnetic material, may be placed in place of the eliminated one of the first permanent magnet 51*a*, the first coil portion 53*a* and the second coil portion 53*b* in the first structural body 55*a*.

Figure 10A:
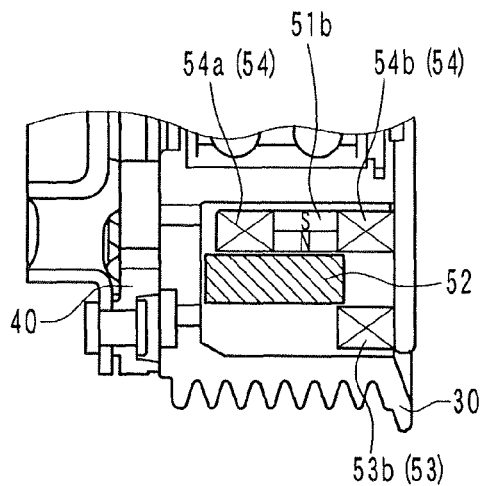
FIGS. 10A to 10D are schematic diagrams showing various modifications of the fourth embodiment.
Figure 10B:
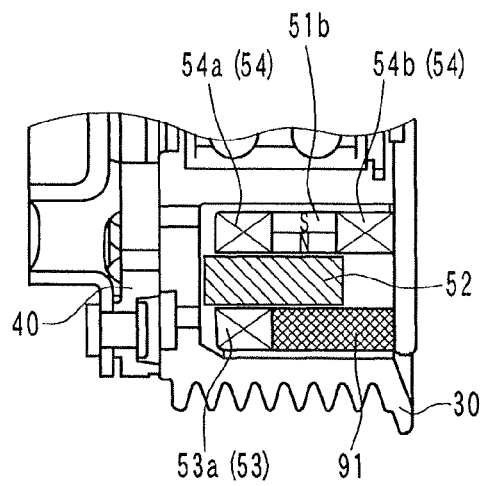
Figure 10C:
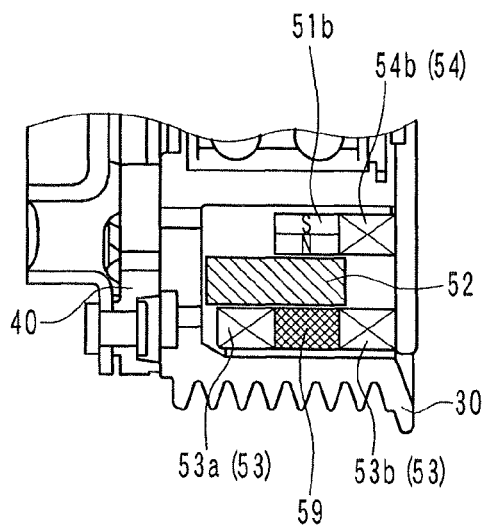
Figure 10D:
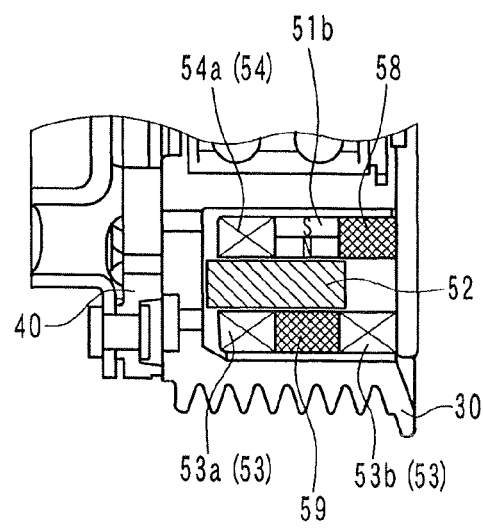

For example, as shown in FIG. 10A, the first permanent magnet 51*a* and the first coil portion 53*a* of the first embodiment may be eliminated. Alternatively, as shown in FIG. 10B, the first permanent magnet 51*a* and the second coil portion 53*b* of the first embodiment may be eliminated, and a ring member 91, which is made of the non-magnetic material, may be placed at the corresponding location where the first permanent magnet 51*a* and the second coil portion 53*b* are located in the first embodiment. Alternatively, as shown in FIG. 10C, the first permanent magnet 51*a* and the third coil portion 54*a* of the first embodiment may be eliminated, and a ring member 59, which is made of the non-magnetic material, may be placed at the corresponding location where the first permanent magnet 51*a* is located in the first embodiment. Alternatively, as shown in FIG. 10D, the first permanent magnet 51*a* and the fourth coil portion 54*b* of the first embodiment may be eliminated, and two ring members 59, 58, which are made of the non-magnetic material, may be placed at the two locations, respectively, where the first permanent magnet 51*a* and the fourth coil portion 54*b* are located respectively in the first embodiment.

Figure 11A:
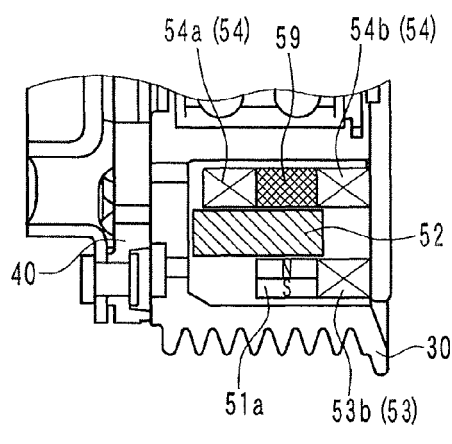
FIGS. 11A to 11D are schematic diagrams showing various other modifications of the fourth embodiment.
Figure 11B:
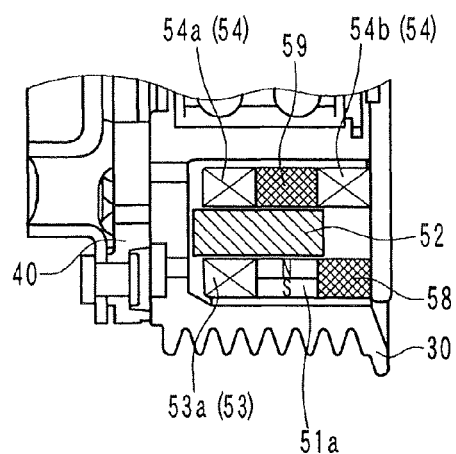
Figure 11C:
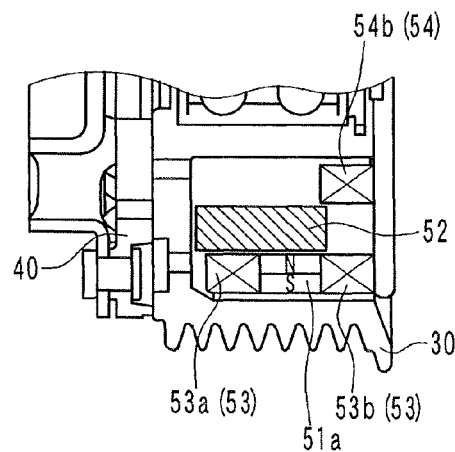
Figure 11D:
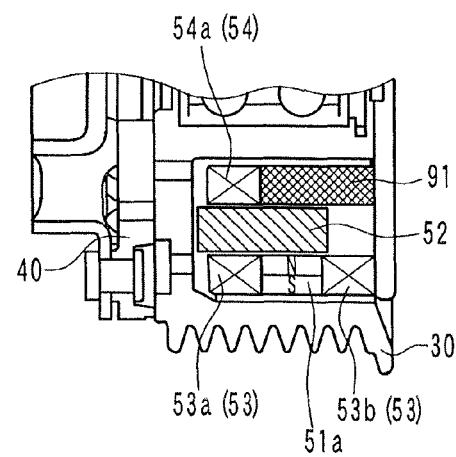

Further alternatively, as shown in FIG. 11A, the second permanent magnet 51*b* and the first coil portion 53*a* of the first embodiment may be eliminated, and a ring member 59, which is made of the non-magnetic material, may be placed at the location where the first permanent magnet 51b is located in the first embodiment. Alternatively, as shown in FIG. 11B, the second permanent magnet 51b and the second coil portion 53b of the first embodiment may be eliminated, and two ring members 59, 58, which are made of the non-magnetic material, may be placed at the two locations, respectively, where the second permanent magnet 51b and the second coil portion 53b are located respectively in the first embodiment. Further alternatively, as shown in FIG. 11C, the second permanent magnet 51b and the third coil portion 54a of the first embodiment may be eliminated. Further alternatively, as shown in FIG. 11D, the second permanent magnet 51b and the fourth coil portion 54b of the first embodiment may be eliminated, and a ring member 91, which is made of the non-magnetic material, may be placed at the location where the second permanent magnet 51b and the fourth coil portion 54b of the first embodiment are located in the first embodiment.

Figure 12A:
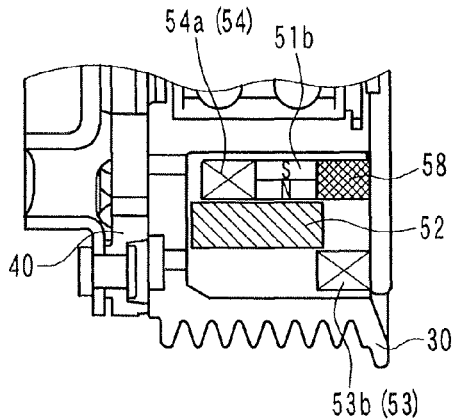
FIGS. 12A to 12F are schematic diagrams showing various other modifications of the fourth embodiment.
Figure 12B:
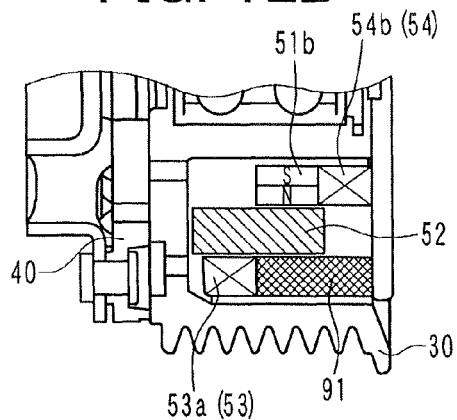
Figure 12C:
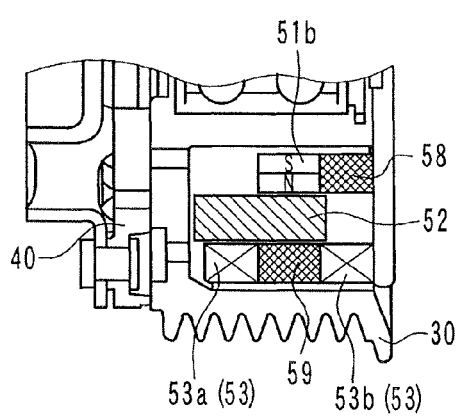

Further alternatively, as shown in FIG. 12A, the first permanent magnet 51a, the first coil portion 53a and the fourth coil portion 54b of the first embodiment may be eliminated, and a ring member 58, which is made of the non-magnetic material, may be placed at the corresponding location where the fourth coil portion 54b is located in the first embodiment. Further alternatively, as shown in FIG. 12B, the first permanent magnet 51a, the second coil portion 53b and the third coil portion 54a of the first embodiment may be eliminated, and a ring member 91, which is made of the non-magnetic material, may be placed at location where the first permanent magnet 51a and the second coil portion 53b are located in the first embodiment. Further alternatively, as shown in FIG. 12C, the first permanent magnet 51a, the third coil portion 54a and the fourth coil portion 54b of the first embodiment may be eliminated, and two ring members 59, 58, which are made of the non-magnetic material, may be placed at the locations where the first permanent magnet 51a and the fourth coil portion 54b are respectively located in the first embodiment.

Figure 12D:
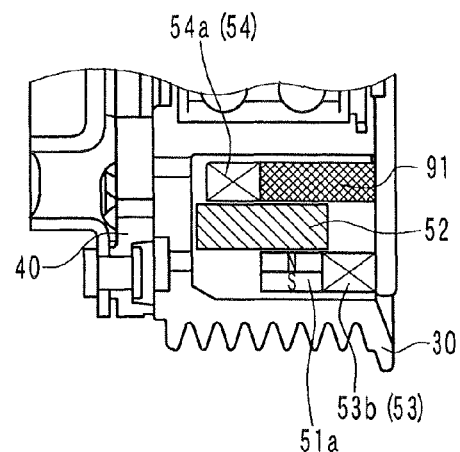
Figure 12E:
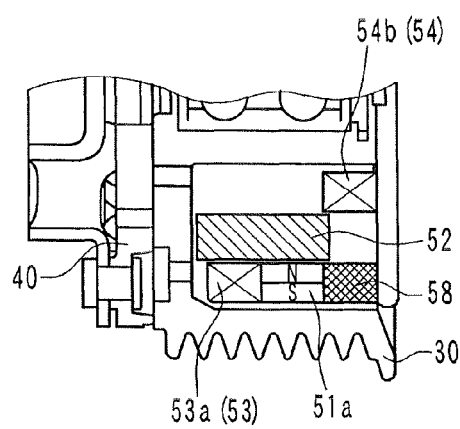
Figure 12F:
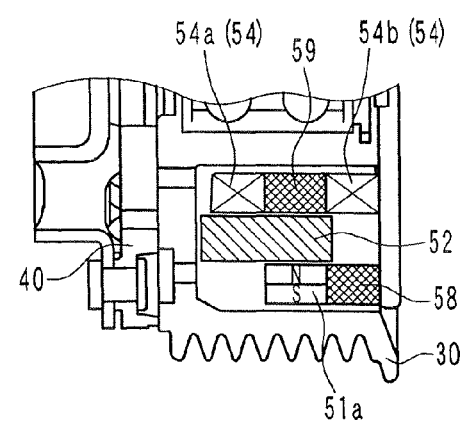

Further alternatively, as shown in FIG. 12D, the second permanent magnet 51b, the first coil portion 53a and the fourth coil portion 54b of the first embodiment may be eliminated, and a ring member 91, which is made of the non-magnetic material, may be placed at the location where the second permanent magnet 51b and the fourth coil portion 54b are located in the first embodiment. Further alternatively, as shown in FIG. 12E, the second permanent magnet 51b, the second coil portion 53b and the third coil portion 54a of the first embodiment may be eliminated, and a ring member 58, which is made of the non-magnetic material, may be placed at the location where the second coil portion 53b is located in the first embodiment. Further alternatively, as shown in FIG. 12F, the second permanent magnet 51b, the first coil portion 53a and the second coil portion 53b of the first embodiment may be eliminated, and two ring members 59, 58, which are made of the non-magnetic material, may be placed at the locations, where the second permanent magnet 51b and the second coil portion 53b are located respectively in the first embodiment.

That is, even in the cases of FIGS. 10A to 10D, 11A to 11D and 12A to 12D, the same effects as that of the first embodiment can be achieved. Thereby, it is possible to limit the erroneous operation of the clutch mechanism, which is constructed to enable limiting of the energy consumption at the time of conducting the drive force, like in the first embodiment.

FIGS. 10A to 10D, 11A to 11D and 12A to 12F correspond to FIGS. 9A to 9D. In these drawings, the attracting magnetic circuit MCa and the non-attracting magnetic circuit MCb are eliminated for the sake of clarity, and the cross-sectional area of each corresponding ring member is indicated with the mesh hatching for ease of understanding.

Fifth Embodiment

Figure 13:
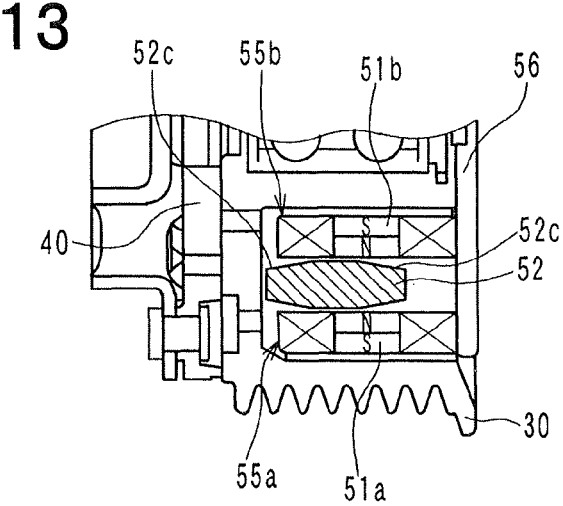
FIG. 13 is a cross-sectional view of a clutch mechanism according to a fifth embodiment of the present invention, corresponding to the area IV in FIG. 2.

In each of the above embodiments, the movable member 52 is configured as the cylindrical member (ring member). In the present embodiment, as shown in FIG. 13, the cross-sectional shape of the movable member 52 is changed. FIG. 13 is a diagram, which corresponds to the area indicated by the circle IV in FIG. 2. Furthermore, in FIG. 13, the hatchings of the components other than the movable member 52 are omitted for the sake of easy understanding.

That is, in each of the above embodiments, the axial cross-section (longitudinal cross-section) of the movable member 52 is the rectangular shape. In contrast, according to the present embodiment, as shown in FIG. 13, a tapered part 52c is provided at each corner of the rectangular shape.

The tapered parts 52c are set such that a thickness of the movable member 52, which is measured in a direction perpendicular to the axial direction of the movable member 52, is progressively reduced toward each of two opposed axial ends of the movable member 52. More specifically, in the present embodiment, each tapered part 52c is configured to extend linearly in the axial cross-section of the movable member 52.

Figure 14:
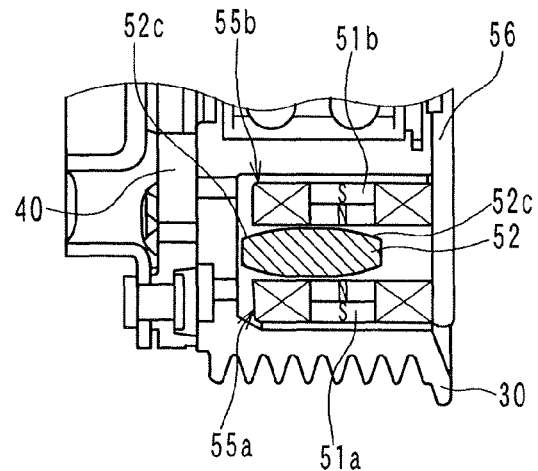
FIG. 14 is a cross-sectional view showing a modification of the fifth embodiment.

Alternatively, as shown in FIG. 14, each tapered part 52c may be configured into a curve, which is convex in the radially outward direction or in the radially inward direction, so that the axial cross-section of the movable member 52 may be shaped into a barrel form. The rest of the remaining construction is the same as that of the first embodiment.

In this way, a contact surface area between the movable member 52 and the first and second structural bodies 55a, 55b is reduced, and thereby a contact resistance between the movable member 52 and the first and second structural bodies 55a, 55b is reduced. Therefore, a slide resistance at the time of displacing the movable member 52 is reduced. Furthermore, the weight of the movable member 52 can be reduced. Therefore, it is possible to reduce the electric power supplied to the first and second electromagnets 53, 54 at the time of displacing the movable member 52.

Sixth Embodiment

In each of the above embodiments, the outer and inner circumferential surfaces (outer and inner peripheral surfaces) of the movable member 52 are surface treated to reduce the friction between the movable member 52 and the first and second permanent magnets 51a, 51b at the time of displacing the movable member 52. Alternatively, in the present embodiment, a wearing limiting member is added to the movable member 52 as a separate member.

When the frictional wearing between the movable member 52 and the first and second permanent magnets 51a, 51b is progressed, a gap between the movable member 52 and the first and second permanent magnets 51a, 51b is excessively increased. Thereby, the attracting magnetic circuit MCa and the non-attracting magnetic circuit MCb cannot be properly formed. Therefore, the coupled state or the decoupled state of the pulley and the armature 40 may not be maintained in some cases.

Figure 15:
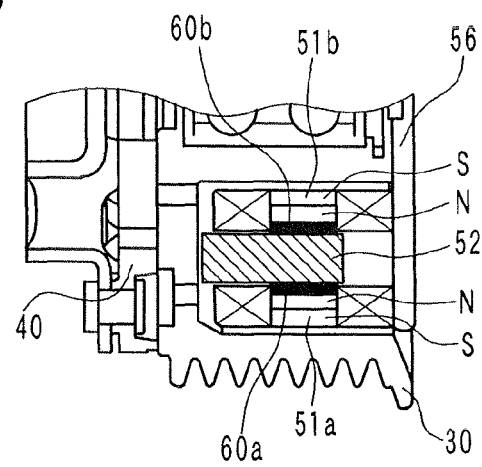
FIG. 15 is a cross-sectional view of a clutch mechanism according to a sixth embodiment of the present invention, corresponding to the area indicated by the circle IV in FIG. 2.
Figure 16:
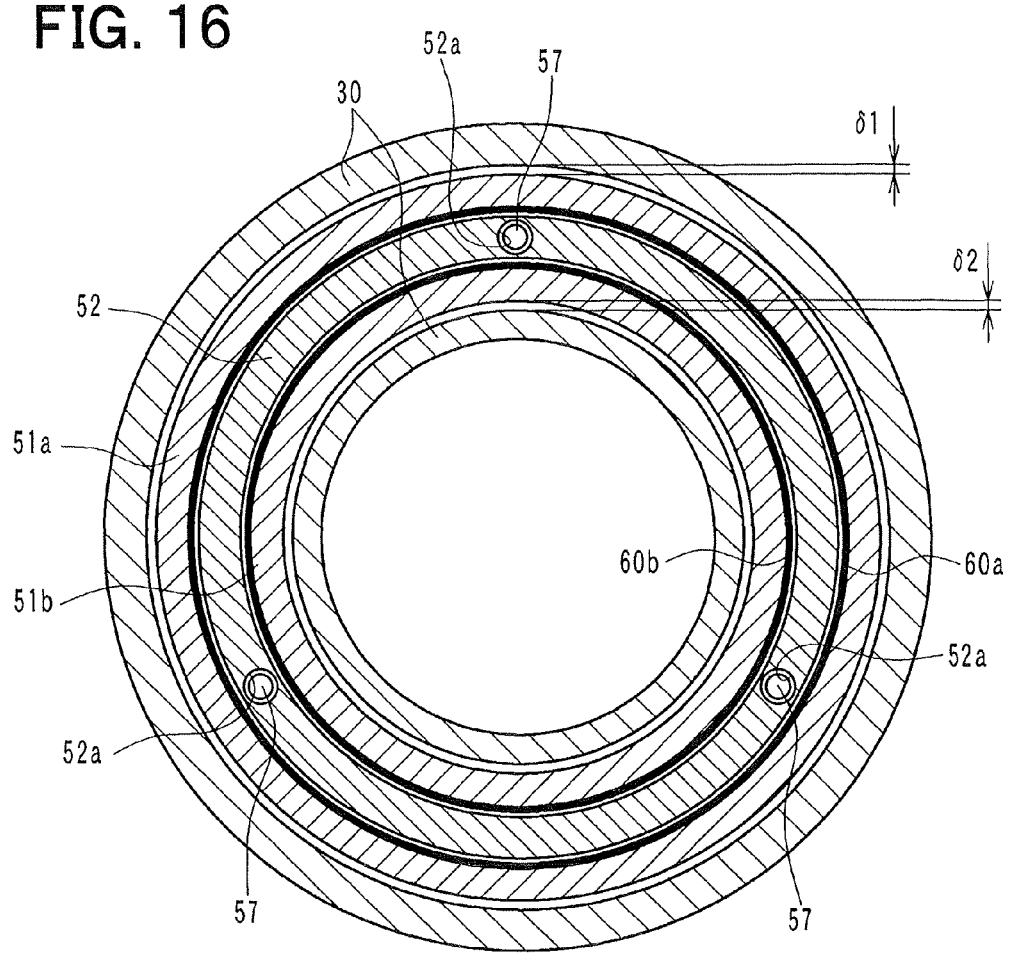
FIG. 16 is a cross-sectional view of the clutch mechanism of the sixth embodiment, corresponding to the view taken along line in FIG. 2.

In view of the above disadvantage, according to the present embodiment, as shown in FIGS. 15 and 16, a first wearing limiting member 60a, which is configured into a cylindrical tubular form, is placed along the inner circumferential surface of the first permanent magnet 51a, and a second wearing limiting member 60b, which is configured into a cylindrical tubular form, is placed along the outer circumferential surface of the second permanent magnet 51b. FIG. 15 is a cross-sectional view of the clutch mechanism of the present embodiment, corresponding to the area indicated by the circle IV in FIG. 2. FIG. 16 is a cross-sectional view of the clutch mechanism of the present embodiment, corresponding to the view taken along line in FIG. 2. Furthermore, in FIG. 15, the hatchings of the components other than the movable member 52 are omitted for the sake of easy understanding.

The first and second wearing limiting members 60a, 60b are joined to the first and second permanent magnets 51a, 51b, respectively, by a joining means (e.g., bonding agent). The first and second wearing limiting members 60a, 60b may be made of a magnetic material (e.g., iron), a surface of which is hardened by, for example, quenching or galvanizing. The rest of the remaining construction is the same as that of the first embodiment.

In this way, it is possible to limit the frictional wearing of the movable member 52 and the first and second permanent magnets 51a, 51b caused by the displacing of the movable member 52. Furthermore, the first and second wearing limiting members 60a, 60b, which are made of the magnetic material, serve as yoke members, respectively. Therefore, the attracting magnetic circuits MCa and the non-attracting circuits MCb can be effectively formed. Furthermore, the amount (volume) of the first and second permanent magnets 51a, 51b can be reduced, and thereby the manufacturing costs of the clutch mechanism 20 can be reduced.

Figure 17:
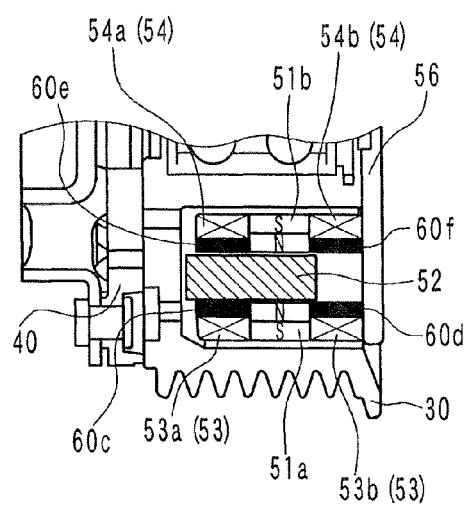
FIG. 17 is a cross-sectional view of a clutch mechanism of a modification of the sixth embodiment, corresponding to the area indicated by the circle IV in FIG. 2.

In the present embodiment, each of the first and second wearing limiting members 60a, 60b, which are made of the magnetic material, is placed between the movable member 52 and the corresponding one of the first and second permanent magnets 51a, 51b. Alternatively, as shown in FIG. 17, third and fourth wearing limiting members 60c, 60d, each of which is configured into a cylindrical tubular form, may be placed along the inner circumferential surface of the first electromagnet 53 (more specifically, the inner circumferential surfaces, respectively, of the first and second coil portions 53a, 53b), and fifth and sixth wearing limiting members 60e, 60f, each of which is configured into a cylindrical tubular form, may be placed along the outer circumferential surface of the second electromagnet 54 (more specifically, the outer circumferential surfaces, respectively, of the third and fourth coil portions 54a, 54b).

In this case, the third to sixth wearing limiting members 60c-60f may be made of the non-magnetic material (e.g., aluminum). In this way, it is possible to limit the wearing of the movable member 52 and the first and second permanent magnets 51a, 51b caused by the displacing of the movable member 52, and it is also possible to limit the short circuiting of the attracting magnetic circuits MCa and the non-attracting magnetic circuits MCb.

Furthermore, in this case, it is desirable that the movable member 52 overlaps with the third to sixth wearing limiting members 60c-60f in a view (i.e., view of FIG. 17) taken in the direction perpendicular the rotational axis even when the movable member 52 is displaced to any location. In this way, it is possible to limit the hitching (axial abutment) of the movable member 52 to the third to sixth wearing limiting members 60c-60f at the time of displacing of the movable member 52.

Figure 18:
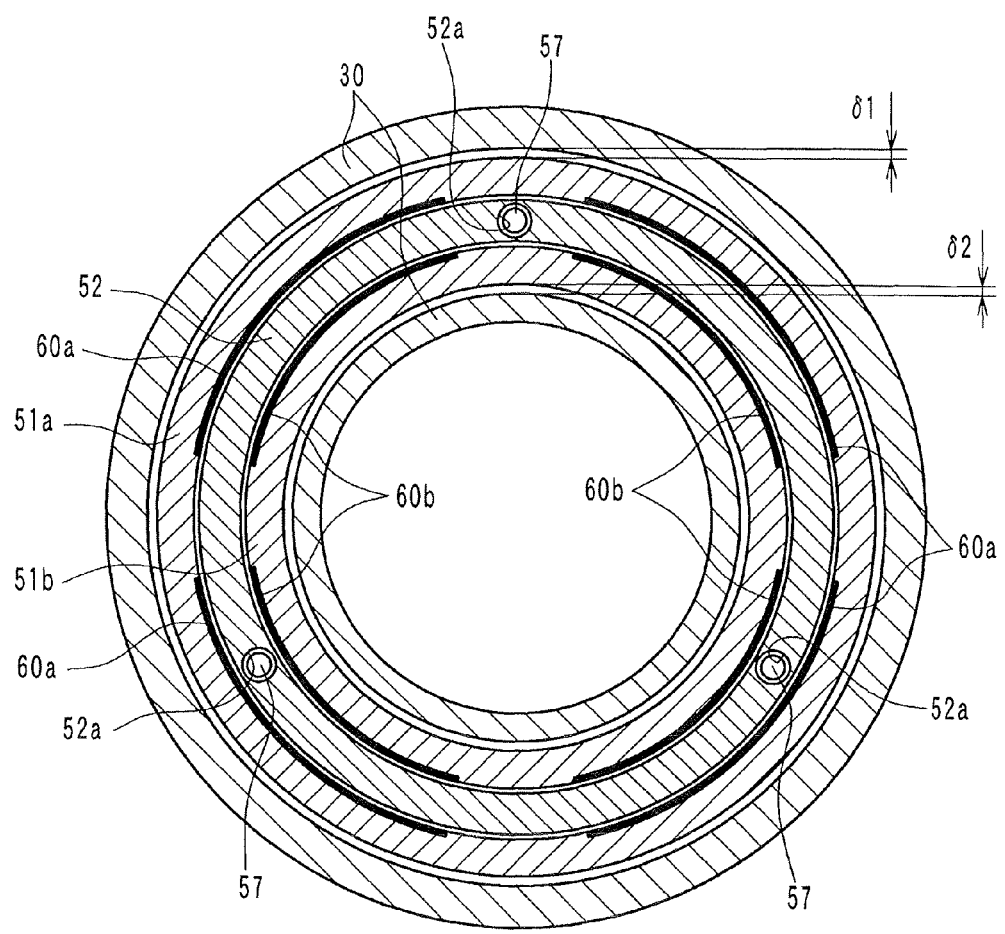
FIG. 18 is a cross-sectional view of a clutch mechanism of a modification of the sixth embodiment, corresponding to the view taken along line III-III in FIG. 2.

Furthermore, it is not necessary to form each of the first to sixth wearing limiting members 60a-60f into the cylindrical tubular form. For example, any one or more of the first to sixth wearing limiting members 60a-60f may be divided into a plurality (four in this instance) of arcuate segments, which are placed one after another in the circumferential direction, as shown in FIG. 18. Also, the first wearing limiting member 60a and the fifth and sixth wearing limiting members 60e, 60f may be used together. Also, the second wearing limiting member 60b and the third and fourth wearing limiting members 60c, 60d may be used together.

Seventh Embodiment

In each of the above embodiments, the enlarged diameter part 57a of the pin 57 and the engaging hole 52b of the corresponding pin receiving hole 52a serve as the displaceable range limiting means. Alternatively, as shown in FIG. 19A, the displaceable range limiting means may be formed by providing a thick wall portion(s) 52b in the movable member 52.

Figure 19A:
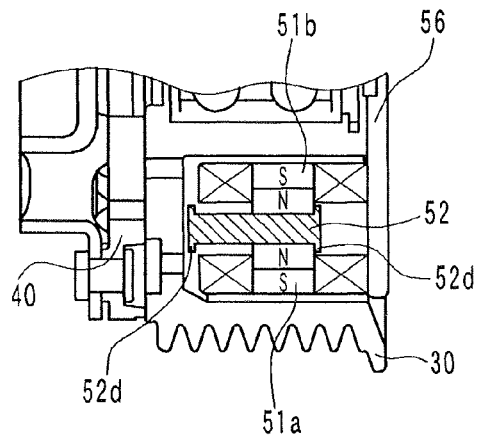
FIG. 19A is a cross-sectional view of a clutch mechanism according to a seventh embodiment of the present invention, corresponding to the area indicated by the circle IV in FIG. 2.
Figure 19B:
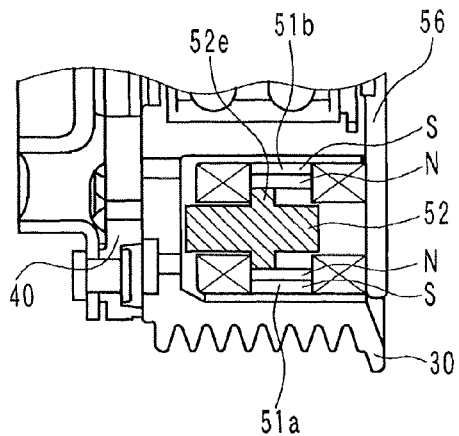
FIGS. 19B to 19D are cross-sectional views of a clutch mechanism in various modifications of the seventh embodiment, corresponding to the area indicated by the circle IV in FIG. 2.
Figure 19C:
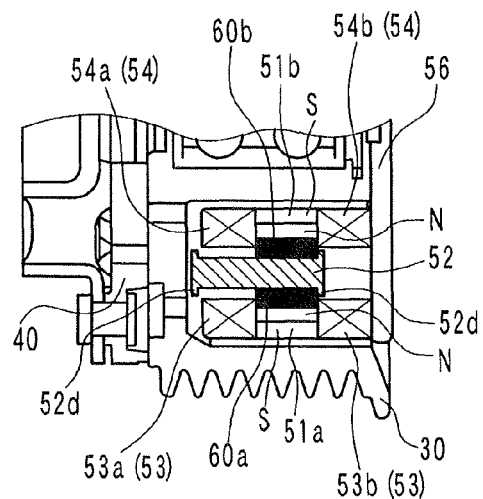
Figure 19D:
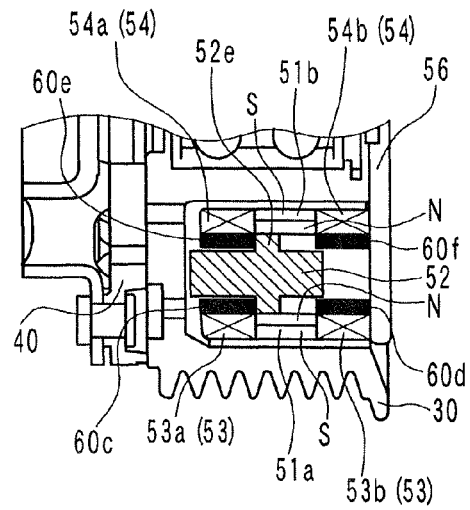

FIG. 19A is a diagram, which corresponds to the area indicated by the circle IV in FIG. 2. FIGS. 19B to 19D are diagrams showing modifications of the present embodiment. Furthermore, in FIG. 19A to 19D, the hatchings of the components other than the movable member 52 are omitted for the sake of easy understanding.

Specifically, the movable member 52 of the present embodiment has two thick portions 52d at the opposed axial ends, respectively, of the movable member 52. A thickness of each thick portion 52d, which is measured in the radial direction perpendicular to the rotational axis, is larger than a thickness of the axial center portion of the movable member 52. That is, as shown in FIG. 19A, the axial cross-section of the movable member 52 of the present embodiment is configured to have an H-shape. Furthermore, in the present embodiment, the inner diameter of the first permanent magnet 51a is set to be smaller than the inner diameter of the first electromagnet 53, and the outer diameter of the second permanent magnet 51b is set to be larger than the outer diameter of the second electromagnet 54. The rest of the remaining construction is the same as that of the first embodiment.

In this way, when the movable member 52 is displaced, one of the thick portions 52d of the movable member 52 contacts the corresponding one of the first and second permanent magnets 51a, 51b. Thereby, the displaceable range of the movable member 52 in the axial direction of the rotational axis is limited. That is, in the present embodiment, the thick portions 52d and the first and second permanent magnets 51a, 51b serve as the displaceable range limiting means, and the first and second permanent magnets 51a, 51b serve as the contact portions.

Furthermore, a shock absorbing member (not shown), such as a resilient member or elastomer (e.g., rubber) or resin, is placed between a contact surface of each of the thick portions 52d of the movable member 52 and the corresponding contact surfaces of the first and second permanent magnets 51a, 51b, which contact the contact surface of the think portion 52d upon displacing of the movable member 52. Thereby, the collision impact at the time of contacting the thick portion 52d of the movable member 52 against the contact surfaces of the first and second permanent magnets 51a, 51b can be reduced or alleviated, and the operational noise associated with the movement of the movable member 52 can be reduced.

Furthermore, as a modification of the present embodiment, in place of the thick portions 52d of FIG. 19A, a thick portion 52e may be formed at the axial center area of the movable member 52 such that a thickness of the thick portion 52e, which is measured in the radial direction perpendicular to the rotational axis, is larger than that of each of the opposed end parts of the movable member 52, as shown in FIG. 19B. In such a case, the axial cross-section of the movable member 52 has a crisscross shape. Furthermore, in such a case, an inner diameter of the first permanent magnet 51*a* is set to be larger than an inner diameter of the first electromagnet 53, and an outer diameter of the second permanent magnet 51*b* is set to be smaller than an outer diameter of the second electromagnet 54.

Also, a shock absorbing member (not shown), such as a resilient member or elastomer (e.g., rubber) or resin, is placed between each of two opposed contact surfaces of the thick portion 52*e* of the movable member 52 and the corresponding contact surfaces of the first and second electromagnets 53, 54. In this way, the thick portion 52*e* and the first and second permanent magnets 51*a*, 51*b* serve as the displaceable range limiting means, and the first and second electromagnets 53, 54 serve as the contact portions, respectively. Thereby, the advantages discussed with reference to FIG. 19A can be achieved.

Furthermore, in another modification of the present embodiment shown in FIG. 19C, the movable member 52 of the present embodiment shown in FIG. 19A having the H-shape in the axial cross-section and the first and second wearing limiting members 60*a*, 60*b* of the sixth embodiment serve as the displaceable range limiting means and the contact portions. Also, a shock absorbing member (not shown), such as a resilient member or elastomer (e.g., rubber) or resin, is placed between the contact surface of each of the thick portions 52*d* of the movable member 52 and the corresponding contact surfaces of the first and second wearing limiting members 60*a*, 60*b*.

Furthermore, in another modification of the present embodiment shown in FIG. 19D, the movable member 52 of the modification of FIG. 19B having the crisscross shape in the axial cross-section thereof and the third to sixth wearing limiting members 60*c*-60*f* of the sixth embodiment serve as the displaceable range limiting means and the contact portions. Furthermore, a shock absorbing member (not shown), such as a resilient member or elastomer (e.g., rubber) or resin, is placed between each of two opposed contact surfaces of the thick portion 52*e* of the movable member 52 and the corresponding contact surfaces of the third to sixth friction limiting members 60*c*-60*f*.

Further alternatively, the displaceable range of the movable member 52 in the axial direction may be limited by contacting the movable member 52 against the stator plate 56.

Eighth Embodiment

In the above embodiments, the first coil portion 53*a*, the first permanent magnet 51*a* and the second coil portion 53*b* are fixed integrally by the bonding agent (adhesive) to form the first structural body 55*a*, and the third coil portion 54*a*, the second permanent magnet 51*b* and the fourth coil portion 54*b* are fixed integrally by the bonding agent (adhesive) to form the second structural body 55*b*. Alternatively, in the present embodiment, as shown in FIGS. 20 and 21, first and second bobbins 61, 62 are used to fix these components to form the first and second structural bodies 55*a*, 55*b*.

Figure 20:
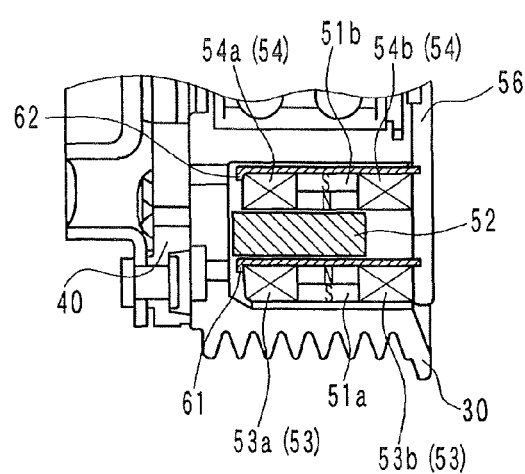
FIG. 20 is a cross-sectional view of a clutch mechanism according to an eighth embodiment of the present invention, corresponding to the area indicated by the circle IV in FIG. 2.
Figure 21:
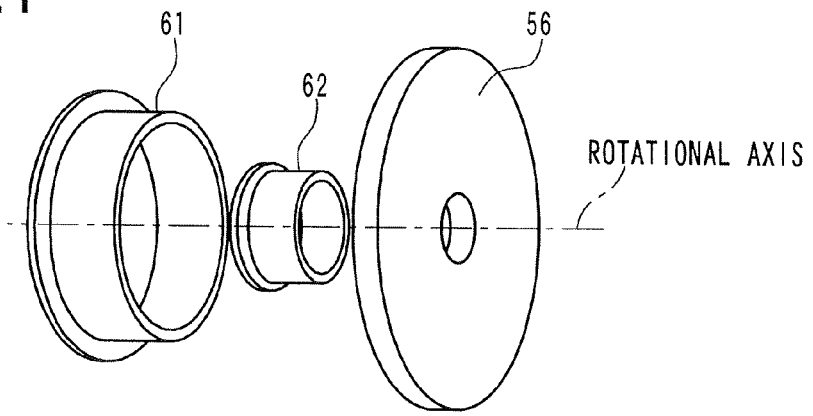
FIG. 21 is an exploded perspective view of a stator plate and first and second bobbins of the clutch mechanism of the eighth embodiment.

FIG. 20 is a diagram, which corresponds to the area indicated by the circle IV in FIG. 2. FIG. 21 is an exploded perspective view of the stator plate 56 and the first and second bobbins 61, 62. Furthermore, in FIG. 20, the hatchings of the components other than the first and second bobbins 61, 62 are omitted for the sake of easy understanding.

The first bobbin 51 is a cylindrical tubular member (body) made of a non-magnetic material (e.g., aluminum). The first permanent magnet 51*a* is fitted to the outer circumferential surface of the first bobbin 61, and the coil wire of the first and second coil portions 53*a*, 53*b* is wound around the outer circumferential surface of the first bobbin 61. Thereby, the first structural body 55*a* is formed. Also, it should be understood that the first bobbin 61 may be made of a resin material.

A basic structure of the second bobbin 62 is the same as that of the first bobbin 61. The second bobbin 61 is placed radially inward of the first bobbin 61. The second permanent magnet 51*b* is fitted to an outer circumferential surface of the second bobbin 61, and the coil wire of the third and fourth coil portions 54*a*, 54*b* are wound around the outer circumferential surface of the second bobbin 61.

Furthermore, the end part of each of the first and second bobbins 61, 62, which is located at the other axial side where the stator plate 56 is located, is fixed into a corresponding recess (groove) of the stator plate 56 by the joining means, e.g., bonding, friction welding, welding or press-fitting. The rest of the remaining construction is the same as that of the first embodiment. According to the present embodiment, the coil wires of the first to fourth coil portions 53*a*-54*b* can be directly and easily wound around the first and second bobbins 61, 62. Therefore, work efficiency in the manufacturing of the stator 50 can be improved.

Furthermore, according to the present embodiment, the first and second bobbins 61, 62 are fixed to the stator plate 56 by joining the first and second bobbins 61, 62 to the stator plate 56. Alternatively, the first and second bobbins 61, 62 may be fixed to the stator plate 56 by mechanically engaging the first and second bobbins 61, 62 to the stator plate 56.

Figure 22:
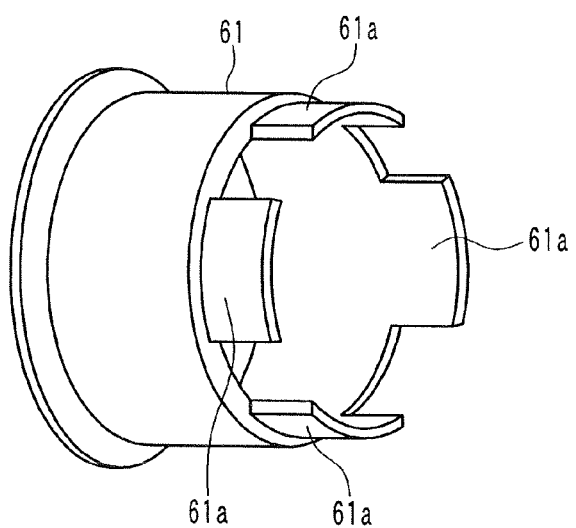
FIG. 22 is a perspective view showing a modification of the first bobbin of the eighth embodiment.
Figure 23:
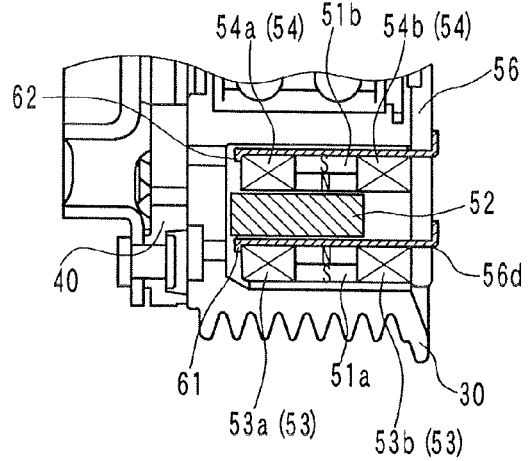
FIG. 23 is a cross-sectional view of the clutch mechanism of the eighth embodiment, corresponding to the area indicated by the circle IV in FIG. 2.

For example, as indicated in FIG. 22, which shows a perspective view of the first bobbin 61, engaging claws 61*a* may be formed at the end part of the first bobbin 61 located on the other axial side where stator plate 56 is located. With reference to FIG. 23, the engaging claws 61*a* may be inserted through engaging holes 56*b* of the stator plate 56, and distal end parts of the engaging claws 61*a*, which project from the engaging holes 56*b*, may be bent to fix the engaging claws 61*a* to the engaging holes 56*b*, thereby fixing the first bobbin 61 to the stator plate 56. The second bobbin 62 may be fixed to the stator plate 56 in a manner similar to that of the first bobbin 61.

When the first and second bobbins 61, 62 of the present embodiment are applied to any one or more of the second to fifth embodiments, it is possible to eliminate one or more of the permanent magnets and the coils. Also, the placement of the ring member(s) made of the non-magnetic material may be eased, and the formation of the gap may be eased.

Ninth Embodiment

In the above embodiments, the pins 57, which are fixed to the stator plate 56, and the pin receiving holes 52*a*, which are formed in the movable member 52, cooperate together to limit the rotation of the movable member 52 relative to the stator plate 56 about the rotational axis. Alternatively, in the present embodiment, as shown in FIGS. 24 and 25, the rotation of the movable member 52 is limited by a projection 51*c*, which is formed in the second permanent magnet 51*b*, and a projection receiving hole (recess or groove) 52*f*, which is formed in the movable member 52.

Figure 24:
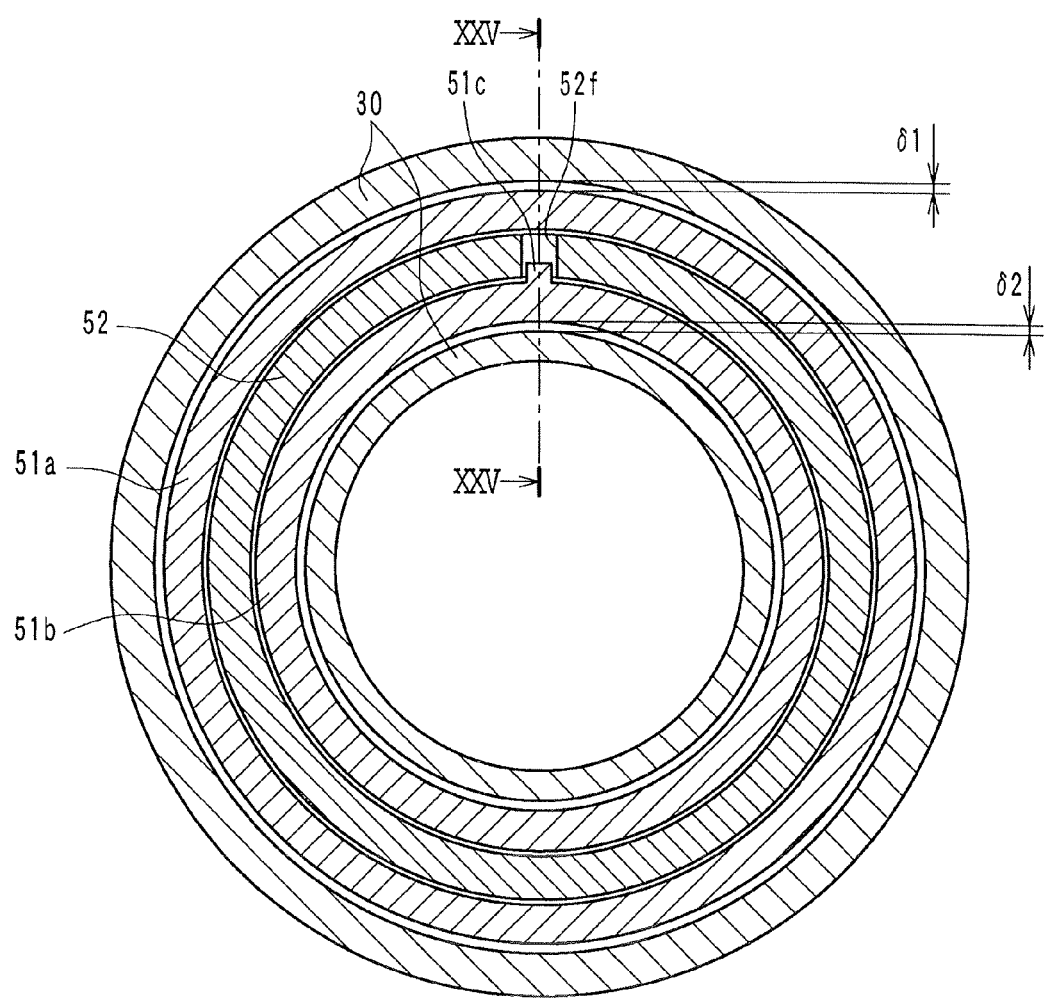
FIG. 24 is a cross-sectional view of a clutch mechanism according to a ninth embodiment of the present invention, corresponding to the view taken along line in FIG. 2.
Figure 25:
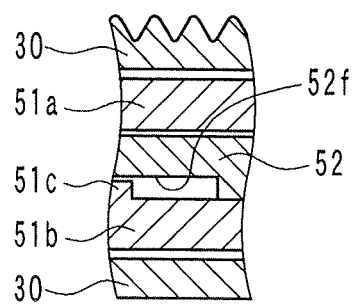
FIG. 25 is a cross-sectional view taken along line XXV-XXV in FIG. 24.

FIG. 24 is a cross-sectional view similar to the one taken along line in FIG. 2. FIG. 25 is a cross-sectional view taken along line XXV-XXV in FIG. 24. More specifically, the projection 51*c* is formed to radially outwardly project toward the movable member 52 at the one end part of the second permanent magnet 51*b*, which is located on the armature 40 side.

The projection receiving hole 52f is radially formed at the inner peripheral side of the movable member 52 to receive the projection 51c.

The projection receiving hole 52f extends from the one end part of the movable member 52, which is located on the armature 40 side, toward the other end part of the movable member 52, which is located on the stator plate 56 side, in the axial direction all the way to an intermediate axial location between the one end part and the other end part of the movable member 52. The rest of the remaining construction is the same as that of the first embodiment. Therefore, when the movable member 52 is displaced, an axial end surface (right end surface in FIG. 25) of the projection receiving hole 52f, which is located on the stator plate 56 side, contacts the projection 51c to limit the displaceable range of the movable member 52.

In the present embodiment, the pins 57 are eliminated, and the projection 51c of the second permanent magnet 51b and the projection receiving hole 52f of the movable member 52 cooperate together to limit the rotation of the movable member 52 and to limit the displaceable range of the movable member 52 to serve as the displaceable range limiting means with the simple structure.

Tenth Embodiment

As discussed with reference to FIG. 2 of the first embodiment, the gaps 61, 62 are formed between the hollow cylindrical space of the pulley 30 and the stator 50. Therefore, intrusion of foreign objects (e.g., dust, debris or the like) into the gaps δ1, δ2 may possibly occur. The intrusion of the foreign objects into the gaps δ1, δ2 may possibly interfere with the displacement of the movable member 52, thereby possibly resulting in the malfunction of the clutch mechanism.

Figure 26:
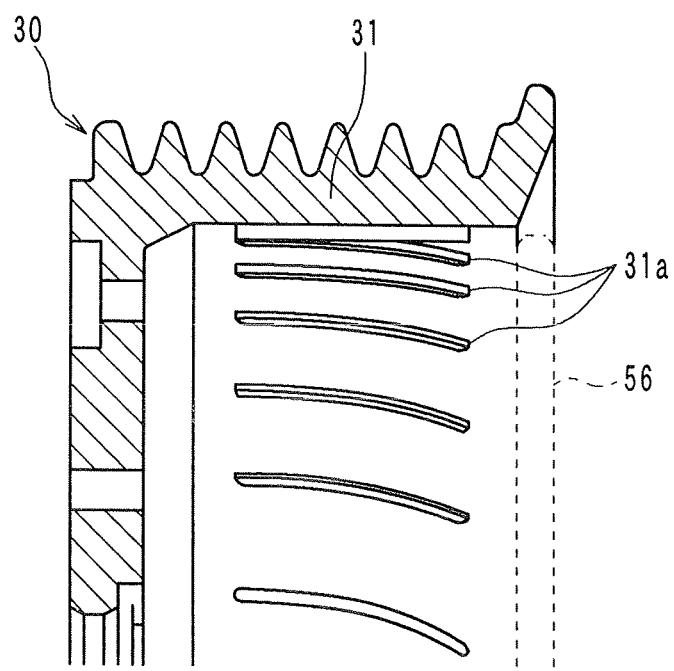
FIG. 26 is an enlarged cross-sectional view of a clutch mechanism according to a tenth embodiment of the present invention.

Therefore, according to the present embodiment, as shown in FIG. 26, a plurality of vanes 31a is formed in the inner circumferential surface (inner circumferential part) of the outer cylindrical portion 31 of the pulley 30 to create a flow of the air from the hollow cylindrical space toward the stator plate 56 side. In other words, the vanes 31a are formed to generate the flow of the air from the interior side toward the exterior side of the outer cylindrical portion 31.

FIG. 26 is an enlarged partial cross-sectional view of the pulley 30 of the present embodiment. The vanes 31a may be formed integrally with the pulley 30. Alternatively, the vanes 31a may be formed from a resin material separately from the pulley 30 and may be then joined to the inner circumferential surface of the outer cylindrical portion 31 of the pulley 30 by a joining means (e.g., a bonding agent or adhesive). The rest of the remaining construction is the same as that of the first embodiment.

According to the present embodiment, the flow of the air from the interior of the hollow cylindrical space toward the stator plate 56 side is created through the rotation of the pulley 30, so that it is possible to limit the intrusion of the foreign objects into the hollow cylindrical space through the gaps δ1, δ2. Alternatively, the first and second structural bodies 55a, 55b of the stator 50 and the movable member 52 may be received in a case (housing) to limit the displacement malfunction of the movable member 52 caused by biting of the foreign object.

Eleventh Embodiment

Figure 27:
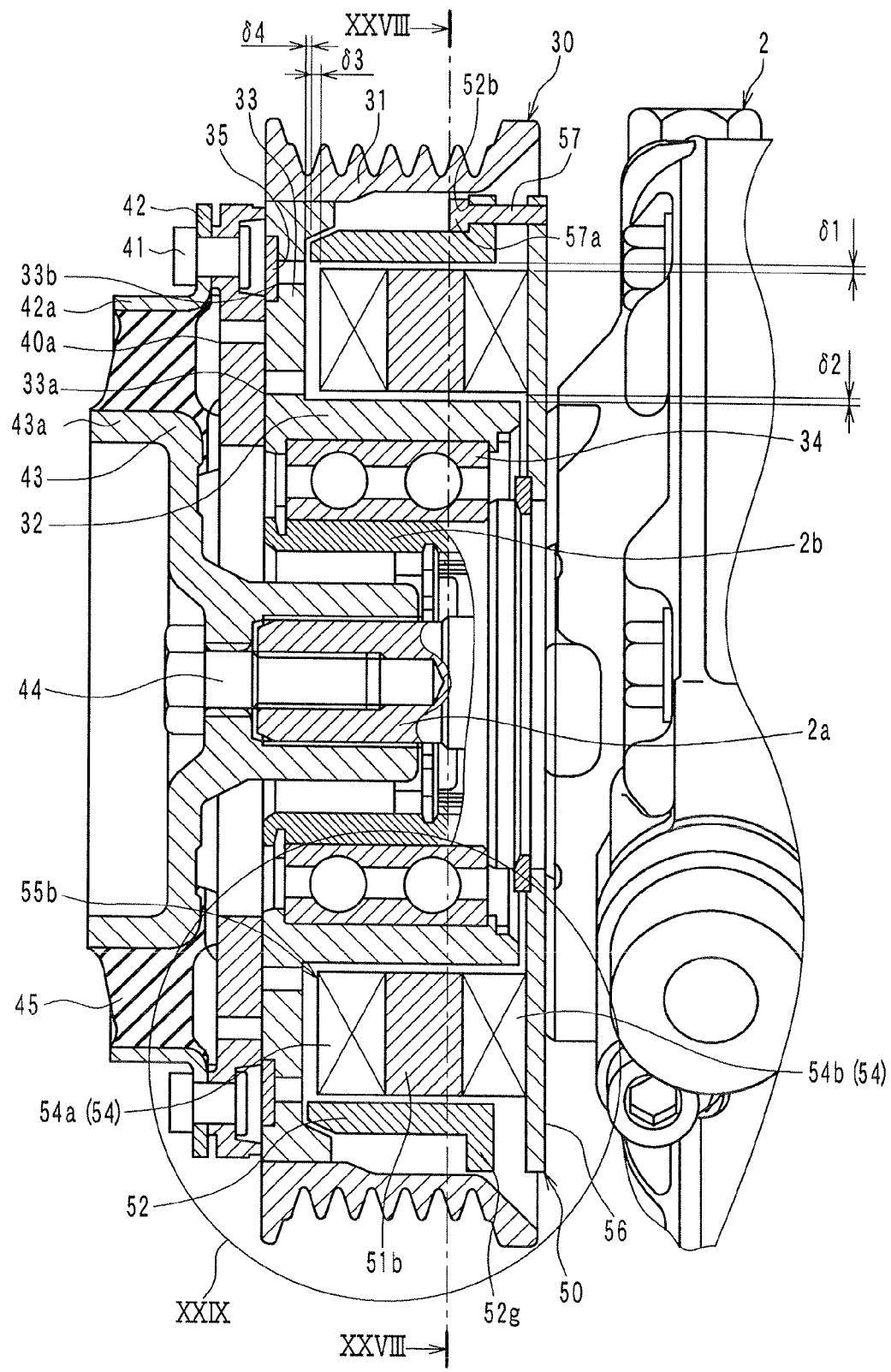
FIG. 27 is an axial cross-sectional view of a clutch mechanism according to an eleventh embodiment of the present invention.
Figure 28:
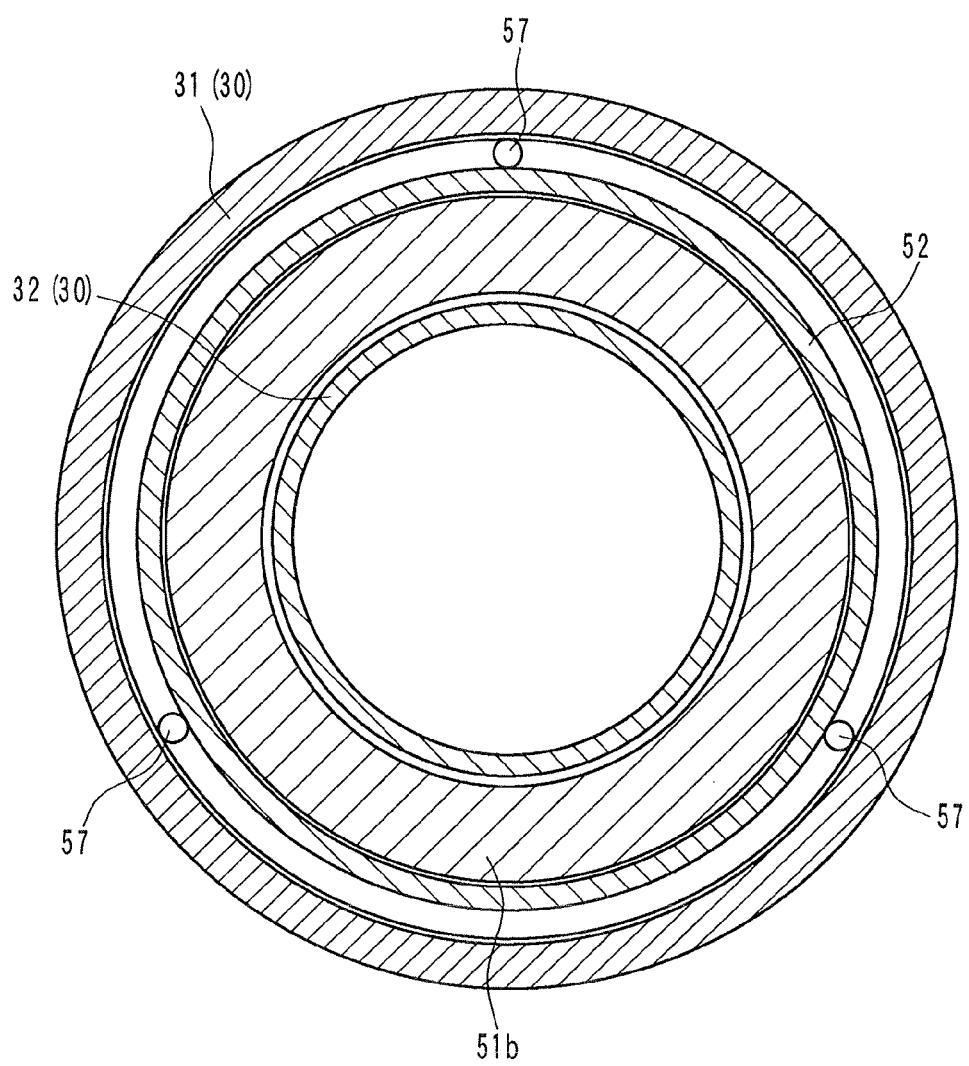
FIG. 28 is a cross sectional view taken along line XXVIII-XXVIII in FIG. 27.

In the present embodiment, the structures of the pulley 30 and the stator 50 of the first embodiment are changed as shown in FIG. 27. FIG. 27 shows a cross-sectional view of the clutch mechanism 20 of the present embodiment, and FIG. 28 is a view taken along line XXVIII-XXVIII in FIG. 27.

Specifically, the outer cylindrical portion 31 of the pulley 30 is made of a non-magnetic material (e.g., stainless steel). Furthermore, the outer cylindrical portion 31 is joined to the inner cylindrical portion 32 and the end surface portion 33, which are made integrally from the magnetic material like in the first embodiment, by bonding, press-fitting or the like.

Therefore, the pulley 30 of the present embodiment has the double cylindrical structure like in the first embodiment. However, the outer cylindrical portion 31 of the present embodiment is made of the non-magnetic material. Thus, unlike the first embodiment, the outer cylindrical portion 31 is not the part of the attracting magnetic circuit MCa and the non-attracting magnetic circuit MCb.

Next, similar to the first embodiment, the stator 50 of the present embodiment includes the permanent magnet 51b, the movable member 52, the electromagnet (serving as the movable member displacing means) 54 and the stator plate 56.

The permanent magnet 51b and the electromagnet 54 are placed radially inward of the movable member 52 and thereby correspond to the second permanent magnet 51b and the second electromagnet 54, respectively, of the first embodiment. Thus, in the present embodiment, the term "second" is eliminated, and the terms of the permanent magnet 51b and the electromagnet 54 are used while using the reference numerals 51b, 54, which are the same as the reference numerals of the second permanent magnet 51b and the second electromagnet 54 of the first embodiment.

Furthermore, in the present embodiment, the single permanent magnet 51b is used, so that the radial thickness of the permanent magnet 51b of the present embodiment is made larger than that of the second permanent magnet 51b of the first embodiment. This is also true for the electromagnet 54. The third coil portion 54a of the electromagnet 54, the permanent magnet 51b and the fourth coil portion 54b are fixed integrally to form the cylindrical structural body 55b like in the first embodiment.

The basic structure of the movable member 52 is similar to that of the first embodiment. In the first embodiment, the movable member 52 is placed between the radially inner side slit holes 33a and the radially outer side slit holes 33b of the end surface portion 33 of the pulley 30. Alternatively, in the present embodiment, the movable member 52 is placed radially outward of the both of the radially inner side slit holes 33a and the radially outer side slit holes 33b of the end surface portion 33.

Therefore, in the present embodiment, as shown in FIG. 27, the structural body 55b, which includes the permanent magnet 51b and the electromagnet 54, is placed radially outward of the inner cylindrical portion 32, and the movable member 52 is placed radially outward of the structural body 55b. Furthermore, the outer cylindrical portion 31, which is made of the non-magnetic material, is placed radially outward of the movable member 52.

Furthermore, the other end part of the movable member 52, which is located on the stator plate 56 side, has a flange 52g that extends radially outward and is configured into a circular disk form (ring form). The flange 52g includes a plurality of engaging holes 52b, each of which has an inner diameter smaller than an outer diameter of the enlarged diameter part 57a of the pin 57. In this way, even when the movable member 52 is displaced toward the end surface portion 33, the enlarged diameter part 57a engages a peripheral edge part of the opening of the engaging hole 52b to limit further displacement of the movable member 52. Therefore, a displaceable range of the movable member 52 is limited.

Therefore, even when the movable member 52 is displaced toward the end surface portion 33 of the pulley 30, an axial gap δ4 is left between the movable member 52 and the end surface portion 33. Therefore, at the time of rotating the pulley 30, it is possible to limit the contacting of the pulley 30 to the movable member 52. As a result, the rotation of the movable member 52 about the rotational axis can be limited. That is, in the present embodiment, the enlarged diameter part 57a of the pin 57 and the engaging hole 52b of the flange 52g serve as the displaceable range limiting means, and the enlarged diameter part 57a of the pin 57 serves as the contact portion.

Furthermore, similar to the first embodiment, a shock absorbing member (not shown), such as a resilient member or elastomer (e.g., rubber) or resin, is placed between the enlarged part 57a and the engaging hole 52b at the contact location (contact surface), at which the enlarged diameter part 57a contacts the engaging hole 52b at the time of displacing the movable member 52 toward the end surface portion 33 of the pulley 30.

Next, with reference to FIGS. 29A to 29D, the operation of the clutch mechanism 20 of the present embodiment will be described. FIGS. 29A to 29D are diagrams indicating an area of FIG. 27, which is indicated by a circle XXIX. FIGS. 29A to 29D correspond to FIGS. 4A to 4D, respectively, of the first embodiment. Furthermore, in FIGS. 29A to 29D, the hatchings of the components other than the movable member 52 are omitted for the sake of easy understanding.

Figure 29A:
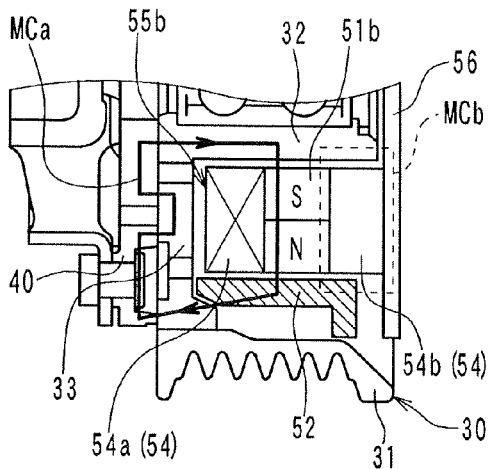
FIGS. 29A to 29D are schematic diagrams showing various operational states, respectively, of the clutch mechanism of the eleventh embodiment, indicating an area XXIX of FIG. 27 and corresponding to FIGS. 4A to 4D, respectively.

As shown in FIG. 29A, in the coupled state of the pulley 30 and the armature 40, the movable member 52 is placed at the one axial side where the end surface portion 33 of the pulley 30 is located. According to the present embodiment, at this time, as discussed above, due to the presence of the movable member 52 at the location radially outward of the slit holes 33a, 33b of the end surface portion 33 of the pulley 30, the magnetic resistance of the magnetic circuit indicated by the bold sold line in FIG. 29A is reduced, and thereby the magnetic force, which is generated at this magnetic circuit, is increased.

That is, in comparison to the decoupled state of the pulley 30 and the armature 40, in which the movable member 52 is placed at the other axial side where the stator plate 56 is located, the magnetic resistance is reduced in the magnetic circuit, which is formed with the permanent magnet 51b and conducts the magnetic flux through the movable member 52, the end surface portion 33, the armature 40 and the inner cylindrical portion 32 in this order. Therefore, the magnetic force, which is generated by this magnetic circuit, is increased.

Furthermore, the magnetic force, which is generated by the magnetic circuit indicated by the bold solid line in FIG. 29A, acts as the attracting magnetic force, which couples between the pulley 30 and the armature 40. Therefore, the magnetic circuit, which is indicated by the bold solid line in FIG. 29A, serves as the attracting magnetic circuit MCa of the present embodiment. When the movable member 52 is displaced to the one axial side where the end surface portion 33 of the pulley 30 is located, the air gap is formed between the movable member 52 and the stator plate 56.

This gap increases the magnetic resistance in the magnetic circuit, which is indicated by the regular dotted line in FIG. 29A and is formed with the permanent magnet 51b to conduct the magnetic flux through the movable member 52, the stator plate 56 and the inner cylindrical portion 32 in this order. Thereby, the magnetic force, which is generated at this magnetic circuit, is reduced.

Furthermore, the magnetic force, which is generated by the magnetic circuit indicated by the regular dotted line in FIG. 29A, does not act as the attracting magnetic force, which couples between the pulley 30 and the armature 40. Therefore, the magnetic circuit, which is indicated by the regular dotted line in FIG. 29A, serves as the non-attracting magnetic circuit MCb of the present embodiment.

Furthermore, when the movable member 52 is placed at the one axial side where the end surface portion 33 of the pulley 30 is located, the amount of magnetic flux generated at the attracting magnetic circuit MCa is increased. Therefore, the location of the movable member 52 is maintained at the one axial side where the end surface portion 33 of the pulley 30 is located.

Furthermore, in the present embodiment, the resilient force (repulsive force) of the rubber 45, which is exerted in the separating direction (decoupling direction) for separating the pulley 30 and the armature 40 away from each other, is set to be smaller than the attracting magnetic force that is exerted in the coupled state of the pulley 30 and the armature 40, in which the movable member 52 is placed at the one axial side where the end surface portion 33 of the pulley 30 is located. Therefore, even though the electric power is not supplied to the electromagnet 54, the pulley 30 and the armature 40 are maintained in the coupled state of the pulley 30 and the armature 40. Thereby, the rotational drive force is conducted from the engine 10 to the compressor 2.

Figure 29D:
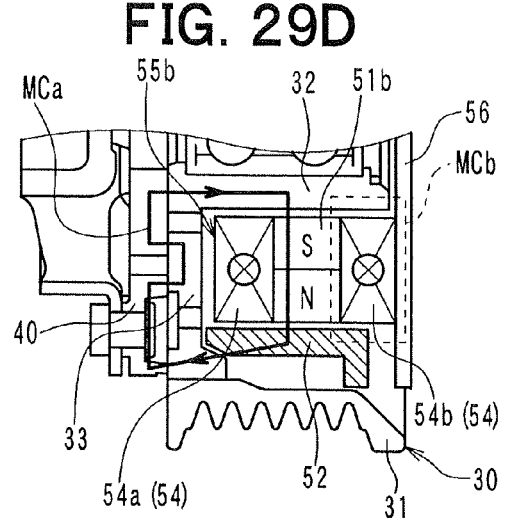
Figure 29B:
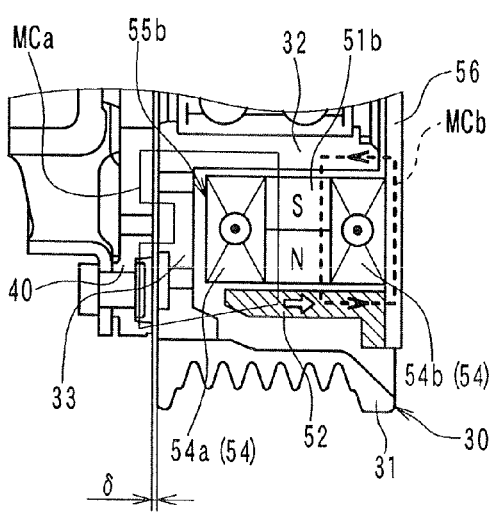

Next, at the time of decoupling between the pulley 30 and the armature 40, which have been held in the coupled state thereof shown in FIG. 29A, the air conditioning control unit 6 supplies the electric power to the electromagnet 54 in a manner shown in FIG. 29B. Specifically, the electromagnet 54 generates the electromagnetic force, which reduces the amount of magnetic flux passing through the attracting magnetic circuit MCa and increases the amount of magnetic flux passing through the non-attracting magnetic circuit MCb.

In this way, the magnetic force, which is generated by the non-attracting magnetic circuit MCb indicated by the bold dotted line in FIG. 29B, becomes larger than the attracting magnetic force, which is generated by the attracting magnetic circuit MCa indicated by the regular solid line in FIG. 29B. Thereby, the movable member 52 is displaced toward the other axial side where the stator plate 56 is located. Upon this displacement of the movable member 52, the magnetic resistance of the non-attracting magnetic circuit MCb in this decoupled state of the pulley 30 and the armature 40 is reduced in comparison to the magnetic resistance of the non-attracting magnetic circuit MCb in the coupled state of the pulley 30 and the armature 40. Thereby, the position of the movable member 52 is maintained at the stator plate 56 side.

Furthermore, when the movable member 52 is displaced to the other axial side where the stator plate 56 is located, the gap (air gap) is formed between the movable member 52 and the end surface portion 33 of the pulley 30. Due to the presence of this gap, the magnetic resistance of the attracting magnetic circuit MCa in this decoupled state of the pulley 30 and the armature 40 is increased in comparison to the magnetic resistance of the attracting magnetic circuit MCa in the coupled state of the pulley 30 and the armature 40. Thus, the repulsive force of the rubber 45 becomes larger than the attracting magnetic force, so that the pulley 30 and the armature 40 are decoupled from each other. Thereby, the rotational drive force is no longer conducted from the engine 10 to the compressor 2.

Figure 29C:
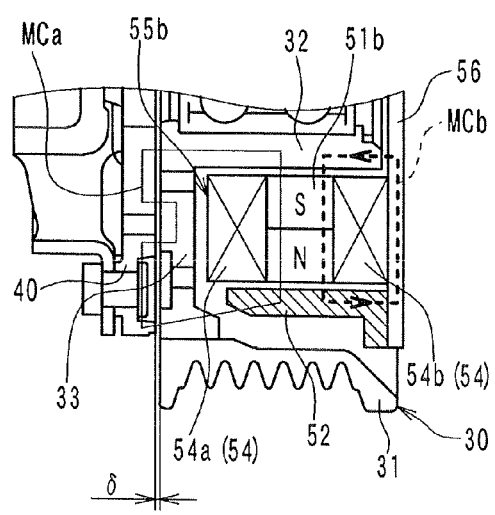

Next, as shown in FIG. 29C, in the decoupled state of the pulley 30 and the armature 40, in which the movable member 52 is placed at the other axial side where the stator plate 56 is located after the decoupling process of FIG. 29B, the amount of magnetic flux of the non-attracting magnetic circuit MCb is increased in comparison to the amount of magnetic flux of the non-attracting magnetic circuit MCb in the coupled state of the pulley 30 and the armature 40, in which the movable member 52 is placed at the one axial side where the end surface portion 33 of the pulley 30 is located. Therefore, the movable member 52 is kept held at the other axial side where the stator plate 56 is located.

Furthermore, in the decoupled state of the pulley 30 and the armature 40, in which the movable member 52 is placed at the other axial side where the stator plate 56 is located, the attracting magnetic force is smaller than the repulsive force of the rubber 45. Therefore, even though the electric power is not supplied to the electromagnet 54, the decoupled state of the pulley 30 and the armature 40 is maintained. That is, the rotational drive force of the engine 10 is not conducted to the compressor 2.

Next, at the time of coupling between the pulley 30 and the armature 40, which have been held in the decoupled state thereof shown in FIG. 29C, the air conditioning control unit 6 supplies the electric power to the electromagnet 54 in a manner shown in FIG. 29D. Specifically, the electromagnet 54 generates the electromagnetic force, which increases the amount of magnetic flux passing through the attracting magnetic circuit MCa and decreases the amount of magnetic flux passing through the non-attracting magnetic circuit MCb.

In this way, the attracting magnetic force, which is generated by the attracting magnetic circuit MCa, becomes larger than the magnetic force, which is generated by the non-attracting magnetic circuit MCb. Thereby, the movable member 52 is displaced toward the one axial side where the end surface portion 33 of the pulley 30 is located.

Upon this displacement of the movable member 52, the magnetic resistance of the attracting magnetic circuit MCa is reduced in comparison to the magnetic resistance of the attracting magnetic circuit MCa in the decoupled state of the pulley 30 and the armature 40. Thereby, the amount of magnetic flux of the attracting magnetic circuit MCa is further increased. Therefore, the attracting magnetic force becomes larger than the repulsive force of the rubber 45, so that the pulley 30 and the armature 40 are coupled with each other. Thus, the rotational drive force is conducted from the engine 10 to the compressor 2.

The clutch mechanism 20 of the present embodiment is operated in the above described manner. Therefore, similar to the first embodiment, it is possible to limit the erroneous operation of the clutch mechanism, which is constructed to enable limiting of the energy consumption at the time of conducting the drive force.

Furthermore, according to the present embodiment, due to the presence of the movable member 52 at the location radially outward of the slit holes 33a, 33b of the end surface portion 33 of the pulley 30, it is possible to bypass the flow of the magnetic flux, which passes through the attracting magnetic circuit MCa. Therefore, the magnetic flux, which passes from the pulley 30 side to the armature 40 side, and the magnetic flux, which passes from the armature 40 side to the pulley 30 side, are increased to increase the attracting magnetic force. Furthermore, the constructions of the fifth to ninth embodiments may be applied to the clutch mechanism of the present embodiment.

Twelfth Embodiment

In the eleventh embodiment, the enlarged diameter part 57a of the pin 57 and the engaging hole 52b of the flange 52g serve as the displaceable range limiting means. In the present embodiment, as shown in FIG. 30, a stopper 56a is provided in the stator plate 56 to serve as the displaceable range limiting means.

Figure 30:
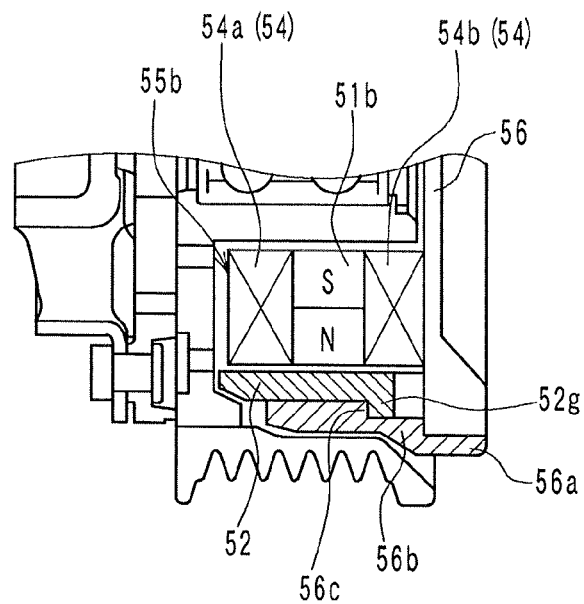
FIG. 30 is a cross-sectional view of a clutch mechanism according to a twelfth embodiment of the present invention, corresponding to the area indicated by the circle XXIX-XXIX in FIG. 27.

FIG. 30 is a diagram, which corresponds to the cross-sectional view of the area indicated by the circle XXIX in FIG. 27. Furthermore, in FIG. 30, the hatchings of the components other than the movable member 52 and the stopper 56a are omitted for the sake of easy understanding.

Specifically, the stopper 56a is a cylindrical tubular member, which is made of the non-magnetic material (e.g., stainless steel) and is joined to the outer circumferential surface of the stator plate 56 by a joining means (e.g., bonding or press fitting). Furthermore, the stopper 56a has a stepped part 56c, which extends along the entire circumference of the stopper 56a and projects radially inward. The rest of the remaining construction is the same as that of the eleventh embodiment.

In this way, even when the movable member 52 is displaced, the flange 52g of the movable member 52 contacts the stepped part 56c to limit the displaceable range of the movable member 52. That is, according to the present embodiment, the flange 52g and the stepped part 56c serve as the displaceable range liming means, and the stepped part 56c serves as the contact portion. Therefore, even when the pulley 30 is rotated, the contacting of the pulley 30 to the movable member 52 is limited.

Furthermore, a shock absorbing member (not shown), such as a resilient member or elastomer (e.g., rubber) or resin is provided at the contact location (contact surface), at which the flange 52g contacts the stepped part 56c at the time of displacing the movable member 52. Thereby, the collision impact at the time of contacting the flange 52g to the stepped part 56c can be reduced or alleviated, and the operational noise associated therewith can be reduced.

Thirteenth Embodiment

In the eleventh embodiment, the radial thickness of the permanent magnet 51b is increased in comparison to the radial thickness of the second permanent magnet 51b of the first embodiment. Therefore, the volume of the permanent magnet 51b may possibly be larger than the required volume, which is required to generate the required attracting magnetic force for coupling between the pulley 30 and the armature 40.

Figure 31:
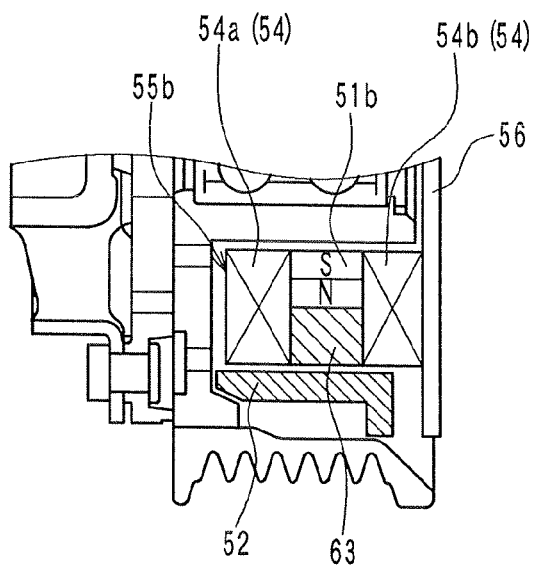
FIG. 31 is a cross-sectional view of a clutch mechanism according to a thirteenth embodiment of the present invention, corresponding to the area indicated by the circle XXIX-XXIX in FIG. 27.

According to the present embodiment, as shown in FIG. 31, the radial thickness of the permanent magnet 51b is reduced, and thereby the volume of the permanent magnet 51b is reduced to an appropriate volume, which is appropriate to generate the required attracting magnetic force that is required to couple between the pulley 30 and the armature 40. Furthermore, a yoke member 63, which is configured into a cylindrical tubular form and is made of a magnetic material (e.g., iron), is placed at a reduced part, which is left upon reducing the volume of the permanent magnet 51b.

The rest of the remaining construction is the same as that of the eleventh embodiment. In this way, the amount (volume) of the permanent magnet 51b can be reduced, and thereby the manufacturing costs of the clutch mechanism 20 can be reduced. Furthermore, the effective magnetic circuit is formed without generating the magnetic resistance at the reduced part, which is left upon reducing the volume of the permanent magnet 51b.

In the present embodiment, the yoke member 63 is placed radially outward of the permanent magnet 51b. Alternatively, the yoke member 63 may be placed radially inward of the permanent magnet 51b. Furthermore, in the present embodiment, the permanent magnet 51b and the yoke member 63 are fixed together by the joining means (e.g., the bonding), so that the positional deviation between the permanent magnet 51b and the yoke member 63 is limited. However, the fixing between the permanent magnet 51b and the yoke member 63 is not limited to this.

Figure 32A:
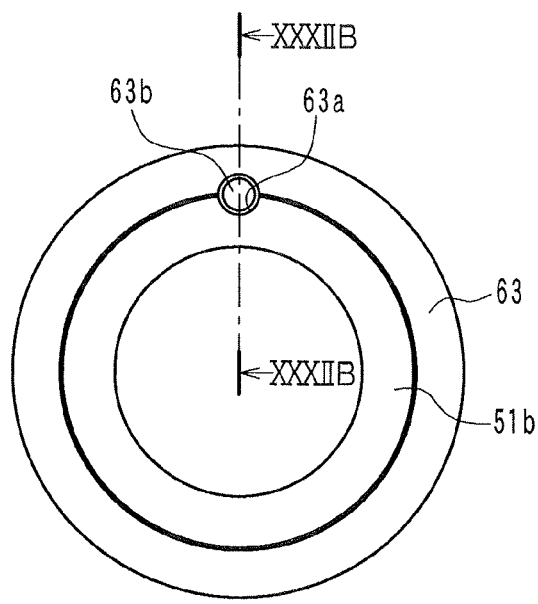
FIGS. 32A and 32B are diagrams showing a modification of the thirteenth embodiment.
Figure 32B:
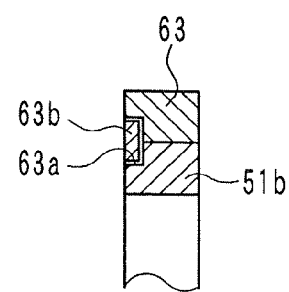
Figure 32C:
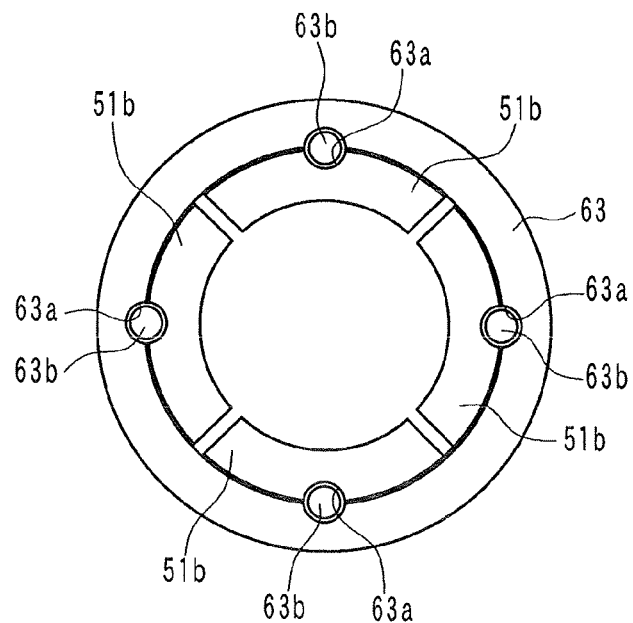
FIG. 32C is a diagram showing a further modification of the modification shown in FIGS. 32A and 32B.

For example, as shown in FIGS. 32A and 32B, a counterbore hole 63a, which extends in both of the permanent magnet 51b and the yoke member 63 in the axial direction, may be formed, and a pin 63b may be fitted into the counterbore hole 63a. FIG. 32A is an end view of the permanent magnet 51b and the yoke member 63 taken in the axial direction. FIG. 32B is a cross sectional view taken along line XXXIIB-XXXIIB in FIG. 32A. Furthermore, as shown in FIG. 32C, in the case where the permanent magnet 51b is divided into a plurality of segments that are placed one after another in the circumferential direction, each segmented permanent magnet 51b and the yoke member 63 may be fixed together by the corresponding pin 63b in a manner similar to that of FIGS. 32A and 32B.

Figure 33A:
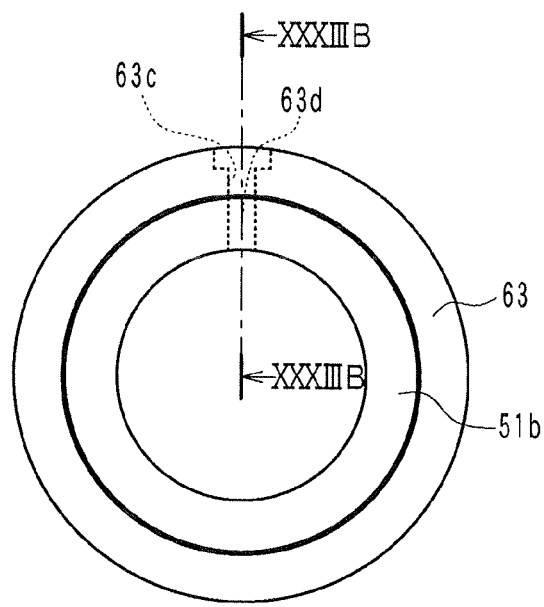
FIGS. 33A and 33B are diagrams showing another modification of the thirteenth embodiment.
Figure 33B:
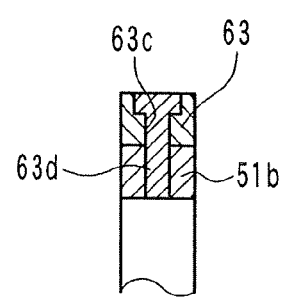
Figure 33C:
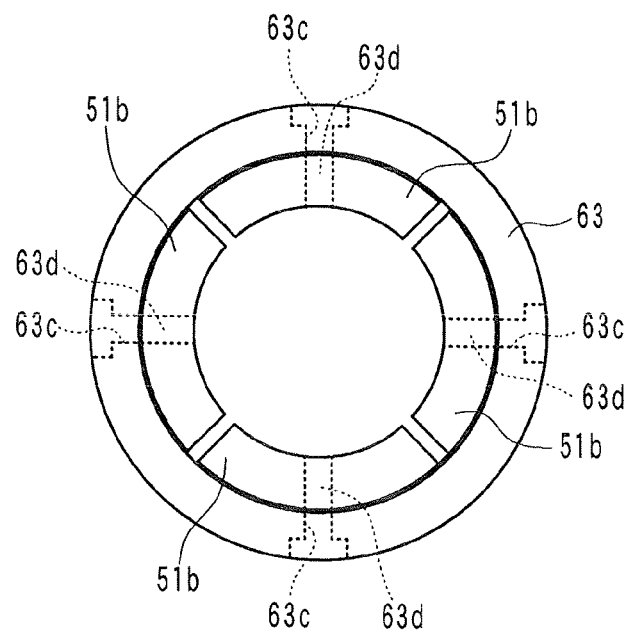
FIG. 33C is a diagram showing a further modification of the modification shown in FIGS. 33A and 33B.

Alternatively, as shown in FIG. 33A, a pin hole 63c, which extends in the radial direction, may be formed to extend through both the permanent magnet 51b and the yoke member 63. Then, a pin 63d may be fitted into the pin hole 63c to fix between the permanent magnet 51b and the yoke member 63. FIGS. 33A to 33C correspond to FIGS. 32A to 32C. Also, FIG. 33B is a view taken along line XXXIIIB-XXXIIIB in FIG. 33A. Furthermore, as shown in FIG. 33C, in the case where the permanent magnet 51b is divided into a plurality of segments that are placed one after another in the circumferential direction, each segmented permanent magnet 51b and the yoke member 63 may be fixed together by the corresponding pin 63b in a manner similar to that of FIGS. 33A and 33B.

Figure 34A:
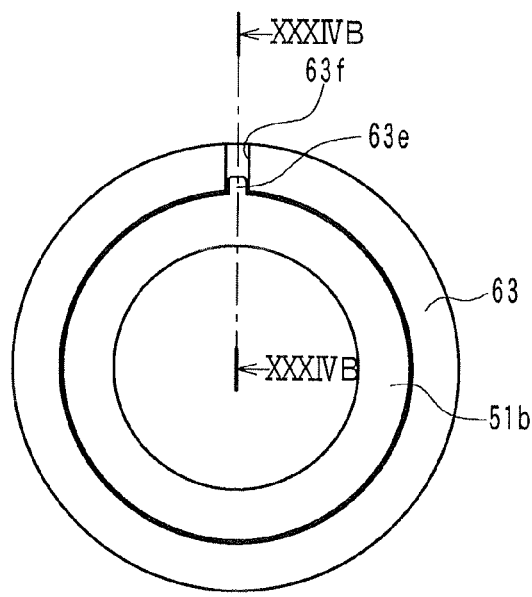
FIGS. 34A and 34B are diagrams showing another modification of the thirteenth embodiment.
Figure 34B:
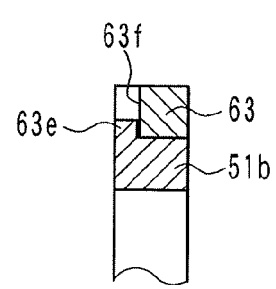
Figure 34C:
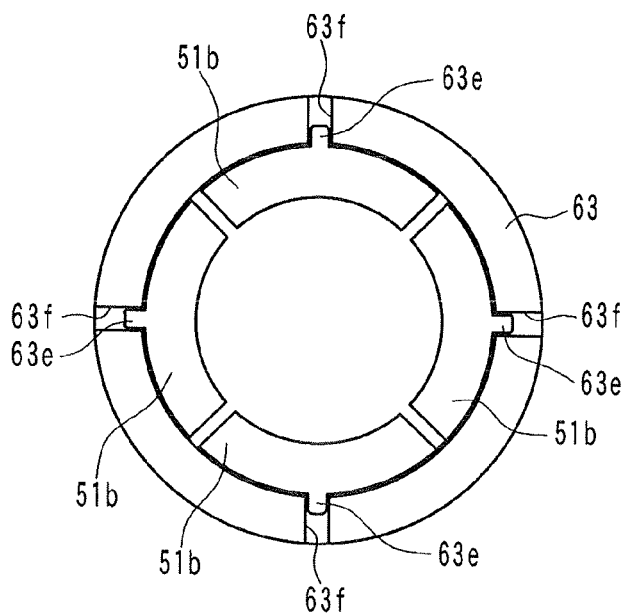
FIG. 34C is a diagram showing a further modification of the modification shown in FIGS. 34A and 34B.

Further alternatively, as shown in FIGS. 34A and 34B, a projection 63e, which projects radially outward may be formed in the permanent magnet 51b. A receiving hole 63f, into which the projection 63e is fitted, may be formed in the yoke member 63 to fix between the permanent magnet 51b and the yoke member 63. FIGS. 34A to 34C correspond to FIGS. 32A to 32C. Also, FIG. 34B is a view taken along line XXXIVB-XXXIVB in FIG. 34A. As shown in FIG. 34C, in the case where the permanent magnet 51b is divided into a plurality of segments that are placed one after another in the circumferential direction, each segmented permanent magnet 51b and the yoke member 63 may be fixed together by the projection 63e and the receiving hole 63 in a manner similar to that of FIGS. 34A and 34B.

Figure 35A:
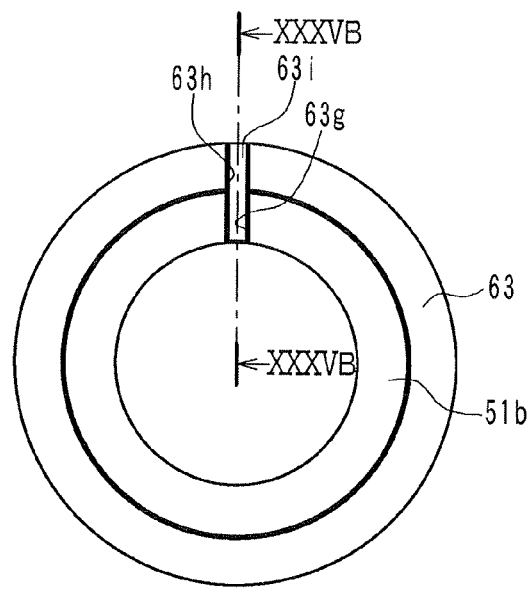
FIGS. 35A and 35B are diagrams showing another modification of the thirteenth embodiment.
Figure 35B:
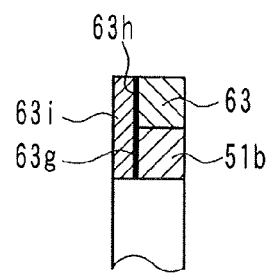
Figure 35C:
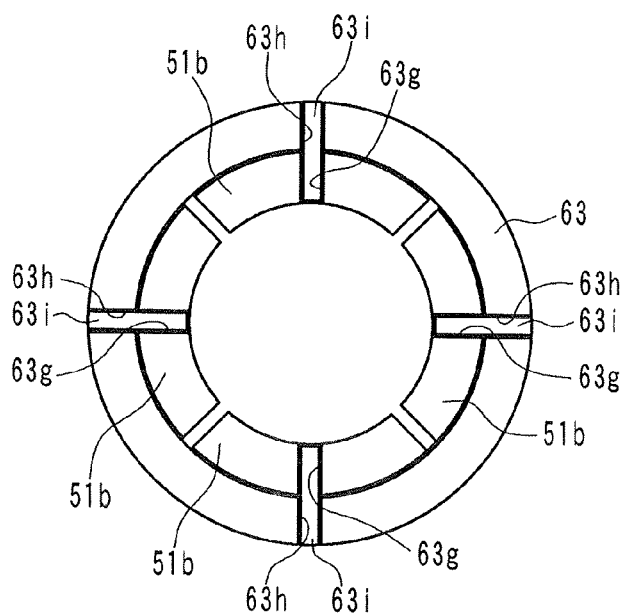
FIG. 35C is a diagram showing a further modification of the modification shown in FIGS. 35A and 35B.

Furthermore, as shown in FIGS. 35A and 35B, a key groove 63g may be formed in the permanent magnet 51b to extend in the radial direction, and a key groove 63h may be formed in the yoke member 63 to extend in the radial direction in alignment with the key groove 63g. Then, a key 63i may be fitted into these key grooves 63g, 63h to fix the permanent magnet 51b and the yoke member 63 together. FIGS. 35A to 35C correspond to FIGS. 32A to 32C. Also, FIG. 35B is a view taken along line XXXVB-XXXVB in FIG. 35A. As shown in FIG. 35C, in the case where the permanent magnet 51b is divided into a plurality of segments that are placed one after another in the circumferential direction, each segmented permanent magnet 51b and the yoke member 63 may be fixed together by the key grooves 63g, 63h and the key 63i in a manner similar to that of FIGS. 35A and 35B.

Fourteenth Embodiment

In the eleventh embodiment, the electromagnet 54, which includes the third and fourth coil portions 54a, 54b, is used to serve as the movable member displacing means. Alternatively, in the present embodiment, the third coil portion 54a of the eleventh embodiment is eliminated from the electromagnet 54, and the space, from which this third coil portion 54a is eliminated, is left as an empty gap. The rest of the remaining construction is the same as that of the eleventh embodiment.

Next, the operation of the clutch mechanism 20 of the present embodiment will be described with reference to FIGS. 36A to 36D. FIGS. 36A to 36D correspond to FIGS. 29A to 29D, respectively, of the eleventh embodiment.

Figure 36A:
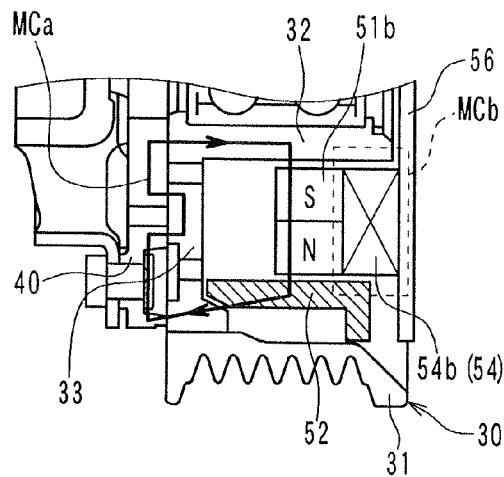
FIGS. 36A to 36D are schematic diagrams showing various operational states, respectively, of a clutch mechanism according to a fourteenth embodiment of the present invention, corresponding to FIGS. 29A to 29D, respectively.

As shown in FIG. 36A, in the coupled state of the pulley 30 and the armature 40, the movable member 52 is placed at the one axial side where the end surface portion 33 of the pulley 30 is located, like in the eleventh embodiment. Therefore, the amount of magnetic flux in the attracting magnetic circuit MCa in this coupled state of the pulley 30 and the armature 40, in which the movable member 52 is placed at the one axial side where the end surface portion 33 of the pulley 30 is located, is increased in comparison to the amount of magnetic flux in the other state where the movable member 52 is placed at the other axial side where the stator plate 56 is located. Therefore, the movable member 52 is held at the one axial side where the end surface portion 33 of the pulley 30 is located.

At this time, the attracting magnetic force is larger than the resilient force (repulsive force) of the rubber 45. Therefore, even though the electric power is not supplied to the electromagnet 54, the coupled state of the pulley 30 and the armature 40 is maintained. Thus, the rotational drive force is conducted from the engine 10 to the compressor 2.

Figure 36D:
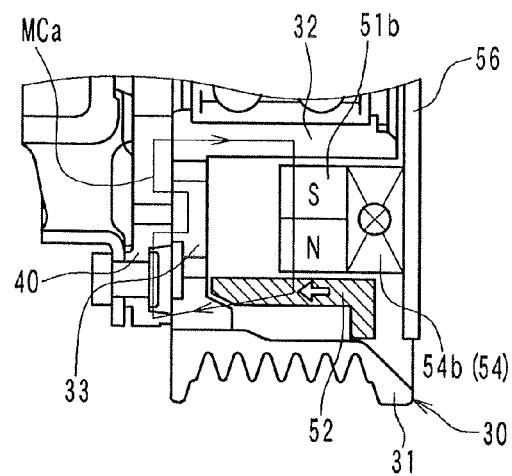
Figure 36B:
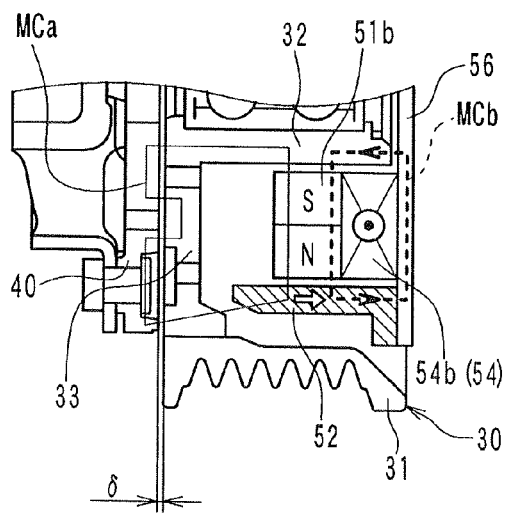

Next, at the time of decoupling between the pulley 30 and the armature 40, which have been held in the coupled state thereof, the air conditioning control unit 6 supplies the electric power to the electromagnet 54 in a manner shown in FIG. 36B. In this way, the attracting magnetic force, which is generated by the attracting magnetic circuit MCb, becomes larger than the magnetic force, which is generated by the non-attracting magnetic circuit MCa. Thereby, the movable member 52 is displaced toward the other axial side where the stator plate 56 is located.

In response to this displacement, the amount of magnetic flux of the non-attracting magnetic circuit MCb is increased in comparison to the coupled state of the pulley 30 and the armature 40. Therefore, the movable member 52 is kept held at the other axial side where the stator plate 56 is located. Furthermore, the attracting magnetic force, which is generated by the attracting magnetic circuit MCa, is reduced, so that the repulsive force of the rubber 45 becomes larger than the attracting magnetic force. Therefore, the pulley 30 and the armature 40 are decoupled from each other. Thereby, the rotational drive force is no longer conducted from the engine 10 to the compressor 2.

Figure 36C:
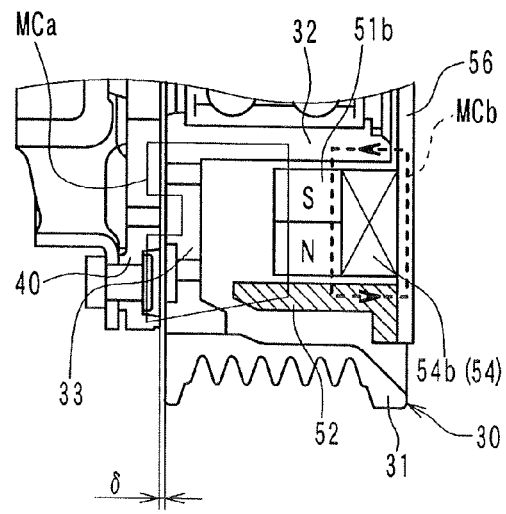

Next, as shown in FIG. 36C, in the decoupled state of the pulley 30 and the armature 40, in which the movable member 52 is placed at the other axial side where the stator plate 56 is located, the amount of magnetic flux of the non-attracting magnetic circuit MCb is increased in comparison to the amount of magnetic flux of the non-attracting magnetic circuit MCb in the coupled state of the pulley 30 and the armature 40, in which the movable member 52 is placed at the one axial side where the end surface portion 33 of the pulley 30 is located. Therefore, the movable member 52 is kept held at the other axial side where the stator plate 56 is located.

Furthermore, in the decoupled state of the pulley 30 and the armature 40, in which the movable member 52 is placed at the other axial side where the stator plate 56 is located, the attracting magnetic force is smaller than the repulsive force of the rubber 45. Therefore, even though the electric power is not supplied to the electromagnet 54, the decoupled state of the pulley 30 and the armature 40 is maintained. That is, the rotational drive force of the engine 10 is not conducted to the compressor 2.

Next, at the time of coupling between the pulley 30 and the armature 40, which have been held in the decoupled state thereof, the air conditioning control unit 6 supplies the electric power to the electromagnet 54 in a manner shown in FIG. 36D, like in the eleventh embodiment. In this way, the magnetic flux, which is generated with the permanent magnet 51b and flows through the non-attracting magnetic circuit MCb, counteracts the magnetic flux, which is generated with the electromagnet 54 and flows through the non-attracting magnetic circuit MCb in the opposite direction that is opposite from the magnetic flux, which is generated with the permanent magnet 51b. Therefore, the magnetic force, which is generated in the non-attracting magnetic circuit MCb, substantially disappears.

In this state, although the magnetic force is not generated by the non-attracting magnetic circuit MCb, the magnetic flux, which passes through the non-attracting magnetic circuit MCb, is magnetically saturated. Therefore, the attracting magnetic force, which is generated in the attracting magnetic circuit MCa, becomes larger than the magnetic force, which is generated in the non-attracting magnetic circuit MCb. Therefore, the movable member 52 is displaced to the one axial side where the end surface portion 33 of the pulley 30 is located.

In response to this displacement, the amount of magnetic flux of the attracting magnetic circuit MCa is increased in comparison to the decoupled state of the pulley 30 and the armature 40. Thereby, the attracting magnetic force becomes larger than the repulsive force of the rubber 45, and thereby the pulley 30 and the armature 40 are coupled with each other. Thus, the rotational drive force is conducted from the engine 10 to the compressor 2.

Even though the movable member displacing means is made of the single coil portion 54b as in the present embodiment, the effect similar to that of the eleventh embodiment can be achieved. Thereby, it is possible to limit the erroneous operation of the clutch mechanism, which is constructed to enable limiting of the energy consumption at the time of conducting the drive force. Alternatively, the fourth coil portion 54b of the eleventh embodiment may be eliminated in place of the third coil portion 54a while providing the third coil portion 54a. Also, in the present embodiment, a ring member, which is made of the non-magnetic material, may be placed in the space, from which the third coil portion 54a is eliminated.

Furthermore, the constructions of the fifth to ninth and twelfth to thirteenth embodiments may be applied to the clutch mechanism 20 of the present embodiment.

The present invention is not limited to the above embodiments, and the above embodiments may be modified as follows without departing the scope and spirit of the present invention.

In each of the above embodiments, the movable member displacing means is made of the electromagnet(s) 53, 54. However, the movable member displacing means is not limited to this. For example, an actuator, which forcefully displaces the movable member 52 in the direction of the rotational axis, may be used and may be installed to the housing of the compressor 2 or the stator plate 56.

In the above embodiments, the coil wire is divided into two portions to form the first electromagnet 53 divided into the first coil portion 53a and the second coil portion 53b. Alternatively, the first coil portion 53a and the second coil portion 53b may be formed as separate electromagnets. This is also true for the second electromagnet 54.

In each of the above embodiments, the neodymium or the samarium-cobalt is used as the material of the permanent magnet(s) 51a, 51b. However, the material of the permanent magnet(s) 51a, 51b is not limited to such a rare-earth magnet. For example, ferrite or alnico may be used as the material of the permanent magnet(s) 51a, 51b.

In each of the above embodiments, when the pulley 30 and the armature 40 are decoupled from each other, the gap δ of the predetermined size is formed between the planar surface of the one end part of the armature 40, which is connected to the outer hub 42, and the outer surface of the end surface portion 33 of the pulley 30 due to the resilient force of the rubber 45. Alternatively, the gap δ of the predetermined size may be formed by using a resilient force of a leaf spring in place of the resilient force of the rubber 45.

In each of the above embodiments, the clutch mechanism 20 is applied to enable or disable the conduction of the drive force from the engine 10 to the compressor 2. However, the applicable field of the clutch mechanism 20 of the present invention is not limited to this. For example, the clutch mechanism 20 of the present invention may be applied in various systems, which enables or disables conduction of a drive force between the drive source (the engine or the electric motor) and the power generator, which is driven by the rotational drive force.

Furthermore, in the eleventh to fourteenth embodiments, the structural body 55b, which includes the permanent magnet 51b and the electromagnet 54, is placed radially outward of the inner cylindrical portion 32 made of the magnetic material, and the movable member 52 is placed radially outward of the structural body 55b. In addition, the outer cylindrical portion 31, which is made of the non-magnetic material, is placed radially outward of the movable member 52. Alternatively, the inner cylindrical portion 32 may be made of the non-magnetic material, and the outer cylindrical portion 31 and the end surface portion 33 may be made of the magnetic material.

Specifically, in such a case, although the pulley 30 has the double cylindrical structure like in the first embodiment, the inner cylindrical portion 32 is made of the non-magnetic material. Thereby, unlike the first embodiment, the inner cylindrical portion 32 does not form the attracting magnetic circuit MCa and the non-attracting magnetic circuit MCb. Furthermore, the movable member 52 may be placed radially inward of the radially inner side slit holes 33a and the radially outer side slit holes 33b of the end surface portion 33 in the axial view.

That is, the movable member 52 may be placed radially outward of the inner cylindrical portion 32 made of the non-magnetic material. Also, the structural body 55b, which includes the permanent magnet 51b and the electromagnet 54, may be placed radially outward of the movable member 52. Furthermore, the outer cylindrical portion 31, which is made of the magnetic material, may be placed radially outward of the structural body 55b.

In other words, the pulley (i.e., the driving-side rotator) 30 may have the outer cylindrical portion 31, which is made of the magnetic material and extends in the direction of the rotational axis. The attracting magnetic circuit MCa may have at least a portion of the outer cylindrical portion 31. The permanent magnet 51b and the electromagnet (i.e., movable member displacing means) 54 may be placed radially inward of the outer cylindrical portion 31. Furthermore, the movable member 52 may be placed radially inward of the permanent magnet 51b and the electromagnet (i.e., movable member displacing means) 54.

Also, the pulley (i.e., the driving-side rotator) 30 may have the inner cylindrical portion 32, which extends in the direction of the rotational axis, and the inner cylindrical portion 32 may be made of the non-magnetic material and may be placed radially inward of the movable member 52.

In addition, the pulley (i.e., the driving-side rotator 30) may have the end surface portion 33, which connects between the one end part of the inner cylindrical portion 32 and the one end part of the outer cylindrical portion 31. The end surface portion 33 may have the slit holes 33a, 33b, which penetrate through the wall of the end surface portion 33. The movable member 52 may be placed radially inward of the slit holes 33a, 33b.

Additional advantages and modifications will readily occur to those skilled in the art. The invention in its broader terms is therefore not limited to the specific details, representative apparatus, and illustrative examples shown and described.

What is claimed is:

1. A clutch mechanism comprising:
   a driving-side rotator that is adapted to be rotated about a rotational axis thereof by a rotational drive force conducted from a drive source;
   a driven-side rotator that is coupleable with the driving-side rotator to receive the rotational drive force from the driving-side rotator;
   a permanent magnet that is adapted to generate an attracting magnetic force to couple between the driving-side rotator and the driven-side rotator;
   a movable member that is made of a magnetic material and is displaceable to increase or decrease a magnetic resistance of an attracting magnetic circuit, which is adapted to generate the attracting magnetic force through the permanent magnet; and
   a movable member displacing means for displacing the movable member,
   wherein:
   the attracting magnetic circuit includes both of at least a part of the driving-side rotator and at least a part of the driven-side rotator;
   at time of coupling between the driving-side rotator and the driven-side rotator, the movable member displacing means displaces the movable member to a location, at which the magnetic resistance of the attracting magnetic circuit is reduced in comparison to time of decoupling between the driving-side rotator and the driven-side rotator from each other; and
   at the time of decoupling between the driving-side rotator and the driven-side rotator, the movable member displacing means displaces the movable member to a location, at which the magnetic resistance of the attracting magnetic circuit is increased in comparison to the time of coupling between the driving-side rotator and the driven-side rotator, and a magnetic resistance of a non-attracting magnetic circuit, which is different from the attracting magnetic circuit, is reduced in comparison to the time of coupling between the driving-side rotator and the driven-side rotator.

2. The clutch mechanism according to claim 1, wherein:
   the movable member displacing means includes an electromagnet, which generates an electromagnetic force upon receiving an electric power;
   at the time of coupling between the driving-side rotator and the driven-side rotator, the electromagnet generates the electromagnetic force to increase the attracting magnetic force; and
   at the time of decoupling between the driving-side rotator and the driven-side rotator, the electromagnet generates the electromagnetic force to reduce the attracting magnetic force.

3. The clutch mechanism according to claim 2, wherein the electromagnet is an annular body placed around the rotational axis.

4. The clutch mechanism according to claim 2, wherein the electromagnet is formed by winding a coil wire around a bobbin that is made of a non-magnetic material and is configured into a cylindrical tubular body.

5. The clutch mechanism according to claim 1, wherein:
   the driving-side rotator includes an inner cylindrical portion, which is made of a magnetic material and extends in a direction of the rotational axis of the driving-side rotator;
   the attracting magnetic circuit includes at least a portion of the inner cylindrical portion;
   the permanent magnet and the movable member displacing means are placed radially outward of the inner cylindrical portion; and
   the movable member is placed radially outward of the permanent magnet and the movable member displacing means.

6. The clutch mechanism according to claim 5, wherein:
   the driving-side rotator includes an outer cylindrical portion that extends in the direction of the rotational axis of the driving-side rotator; and
   the outer cylindrical portion is made of a non-magnetic material and is placed radially outward of the movable member.

7. The clutch mechanism according to claim 6, wherein:
   the driving-side rotator includes an end surface portion, which connects between one axial end part of the inner cylindrical portion and one axial end part of the inner cylindrical portion;
   the end surface portion includes a slit hole that extends through between one surface and an opposite surface of the end surface portion in the direction of the rotational axis; and
   the movable member is placed radially outward of the slit hole.

8. The clutch mechanism according to claim 6, wherein a vane, which is adapted to generate a flow of air from an interior side toward an exterior side of the outer cylindrical portion, is provided in an inner circumferential part of the outer cylindrical portion.

9. The clutch mechanism according to claim 5, wherein:
   the driven-side rotator is placed on one axial side of the inner cylindrical portion;
   a magnetic pole of the permanent magnet is directed in a direction perpendicular to the rotational axis;
   a displaceable direction of the movable member coincides with the direction of the rotational axis;
   at the time of coupling between the driving-side rotator and the driven-side rotator, the movable member displacing means displaces the movable member toward the one axial side; and
   at the time of decoupling between the driving-side rotator and the driven-side rotator, the movable member displacing means displaces the movable member toward the other axial side, which is opposite from the one axial side.

10. The clutch mechanism according to claim 5, wherein the movable member is formed into a cylindrical body that extends in the direction of the rotational axis.

11. The clutch mechanism according to claim 5, wherein the permanent magnet is an annular body placed around the rotational axis.

12. The clutch mechanism according to claim 5, wherein the movable member has two tapered parts, and each tapered part progressively reduces a thickness of the movable member, which is measured in a direction perpendicular to the rotational axis, toward a corresponding one of opposed two ends of the movable member.

13. The clutch mechanism according to claim 1, wherein:
the driving-side rotator includes:
    an outer cylindrical portion that is made of a magnetic material and extends in the direction of the rotational axis;
    an inner cylindrical portion that is made of a magnetic material and extends in the direction of the rotational axis;
the attracting magnetic circuit includes at least one of a portion of the outer cylindrical portion and a portion of the inner cylindrical portion; and
the permanent magnet, the movable member and the movable member displacing means are placed radially inward of the outer cylindrical portion and radially outward of the inner cylindrical portion.

14. The clutch mechanism according to claim 1, wherein the movable member is surface treated to reduce a slide resistance of a surface of the movable member at the time of displacing the movable member.

15. The clutch mechanism according to claim 1, further comprising a wearing limiting member, which limits a frictional wearing of the movable member that is generated at the time of displacing the movable member.

16. The clutch mechanism according to claim 1, further comprising a displaceable range limiting means for limiting a displaceable range of the movable member.

17. The clutch mechanism according to claim 16, wherein:
the displaceable range limiting means includes a contact portion, which contacts the movable member at the time of displacing the movable member; and
a shock absorbing member is placed between the movable member and the contact portion to alleviate a shock at time of contacting the movable member against the contact portion.

18. The clutch mechanism according to claim 1, wherein the movable member displacing means includes a plurality of electromagnets that generate an electromagnetic force upon receiving an electric power.

19. The clutch mechanism according to claim 1, further comprising a yoke member, which is made of a magnetic material and contacts the permanent magnet.

20. The clutch mechanism according to claim 19, wherein the yoke member is fixed to the permanent magnet.

21. The clutch mechanism according to claim 1, wherein the permanent magnet is one of a plurality of permanent magnets.

22. The clutch mechanism according to claim 1, wherein:
the movable member displacing means includes an electromagnet;
a coil wire of the electromagnet is adapted to conduct an electric current in one flow direction at the time of coupling between the driving-side rotator and the driven-side rotator to displace the movable member; and
the coil wire of the electromagnet is adapted to conduct the electric current in an opposite flow direction, which is opposite from the one flow direction, at the time of decoupling between the driving-side rotator and the driven-side rotator to displace the movable member.

23. The clutch mechanism according to claim 1, wherein the movable member displacing means includes:
a first electromagnet, which generates an electromagnetic force upon receiving an electric power; and
a second electromagnet, which is located on an axial side of the first electromagnet that is opposite from the driven-side rotator in the direction of the rotational axis, wherein the second electromagnet generates an electromagnetic force upon receiving an electric power.

24. A clutch system comprising:
the clutch mechanism of claim 23; and
a control means for controlling an electric current, which is supplied to the first electromagnet and the second electromagnet, wherein the control means supplies the electric current to the first electromagnet and the second electromagnet in a predetermined flow direction at the time of coupling between the driving-side rotator and the driven-side rotator, and the control means supplies the electric current to the first electromagnet and the second electromagnet in an opposite flow direction, which is opposite from the predetermined flow direction, at the time of decoupling between the driving-side rotator and the driven-side rotator.

\* \* \* \* \*